United States Patent
Quirynen et al.

(10) Patent No.: US 12,515,652 B2
(45) Date of Patent: Jan. 6, 2026

(54) SYSTEM AND METHOD FOR VEHICLE DECISION MAKING AND MOTION PLANNING USING REAL-TIME MIXED-INTEGER PROGRAMMING

(71) Applicant: Mitsubishi Electric Research Laboratories, Inc., Cambridge, MA (US)

(72) Inventors: Rien Quirynen, Cambridge, MA (US); Sleiman Safaoui, Cambridge, MA (US); Stefano Di Cairano, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 323 days.

(21) Appl. No.: 18/184,274

(22) Filed: Mar. 15, 2023

(65) Prior Publication Data

US 2024/0308506 A1 Sep. 19, 2024

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *B60W 30/14* (2013.01);
(Continued)

(58) Field of Classification Search
None
See application file for complete search history.

(56) References Cited

U.S. PATENT DOCUMENTS

| | | | |
|---|---|---|---|
| 2020/0293009 A1* | 9/2020 | Quirynen | G05B 13/041 |
| 2021/0088345 A1* | 3/2021 | Paden | B60W 50/06 |
| 2023/0089978 A1* | 3/2023 | Pulver | G05D 1/0238 |
| | | | 701/26 |

OTHER PUBLICATIONS

J. Liang, S. D. Cairano and R. Quirynen, "Early Termination of Convex QP Solvers in Mixed-Integer Programming for Real-Time Decision Making," in IEEE Control Systems Letters, vol. 5, No. 4, pp. 1417-1422, Oct. 2021, doi: 10.1109/LCSYS.2020.3038677. (Year: 2021).*

(Continued)

*Primary Examiner* — David P. Merlino
(74) *Attorney, Agent, or Firm* — Gene Vinokur

(57) ABSTRACT

A vehicle controlled for traveling on a road having a geometric design defined by one or a combination of an alignment, a profile, and a cross-section of the road, such that different values of parameters of the geometric design of the road, traffic on the road, traffic rules for the flow of the traffic on the road define different traffic scenarios. The vehicle is controlled by transforming the mixed-integer non-convex constrained optimization problem for the current real-world traffic scenario into a mixed-integer convex optimization problem for an approximate representation of the real-world traffic scenario by relaxing the configuration parameters of the real-world scenarios and tightening corresponding limitation parameters. The transformed mixed-integer convex optimization problem for the approximate representation of the real-world traffic scenario is solved to produce a current control command for controlling one or multiple actuators of the vehicle.

20 Claims, 30 Drawing Sheets

(51) Int. Cl.
*B60W 30/14* (2006.01)
*B60W 50/00* (2006.01)

(52) U.S. Cl.
CPC ..... *B60W 50/0097* (2013.01); *B60W 2510/20* (2013.01); *B60W 2520/12* (2013.01); *B60W 2552/05* (2020.02); *B60W 2552/10* (2020.02); *B60W 2552/20* (2020.02); *B60W 2552/30* (2020.02); *B60W 2554/4041* (2020.02); *B60W 2555/60* (2020.02)

(56) References Cited

OTHER PUBLICATIONS

F. Eiras, M. Hawasly, S. V. Albrecht and S. Ramamoorthy, "A Two-Stage Optimization-Based Motion Planner for Safe Urban Driving," in IEEE Transactions on Robotics, vol. 38, No. 2, pp. 822-834, Apr. 2022, doi: 10.1109/TRO.2021.3088009 (Year: 2022).*

* cited by examiner

SYSTEM AND METHOD FOR VEHICLE DECISION MAKING AND MOTION PLANNING USING REAL-TIME MIXED-INTEGER PROGRAMMING

TECHNICAL FIELD

The present disclosure relates generally to optimization-based control, and more particularly to methods and apparatus for mixed-integer model predictive control in vehicle decision making and motion planning with continuous and discrete elements of operations.

BACKGROUND

Conventional autonomously driving vehicles are equipped with a control system that determines how the vehicle should move on the road, satisfying legal driving and traffic rules, to achieve its driving objectives. The conventional control system determines the vehicle motion by analyzing the environment based on data acquired by the sensors and processed by recognition and mapping algorithms, by computing a desired vehicle path and speed, and by controlling the vehicle to follow that path using available vehicle actuators. Due to the complexity of such conventional operations, some conventional control systems include separated components responsible for path planning and vehicle control. For instance, U.S. Pat. No. 9,915,948, incorporated herein by reference, discusses how the vehicle control and the path planning can be integrated to guarantee that the vehicle achieves a desired objective of the (semi-) automated driving system.

For example, the path planning of the autonomous vehicle can execute a motion planning system (MPS) responsible for determining path and/or motion trajectory of the vehicle. MPS can use different path planning methods, see for instance U.S. Pat. No. 9,568,915, incorporated herein by reference. To determine a motion trajectory to reach a target goal, the MPS can use knowledge of the current and predicted environment, obtained from vehicle sensors or received over communication channels as well as maps of the environment. To be able to adjust the motion trajectory according to the changing environment, the MPS needs to continuously update the motion trajectory in real-time, with limited computations due to the limited capabilities of computing and communication platforms in the vehicle.

Accordingly, due to the need to operate in real-time to account for a dynamic and rapidly changing environment, the motion trajectory can be predicted only for a brief period of time, i.e., a planning interval of the MPS is not able to cover the entire driving path of the vehicle but only a certain sub-segment, from the current position to a next intermediate driving goal. In complex dynamic scenarios, such as autonomous driving in urban settings, there may be multiple sequences of intermediate goals that may all lead to a successful completion of the trip. On the other hand, some of the intermediate goals that are possibly achievable by the vehicle may fail to achieve the target driving goal, due to potential violation of the traffic rules and/or collisions with other vehicles. Hence, some intermediate goals may actually be impractical to achieve for the vehicle motion, and if provided to the MPS, the autonomous control of the vehicle would fail.

Therefore, the autonomous vehicle can execute a decision-making system (DMS) configured to select intermediate goals to be tracked by a motion trajectory of a vehicle on its path to a target goal, see for instance US Patent US20210302974, incorporated herein by reference. However, it is difficult in general for the DMS to determine intermediate goals that are achievable by the vehicle, with respect to the vehicle dynamics, with respect to the traffic rules and avoiding collisions with any other traffic participants in the dynamically changing environment, without being too conservative and therefore decreasing optimality of the automated driving system.

To that end, there is a need for a simultaneous vehicle decision making and motion planning system to make discrete decisions about a sequence of intermediate goals while simultaneously computing continuous actions in order to optimally control a motion trajectory that achieves the overall goal of the automated driving system.

Optimization-based decision making, planning and control techniques, such as model predictive control (MPC), allow a model-based design framework in which the system dynamics, the system requirements and constraints can directly be taken into account. This framework has been extended to hybrid dynamical systems, including both continuous and discrete decision variables, which provides a powerful technique to model a large range of problems, e.g., including dynamical systems with mode switching or systems with quantized actuation, problems with logic rules, temporal logic specifications or obstacle avoidance constraints. However, the resulting optimization problems are highly non-convex, and therefore difficult to solve in practice, because they contain variables which only take integer values. When using a linear or linear-quadratic objective in combination with linear system dynamics and linear inequality constraints, the resulting optimal control problem (OCP) can be formulated as a mixed-integer linear program (MILP) or mixed-integer quadratic program (MIQP). More general convex inequality constraints can be included such as quadratic inequality constraints, resulting in a mixed-integer quadratically constrained quadratic program (MIQCQP), or second order cone constraints, resulting in a mixed-integer second order cone program (MISOCP).

Mixed-integer model predictive control (MI-MPC) for simultaneous decision making and motion planning requires the solution of a mixed-integer program (MIP) at every sampling instant within strict timing constraints. This is a difficult task, given that the solution of MIPs is NP-hard in general, and several methods for solving such a sequence of MIPs have been explored in the literature. These approaches can be divided in heuristic techniques, which seek to efficiently find sub-optimal solutions to the problem, and optimization algorithms which attempt to solve the MIPs to optimality. Most mixed-integer optimization algorithms are based on a variant of the branch-and-bound (B&B) technique in order to solve the MIPs to optimality. Variants of the branch-and-bound strategy have been combined with various methods for solving the relaxed convex subproblems, e.g., with dual active-set solvers, interior point algorithms, dual projected gradient methods, nonnegative least squares solvers, and the alternating direction method of multipliers (ADMM). However, the combinatorial complexity of MIPs generally leads to an exponential increase of computation time for B&B methods to solve MIPs with an increasing number of discrete decision variables, limiting the applicability of MIP-based optimal control design in practice.

Examples of heuristic search techniques can be based on rounding and pumping schemes, using approximate optimization algorithms, approximate dynamic programming, or using data-based machine learning techniques, e.g., supervised learning. Using supervised learning to replicate optimal and feasible MIP solutions from B&B methods procured offline and inferring these solutions online at high speed has resulted in dramatic improvement of solution times for mixed-integer optimal control problems (MIOCPs). Alternatively, reinforcement learning techniques have been used to learn tree-search policies to accelerate B&B methods, but these approaches have a limited applicability to real-time embedded systems in practice, because they require at least one forward pass of a predictor, e.g., a neural network, at each node of the B&B tree and, more importantly, these approaches may still require enumerating the full B&B tree in the worst case. To that end, there is a need for a computationally efficient approach that is guaranteed to find a feasible but possibly suboptimal solution to the MIP at each sampling instant, while satisfying the real-time requirements with limited computations due to the limited capabilities of computing and communication platforms in the vehicle. This invention describes a system and a method for simultaneous decision making and motion planning in (semi-)autonomous vehicles, using a combination of a tailored branch-and-bound (B&B) method, including presolve reduction techniques and optimization algorithms to solve convex relaxations of the MIP, and the use of heuristic search techniques to compute feasible but possibly suboptimal solutions, e.g., based on (supervised) machine learning to accelerate the MIP solutions.

SUMMARY

It is an object of some embodiments to provide a simultaneous decision making and motion planning system (DM-MPS) in autonomous vehicles, configured to select discrete decisions about a sequence of intermediate goals while computing continuous actions to optimally control a motion trajectory that achieves the overall goal of the automated driving system. For example, in some embodiments of the invention, the proposed system aims to follow a route from a current position to a desired destination for the vehicle in a transportation network that may include one or multiple road segments, each including one or multiple lanes, one or multiple intersections, and in a dynamically changing environment that includes one or multiple other traffic participants. Hence, it is an object of some embodiments for the DM-MPS to follow the route, while satisfying the kinematic constraints of the vehicle, satisfying traffic rules, and avoiding collisions with any other traffic participants in the environment.

Additionally or alternatively, it is an object of some embodiments to provide such a DM-MPS for which the simultaneous computation of the discrete and continuous decisions is suitable to be executed in real-time by the autonomous vehicle computational unit, in order to account for the need to frequently recompute the discrete decisions and continuous motion trajectory according to the dynamically changing environment. In addition, the DM-MPS needs to always ensure safety, i.e., a simplification of the computations should not jeopardize the safety of actual control of the vehicle. However, a DM-MPS that achieves each of the previously mentioned objectives is challenging to design in practice.

Some embodiments of the invention are based on a transformation for the vehicle and its dynamically changing environment, from a real-world coordinate system to a road-aligned coordinate system, in order to simplify the computations at each sampling instant of the DM-MPS. In some embodiments of the invention, the transformation of the vehicle prediction model leads to updated bound constraints, for example, updated limits on the steering and/or lateral velocity of the vehicle to account for the curvature of the road segments along its route. In addition, due to the transformation of each of the traffic participants and their prediction models, and the transformation of each of the traffic rules, into the road-aligned coordinate system, the safety and traffic rules can be satisfied by the DM-MPS.

Some embodiments of the invention are based on the realization that the transformation to a road-aligned coordinate system allows a simultaneous computation of discrete decisions and continuous actions in the DM-MPS system that can be formulated as a structured mixed-integer linear programming (MILP) or a structured mixed-integer quadratic programming (MIQP) problem, which can be solved efficiently in real time. In addition, in some embodiments of the invention, after solution of the MIP by the DM-MPS system at each sampling instant, the computed motion trajectory is transformed again from the road-aligned coordinate system back to the real-world coordinate system such that the transformed motion trajectory can be executed by the vehicle control system. In some embodiments of the invention, the vehicle control system is implemented using a model predictive controller (MPC), which aims to follow the continuous reference trajectory that is computed by the DM-MPS.

In some embodiments of the invention, a prediction of future positions and/or future velocities for one or multiple traffic participants in the environment needs to be executed by the DM-MPS in order to compute the optimal and safe discrete decisions and continuous actions for the autonomous vehicle over a prediction time window. Some embodiments of the invention are based on the realization that increased safety margins need to be satisfied around the future predictions for the traffic participants, to ensure robust safety given the changing environment, perception errors, unknown disturbances, modeling and prediction errors. In addition, the DM-MPS needs to continuously update the discrete decisions and motion trajectory for the autonomous vehicle in real-time, to be robust against these changes, disturbances and errors in the environment.

In some embodiments of the invention, the DM-MPS system is implemented by solving a block-structured MILP or MIQP at each sampling instant, using a combination of a tailored branch-and-bound (B&B) method, including presolve reduction techniques and optimization algorithms to solve convex relaxations of the MIP, and the use of heuristic search techniques to compute feasible but possibly suboptimal solutions, e.g., based on (supervised) machine learning to accelerate the MIP solutions. Examples of optimization algorithms to solve the convex relaxations are active-set methods, interior point methods, (projected) gradient methods, and the alternating direction method of multipliers (ADMM).

Some embodiments of the invention are based on the realization that presolve reduction techniques can be used to reduce the number of decision variables and/or reduce the number of constraints in the MIP, while maintaining feasibility and optimality. In some embodiments of the invention, a presolve procedure is used in each node of the B&B method to reformulate the MIP into a reduced MIP with fewer variables and/or constraints for which the reduced MIP is infeasible or unbounded only if the original MIP is infeasible or unbounded, and any feasible or optimal solution of the reduced MIP can be mapped to a feasible or optimal solution of the original MIP. Examples of presolve reduction techniques include domain propagation, bound strengthening, dual fixing, implied variable substitution, coefficient strengthening, probing, detection and removal of redundant variables and/or redundant constraints.

Some embodiments of the invention are based on the realization that a mixed-integer convex programming (MICP) problem can be solved efficiently as a convex program (CP) after fixing all discrete variables to a fixed set of values that is provided by a predictor, i.e., after fixing all binary variables to either 0 or 1 and fixing all integer variables to an integer value. Examples of a predictor can be based on (supervised) machine learning, heuristic presolve techniques or warm starting based on the MIP solution at the previous sampling instant. Some embodiments of the invention are based on a predictor that predicts the optimal values for the discrete variables $\delta_i^*$ at each of the time steps i=0, 1, . . . , N in the control horizon of the MIOCP, given a set of values for the problem parameters $\theta$, in order to compute a feasible but possibly suboptimal solution of the MIP at the current sampling instant. Examples of the problem parameters $\theta$ may include the current state of the autonomous vehicle, traffic rules, the current state of other traffic participants, the goal or target state, actuation limits, weight values in the objective function and/or bound values in the mixed-integer inequality constraints of the MI-MPC problem. Some embodiments of the invention are based on the realization that the MIP solution from the predictor can be used to reduce the computations of a tailored B&B method and to guarantee the real-time feasibility of the simultaneous decision making and motion planning system.

Some embodiments are based on the recognition that complexity of real-world traffic scenarios causes an optimization of the simultaneous decision making and motion planning of the vehicle traveling on a road to require solution of a mixed-integer non-convex constrained optimization problem. The mixed-integer non-convex constrained optimization problem is difficult to solve in real-time but, unfortunately, a geometric design of a road defined by one or a combination of an alignment, a profile, and a cross-section of the road, traffic on the road formed by the vehicle as well as other vehicles and pedestrians on the road, and traffic rules for flow of the traffic on the road limiting the actuation of the vehicle form a versatile traffic scenario of great complexity.

In some embodiments of the invention, an example of a mixed-integer non-convex constrained optimization problem includes nonlinear vehicle dynamics and/or nonlinear road boundary constraints in combination with mixed-integer equality and/or inequality constraints to enforce traffic rules such as, e.g., collision avoidance constraints, lane change constraints and/or traffic intersection stopping constraints. Examples of a real-world traffic scenario for vehicle decision making and motion planning can include a (semi-) autonomous vehicle and one or multiple other vehicles driving in a complex environment of one or multiple connected road segments with one or multiple lanes, one or multiple speed zones, one or multiple traffic intersections, one or multiple stopping zones, one or multiple traffic lights and/or one or multiple merging points.

Some embodiments are based on a realization that each real-world traffic scenario can be represented by a set of parameters. Some of the parameters, such as curvature of the road, or shape of the vehicles, can cause the non-convexity of the optimization problem. While other parameters, such as limits on longitudinal velocity and/or acceleration and limits on lateral velocity and/or acceleration are agnostic to the non-convexity, i.e., they do not cause non-convexity of the optimization problem. For example, in some embodiments of the invention, a convex approximation of a non-linear vehicle kinematic model is used that includes a limit on the lateral velocity which is dependent on the longitudinal velocity in order to avoid the non-convexity of the optimization problem.

Some embodiments are based on the realization that the parameters causing the non-convexity can be relaxed in expense to the parameters agnostic to the non-convexity. For example, the parameters of the curvature of a road can be relaxed to make the road straight by tightening limits on the lateral velocity and/or lateral acceleration of the vehicle. Another example, the parameters of a left or right turn at a traffic intersection can be relaxed to make the road straight by tightening limits on the lateral position of the vehicle and/or by tightening limits on the lateral velocity and/or lateral acceleration of the vehicle. Similarly, the parameters of a steering rate limit of a vehicle can be relaxed to make a vehicle model linear by tightening limits on the lateral velocity and/or lateral acceleration of the vehicle. And one more example, the parameters of the physical shape of a vehicle can be relaxed by tightening limits on the position of the vehicle for collision avoidance constraints. In such a manner, the mixed-integer non-convex constrained optimization problem can be transformed into a mixed-integer convex constrained optimization problem by relaxing parameters of the current real-world traffic scenario causing a non-convexity of the mixed-integer non-convex constrained optimization problem and by tightening at least some parameters of the current real-world traffic scenario that are agnostic to the non-convexity of the mixed-integer non-convex constrained optimization problem.

In some embodiments of the invention, the proposed system and method for vehicle decision making and motion planning, at each control time step, uses a transformation from one or multiple parameters in a real-world traffic scenario to a relaxation of the configuration parameters and a tightening of one or multiple limitation parameters in a mixed-integer convex programming (MICP) approximate representation of the real-world traffic scenario. In some embodiments of the invention, the transformation of a real-world traffic scenario of a vehicle motion planning problem with one or multiple other vehicles on a curved road segment leads to an approximate representation of the vehicle motion planning problem with one or multiple other vehicles on a straight road segment with tightened limitation parameter values, e.g., tightened bound values for one or multiple constraint functions in the MICP-based approximate representation of the traffic scenario with a (piecewise) linear dynamical model of the (semi-) autonomous vehicle and a simplified representation of the vehicle's environment in the traffic scenario. The MICP solution includes an optimal motion trajectory for the vehicle, which is additionally transformed back from the approximate representation to the real-world representation of the traffic scenario, according to some embodiments of the invention, in order to control the motion of the (semi-) autonomous vehicle in the real-world traffic scenario.

Some embodiments of the invention are based on the realization that the MICP problem is a convex constrained optimization problem that is computationally cheap to solve for a fixed set of values for each of the integer variables, and therefore computationally efficient branch-and-bound methods and/or machine learning-based techniques can be used to efficiently compute a fixed set of values for each of the integer variables in the optimal MICP solution.

Accordingly, one embodiment discloses a controller for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, the controller comprising: at least one processor; and a memory having instructions stored thereon that, when executed by the at least one processor, cause the controller to: collect parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem; transform the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters; solve the transformed mixed-integer convex optimization problem for the approximate representation of the real-world traffic scenario to produce a current control command for controlling one or multiple actuators of the vehicle; and control the one or multiple actuators of the vehicle according to the control command.

Another embodiment discloses a method for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, wherein the method uses a processor coupled to a memory having instructions stored thereon that, when executed by the processor, carry out steps of the method, comprising:

collecting parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem; transforming the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters; solving the transformed mixed-integer convex optimization problem for the approximate representation of the real-world traffic scenario to produce a current control command for controlling one or multiple actuators of the vehicle; and controlling the one or multiple actuators of the vehicle according to the control command.

Yet another embodiment discloses a non-transitory computer readable storage medium embodied thereon a program executable by a processor for performing a method for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, the method comprising: collecting parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem; transforming the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters; solving the transformed mixed-integer convex optimization problem for the approximate representation of the real-world traffic scenario to produce a current control command for controlling one or multiple actuators of the vehicle; and controlling the one or multiple actuators of the vehicle according to the control command.

DETAILED DESCRIPTION

Figure 1A:
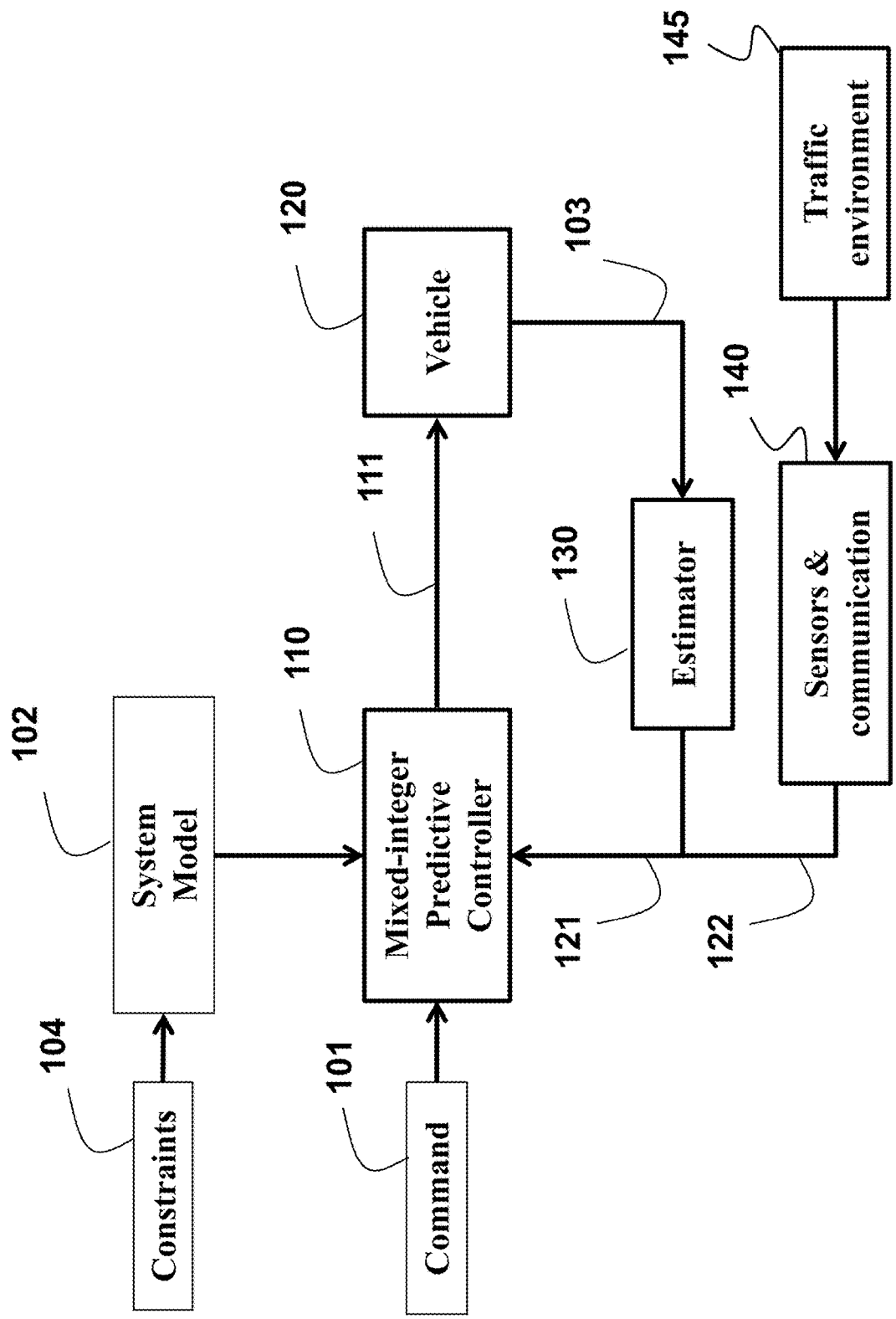
FIG. 1A illustrates a block diagram of a mixed-integer predictive controller and feedback system, according to some embodiments.

Some embodiments of the present disclosure provide a system and a method for controlling an operation of a vehicle using a predictive controller. An example of the predictive controller is a model predictive controller (MPC) determining control inputs based on a model of the controlled vehicle. Another example of the predictive controller is a mixed-integer model predictive controller (MI-MPC) for vehicle decision making, motion planning and/or trajectory generation with continuous and discrete elements of operations.

Some embodiments are based on the recognition that the complexity of real-world traffic scenarios causes an optimization of the simultaneous decision-making and motion planning of the vehicle traveling on a road to require a solution of a mixed-integer non-convex constrained optimization problem. The mixed-integer non-convex constrained optimization problem is difficult to solve in real-time but, unfortunately, a geometric design of a road defined by one or a combination of an alignment, a profile, and a cross-section of the road, traffic on the road formed by the vehicle as well as other vehicles and pedestrians on the road, and traffic rules for the flow of the traffic on the road limiting the actuation of the vehicle form a versatile traffic scenario of great complexity.

In some embodiments of the invention, an example of a mixed-integer non-convex constrained optimization problem includes nonlinear vehicle dynamics and/or nonlinear road boundary constraints in combination with mixed-integer equality and/or inequality constraints to enforce traffic rules such as, e.g., collision avoidance constraints, lane change constraints and/or traffic intersection stopping constraints. Examples of a real-world traffic scenario for vehicle decision-making and motion planning can include a (semi-) autonomous vehicle and one or multiple other vehicles driving in a complex environment of one or multiple connected road segments with one or multiple lanes, one or multiple speed zones, one or multiple traffic intersections, one or multiple stopping zones, one or multiple traffic lights and/or one or multiple merging points.

Some embodiments are based on a realization that each real-world traffic scenario can be represented by a set of parameters. Some of the parameters, such as curvature of the road, or shape of the vehicles, can cause the non-convexity of the optimization problem. While other parameters, such as limits on longitudinal velocity and/or acceleration and limits on lateral velocity and/or acceleration are agnostic to the non-convexity, i.e., they do not cause non-convexity of the optimization problem. For example, in some embodiments of the invention, a convex approximation of a nonlinear vehicle kinematic model is used that includes a limit on the lateral velocity which is dependent on the longitudinal velocity in order to avoid the non-convexity of the optimization problem.

Some embodiments are based on the realization that the parameters causing the non-convexity can be relaxed in expense to the parameters agnostic to the non-convexity. For example, the parameters of the curvature of a road can be relaxed to make the road straight by tightening limits on the lateral velocity and/or lateral acceleration of the vehicle. Another example, the parameters of a left or right turn at a traffic intersection can be relaxed to make the road straight by tightening limits on the lateral position of the vehicle and/or by tightening limits on the lateral velocity and/or lateral acceleration of the vehicle. Similarly, the parameters of a steering rate limit of a vehicle can be relaxed to make a vehicle model linear by tightening limits on the lateral velocity and/or lateral acceleration of the vehicle. And one more example, the parameters of the physical shape of a vehicle can be relaxed by tightening limits on the position of the vehicle for collision avoidance constraints. In such a manner, the mixed-integer non-convex constrained optimization problem can be transformed into a mixed-integer convex constrained optimization problem by relaxing parameters of the current real-world traffic scenario causing a non-convexity of the mixed-integer non-convex constrained optimization problem and by tightening at least some parameters of the current real-world traffic scenario that are agnostic to the non-convexity of the mixed-integer non-convex constrained optimization problem.

In some embodiments of the invention, the proposed system and method for vehicle decision making and motion planning, at each control time step, uses a transformation from one or multiple parameters in a real-world traffic scenario to a relaxation of the configuration parameters and a tightening of one or multiple limitation parameters in a mixed-integer convex programming (MICP) approximate representation of the real-world traffic scenario. In some embodiments of the invention, the transformation of a real-world traffic scenario of a vehicle motion planning problem with one or multiple other vehicles on a curved road segment leads to an approximate representation of the vehicle motion planning problem with one or multiple other vehicles on a straight road segment with tightened limitation parameter values, e.g., tightened bound values for one or multiple constraint functions in the MICP-based approximate representation of the traffic scenario with a (piecewise) linear dynamical model of the (semi-) autonomous vehicle and a simplified representation of the vehicle's environment in the traffic scenario. The MICP solution includes an optimal motion trajectory for the vehicle, which is additionally transformed back from the approximate representation to the real-world representation of the traffic scenario, according to some embodiments of the invention, in order to control the motion of the (semi-) autonomous vehicle in the real-world traffic scenario.

Some embodiments of the invention are based on the realization that the MICP problem is a convex constrained optimization problem that is computationally cheap to solve for a fixed set of values for each of the integer variables, and therefore computationally efficient branch-and-bound methods and/or machine learning-based techniques can be used to efficiently compute a fixed set of values for each of the integer variables in the optimal MICP solution.

FIG. 1A illustrates a block diagram of a predictive controller 110 and feedback system for a controlled (semi-) autonomous vehicle 120, according to some embodiments. FIG. 1A shows an example feedback system including a vehicle 120 connected to the predictive controller 110 via a state estimator 130, and one or multiple sensors and communication devices 140 to obtain feedback signals from a traffic environment 145 of the vehicle 120, according to some embodiments of the invention. Examples of the feedback signals from the traffic environment 145 include a state of one or multiple neighboring vehicles around the controlled vehicle 120, wherein the state includes a position, shape and/or velocity. Other examples of the feedback signals from the environment 145 include one or multiple traffic light signals, which define whether the controlled vehicle 120 is allowed to continue driving or is required to stop for a desired crossing direction through a traffic intersection. Other examples of the feedback signals from the environment 145 include one or multiple traffic signs, for examples, including stop signs, speed limit signs and/or priority traffic signs. In some embodiments of the invention, the sensors and communication devices 140 provide information about a geometric design of a road defined by one or a combination of an alignment, a profile, and a cross-section of the road, traffic on the road formed by the vehicle as well as other vehicles and pedestrians on the road, and traffic rules for flow of the traffic on the road limiting the actuation of the vehicle 120.

In some embodiments of the invention, the predictive controller 110 is an MPC controller programmed according to a dynamical model 102 (or system model) of the controlled vehicle 120. The system model 102 can be a set of equations representing changes of the state and output 103 of the vehicle 120 over time as functions of current and previous inputs 111 and previous outputs 103. The system model 102 can include constraints 104 that represent physical and operational limitations of the system 120. During the operation, the controller 110 receives a command 101 indicating the desired behavior of the vehicle 120. The command can be, for example, a motion command and/or a route in a transportation network to travel from a current position to a desired destination. In response to receiving the command 101, the controller 110 generates a control signal 111 that serves as an input for the controlled vehicle 120. In response to the input, the system updates the output 103 of the vehicle 120. Based on measurements of the output 103 of the vehicle 120, the estimator 130 updates the estimated state 121 of the vehicle 120. This estimated state 121 of the vehicle 120 provides the state feedback to the predictive controller 110. Thus, the predictive controller 110 accepts feedback signal 121 of the vehicle 120, via the estimator 130, where the feedback signal 121 includes measurements of a state of the vehicle 120, and the predictive controller accepts one or multiple feedback signals 122 for the traffic environment 145 of the vehicle 120 using the sensors and communication devices 140.

The controlled system 120, as referred herein, can be any vehicle, including two-wheeler vehicles, such as motor bikes, four-wheeler vehicles, such as passenger cars, or more than four-wheel vehicles, such as trucks and the like. The vehicle 120 is controlled by certain manipulation input signals, e.g. control signal 111 (inputs), possibly associated to physical quantities such as voltages, pressures, forces, torques, and to return some controlled output signals 103 (outputs), possibly associated to physical quantities such as wheel speeds, angular velocities, accelerations, velocities, positions indicative of a transition of a state of the controlled vehicle 120 from a previous state to the current state. The output values are related in part to previous output values of the system, and in part to previous and current input values. The dependency on previous inputs and previous outputs is encoded in the state of the controlled vehicle 120.

The system model 102 may include a set of mathematical equations that describe how the system outputs change over time as functions of current and previous inputs, and the previous outputs. The state of the vehicle 120 is any set of information, in general time varying, for instance an appropriate subset of current and previous inputs and outputs, that, together with the model of the system and future inputs, can uniquely define the future motion of the system.

The controlled vehicle 120 can be subject to physical limitations and specification constraints 104 limiting the range where the outputs, the inputs, and also possibly the states of the system 120 are allowed to operate. Examples of constraints 104 include safety distance constraints, speed limits, acceleration and deceleration constraints, steering rate limits, turning radius constraints, lane change constraints and/or lane change timing constraints.

The controller 110 can be implemented in hardware or as a software program executed in a processor, e.g., a microprocessor, which at fixed or variable control period sampling intervals receives the estimated state 121 of the vehicle 120, one or multiple feedback signals 122 of the traffic environment 145, and the desired motion command 101 and determines, using this information, the inputs, e.g., the control signal 111, for operating the vehicle 120. The controller 110 further solves a mixed-integer optimal control optimization problem, e.g., using branch-and-bound (B&B) optimization that searches for a global optimal solution within a search space to produce a control signal 111, according to some embodiments. The B&B optimization iteratively partitions the search space into a nested tree of regions to find (an approximation of) the globally optimal solution to a mixed-integer programming (MIP) problem. Further, the nested tree of regions is formed by different convex relaxations of integer variables of the mixed-integer optimal control optimization problem. The predictive controller 110, further, controls the vehicle 120 based on the control signal 111 to change the state of the vehicle 120.

In some embodiments of the invention, a feasible but possibly suboptimal approximation of the MIP solution is found using a heuristic search technique to compute a control signal 111, for example, using rounding and pumping schemes, using approximate optimization algorithms, approximate dynamic programming, or using data-based machine learning techniques. For example, supervised learning can be used to train a deep neural network architecture to implement a prediction model that maps a set of parameter values to the MIP solution and/or control signal 111. In some embodiments of the invention, the prediction model may be deterministic, for example, including multi-layer perceptrons, deep sets, convolutional neural networks (CNNs), recurrent neural networks (RNNs), kernel regression, support vector machines, and other machine learning algorithms or any combination of such deterministic prediction models. Alternatively, in some embodiments of the invention, the prediction model may be stochastic, for example, including Bayesian neural networks, neural processes, Gaussian processes, Kriging interpolation, and other machine learning algorithms or any combination of such deterministic and/or stochastic prediction models.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the vehicle 120.

Figure 1B:
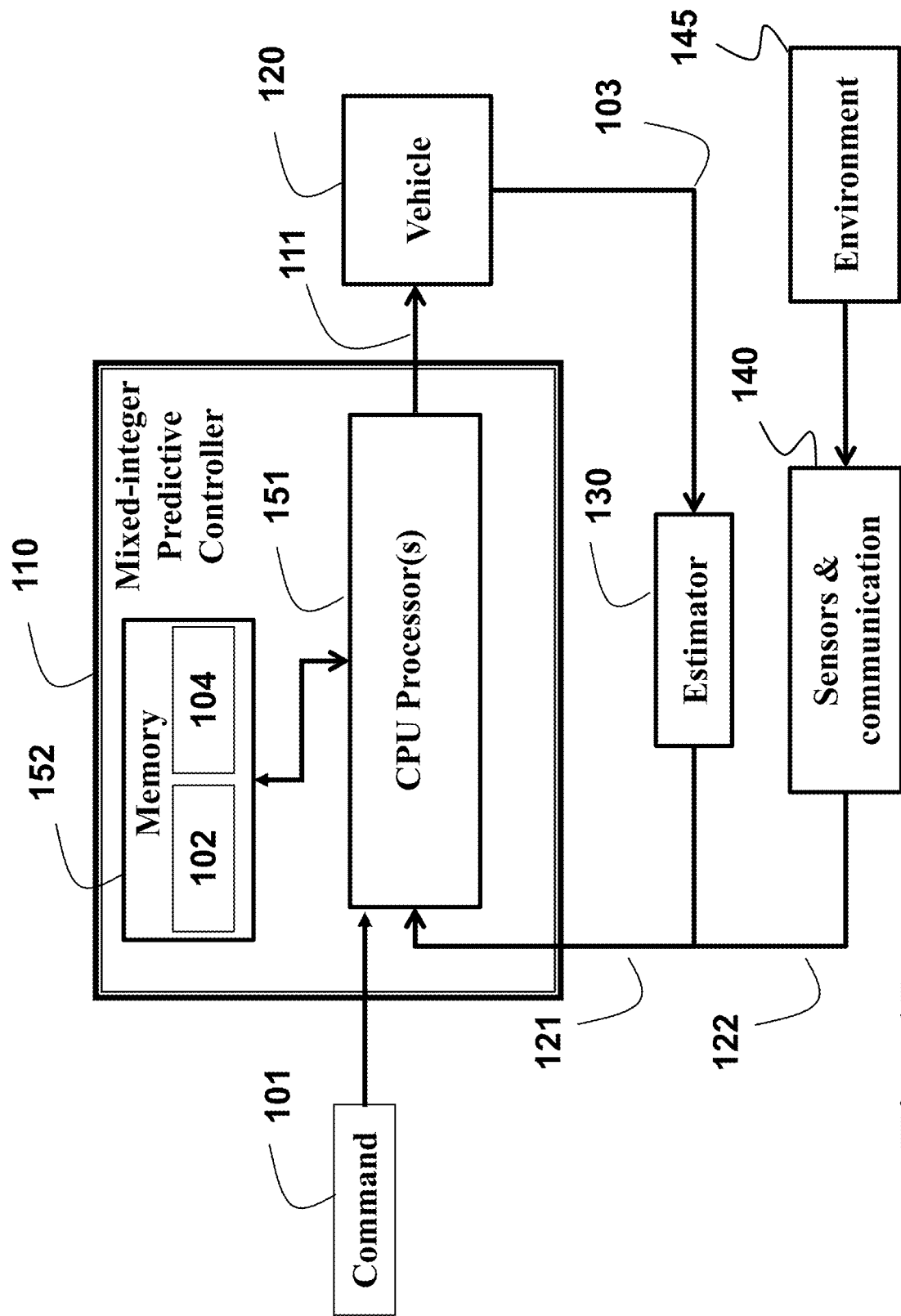
FIGS. 1B and 1C illustrate a block diagram of an implementation of the mixed-integer predictive controller and the feedback system, according to some embodiments of the invention.

FIG. 1B illustrates a block diagram of the predictive controller 110 and the feedback system 120, according to some embodiments. The predictive controller 110 actuates the vehicle 120 such that the estimated state 121 of the vehicle 120 and output 103 follow the command 101. The controller 110 includes a computer, e.g., in the form of a single central processing unit (CPU) or multiple CPU processors 151 connected to memory 152 for storing the system model 102 and the constraints 104 on the operation of the controlled vehicle 120. The CPU processors 151 may be comprised of a single core processor, a multi-core processor, a computing cluster, or any number of other configurations. The memory 152 may include random access memory (RAM), read only memory (ROM), flash memory, or any other suitable memory systems.

Figure 1C:
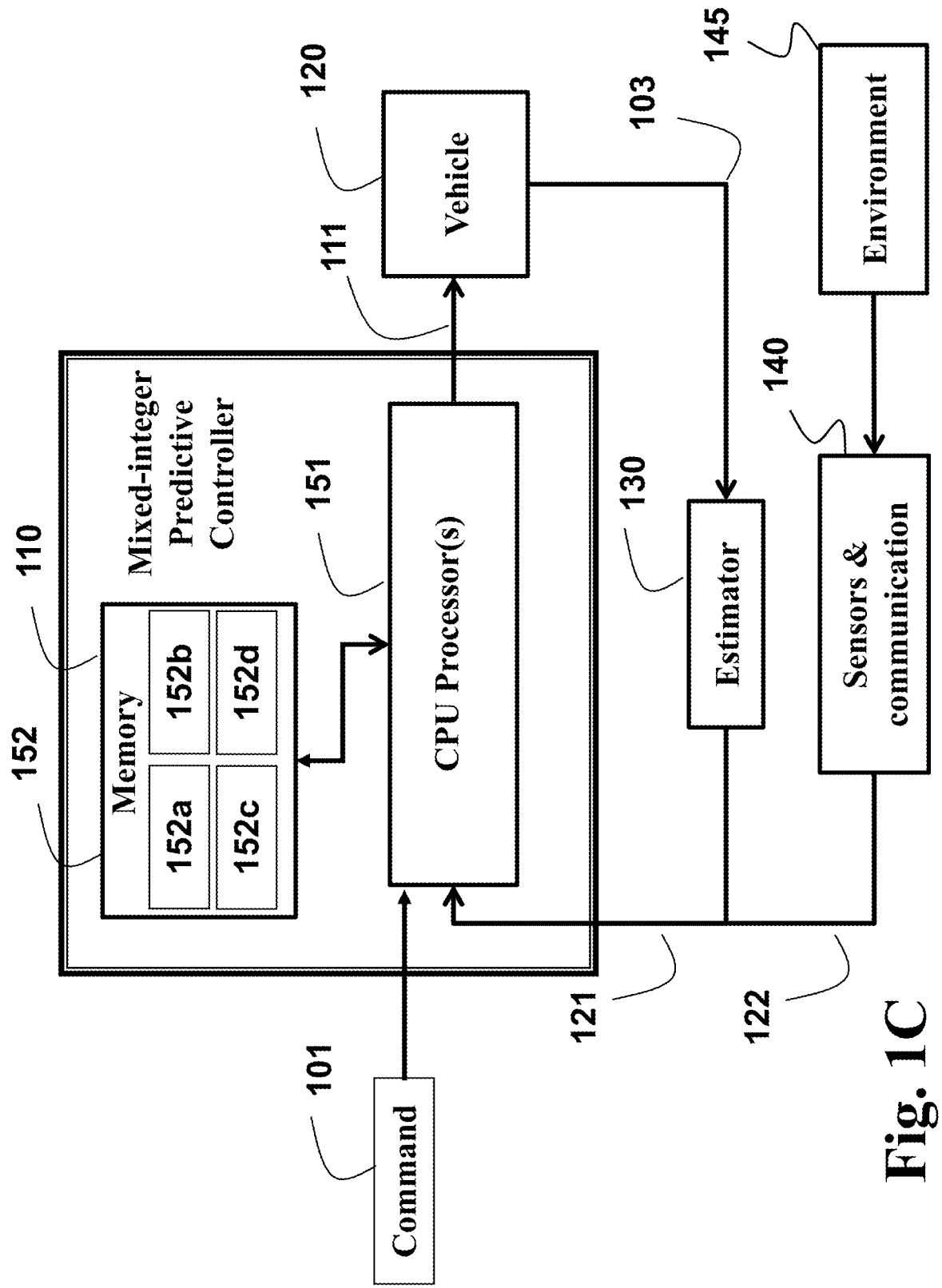

FIG. 1C illustrates a block diagram of the predictive controller 110 and the feedback system 120, where the memory 152 includes one or multiple sections, according to some embodiments. In some embodiments of the invention, the memory 152 includes a first section 152a for storing information about the vehicle and a second section 152b for storing a program for controlling the vehicle, a third section 152c for storing driving map data, and a fourth section 152d for storing motion models of the traffic.

For example, the first section 152a of the memory 152 can store parameters for the behavior of the vehicles, such as maximum acceleration, steering, and steering rate, as well as store a first model of motion of the vehicle and a second model of the motion of the vehicle. In various embodiments, the number and complexity of equations describing the second model of motion of the vehicle is higher than the number and complexity of equations describing the first model of motion of the vehicle. Also, for example, the fourth section 152d of the memory 152 can store a first model of motion of the traffic and a second model of the motion of the traffic.

Still referring to FIG. 1C, in various embodiments, the number and complexity of equations describing the second model of motion of the traffic is higher than the number and complexity of equations describing the first model of motion of the traffic. Those embodiments are based on recognition of the necessity to use different motion models for checking what intermediate objectives the vehicle may be able to achieve in the near future, and for generating the trajectory and for controlling the vehicle according to such a trajectory. For example, in order to check if the vehicle is capable of achieving a sequence of goals, a long future horizon needs to be considered. Having a high order physical model to compute the motion of the vehicle over the extended future horizon is computationally difficult. Conversely, when the immediate goal is known, the control of the vehicle according to the desired trajectory can consider only a short future horizon. To that end, in some embodiments, the controller 110 determines the next goal using the first, i.e., low order motion model, while planning and control uses at least a second, i.e., higher order, motion model.

The second section 152b of the memory 152 can have embodied thereon a program executable by the processor 151 for performing a method for controlling the vehicle 120, according to some embodiments.

Still referring to FIG. 1C, the third section 152c of the memory 152 includes map information, such as addresses and road networks, and it may also include additional information such as intersections, stop and traffic light locations, number and position of lanes, speed limit, traffic rules, curvature of road segments, etc. The map information may be stored already in the third section of the memory 152c when the vehicle starts driving, or alternatively, this information is made available to the control unit by the sensors and communication devices 140.

The processor 151 can be any computational device capable of performing computations, and can include one or many physical devices of the same or of different types. It is possible that the processor 151 can include multiple computational devices, e.g., microprocessors. Similarly, the memory 152 can be any logical memory and/or non-transitory computer readable storage medium capable of storing information, and can include one or more physical information storage means, of the same or of different types. The computations performed by the processor 151 are commanded by the program stored in the second section of the memory 152b, and use the vehicle information stored in the first section of the memory 152a, the information about the map stored in the third section of the memory 152c, the information about the vehicle 152a obtained from the sensor outputs 103, the traffic information 152d of the environment 145 obtained from the sensors and communication devices 140. The computation of the processor 151 results in control inputs 111 that change the motion of the vehicle.

Figure 1D:
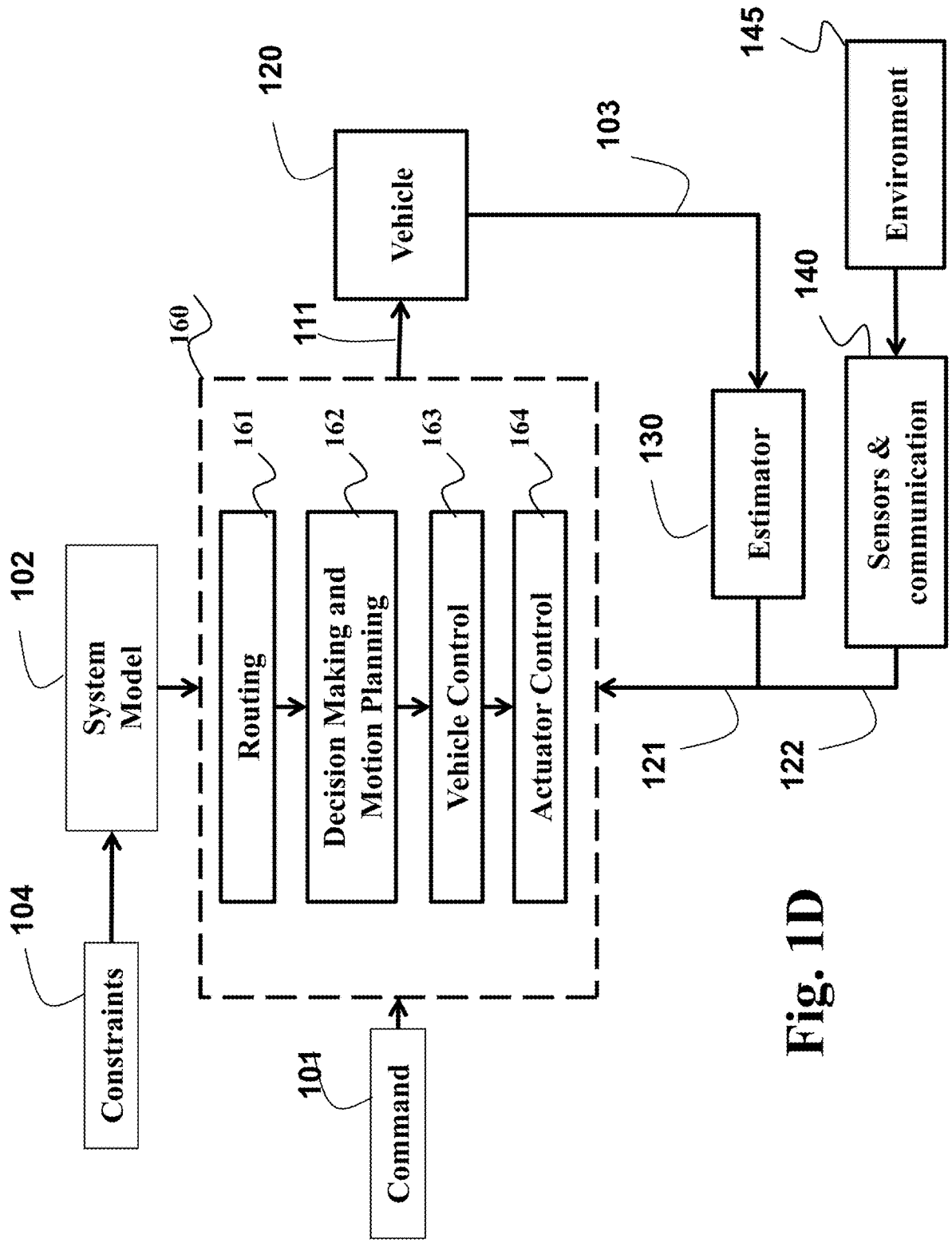
FIG. 1D illustrates a block diagram of a multi-layer control architecture and feedback system, including a vehicle decision making and motion planning system, according to some embodiments of the invention.

FIG. 1D illustrates a block diagram of the feedback control system, including a multi-layer architecture that includes one or multiple components that are coupled with each other, to compute a control signal 111 to control a motion of the vehicle 120, according to some embodiments of the invention. The program executed by the processor 151 enables autonomous driving (AD) of the vehicle 120, where here AD is intended to include also semi-autonomous driving. During this operation, the program executed by the processor 151 aims at achieving a specific overall objective of driving, such as reaching a specific location. The overall objective is achieved by appropriately influencing the motion of the vehicle 120. The software program executed by the processor 151 can logically be separated into multiple modules. For example, in one embodiment, the program executed by the processor includes at least two modules arranged in a sequence as layers such that output of one layer is an input to a next layer. As used herein, such layering specifies layers or logical modules of the control unit 160, and allows separating the control into different stages requiring different information.

FIG. 1D shows a schematic of the layers of a control unit 160 according to one embodiment of the present disclosure. In this embodiment, the control unit 160 includes four layers of the control. The information about the state of the vehicle 121 and the feedback signals 122 of the traffic environment 145 from sensors and communication 140 is provided to each of the different layers. The routing module 161 uses the map information stored in the third section of the memory 152c of FIG. 1C and the current position of the vehicle obtained from sensor outputs 103 to determine a sequence of roads in the road network that the vehicle traverses from its current position to reach its desired destination. The desired destination can be provided for instance by a human user. The routing module can be implemented by a car navigation system. The decision making and motion planning module 162 aims to make discrete decisions about a sequence of intermediate goals while simultaneously computing continuous actions in order to optimally control a motion trajectory that achieves the overall goal of the automated driving system, according to some embodiments of the invention.

In some embodiments of the invention, the decision making and motion planning module 162 uses information from the current state of the vehicle 121, from feedback signals 122 of the traffic environment 145, and from at least a part of the sequence of roads in the road network that the vehicle traverses from its current position to reach its desired destination, and the module 162 determines a sequence of one or more intermediate goals and a sequence of one or more continuous actions, resulting in a feasible and/or optimal motion trajectory that is provided to the vehicle control module 163. The vehicle control module 163 determines commands of the vehicle actuators, such as steering, acceleration, deceleration, that modify the vehicle behavior so that the vehicle achieves an actual trajectory as close as possible to the motion trajectory provided by the decision making and motion planning module 162. The commands to the vehicle actuators are then received by the actuator control sub-module 164 that modifies the control signals to the actuators, such as electric motor voltage, throttle opening, brake pads pressure, to achieve the desired vehicle commands.

In some embodiments of the invention, the decision making and motion planning module 162 is implemented using an MI-MPC controller that solves an MIP at each sampling time period to compute a sequence of discrete decisions and continuous control actions over a prediction time window. In some embodiments of the invention, the vehicle control module 163 is implemented using a linear, linear time-varying or nonlinear MPC controller that solves a convex quadratic programming (QP) or a non-convex nonlinear programming (NLP) problem at each sampling time period to compute a sequence of vehicle actuation commands so that the vehicle achieves an actual trajectory as close as possible to the motion trajectory. Some embodiments of the invention are based on the realization that the NLP can be solved using sequential convex programming (SCP) or sequential quadratic programming (SQP) techniques, and each convex QP subproblem can be solved using a convex optimization algorithm, e.g., active-set solvers, interior point algorithms, projected gradient methods, non-negative least squares solvers, or the alternating direction method of multipliers (ADMM).

Some embodiments of the invention are based on the realization that the decision making and motion planning module 162 uses a first model of motion of the vehicle in combination with a first model of motion of the traffic environment, and the vehicle control module 163 uses a second model of motion of the vehicle in combination with a second model of motion of the traffic environment. The number and complexity of equations describing the second model of motion of the vehicle is higher than the number and complexity of equations describing the first model of motion of the vehicle. The number and complexity of equations describing the second model of motion of the traffic is higher than the number and complexity of equations describing the first model of motion of the traffic.

In some embodiments of the invention, the length of a prediction time window in the decision making and motion planning module 162 is longer than the length of a prediction time window in the vehicle control module 163. Similarly, in some embodiments of the invention, the length of a sampling time period in the decision making and motion planning module 162 is longer than the length of a sampling time period in the vehicle control module 163. For example, in some embodiments of the invention, the prediction time window is 10-20 seconds long for the decision making and motion planning module 162 and the prediction time window is 2-4 seconds long for the vehicle control module 163. In addition, in some embodiments of the invention, the sampling time period is 0.25-0.5 seconds long for the decision making and motion planning module 162 and the sampling time period is 0.025-0.05 seconds long for the vehicle control module 163.

Figure 2A:
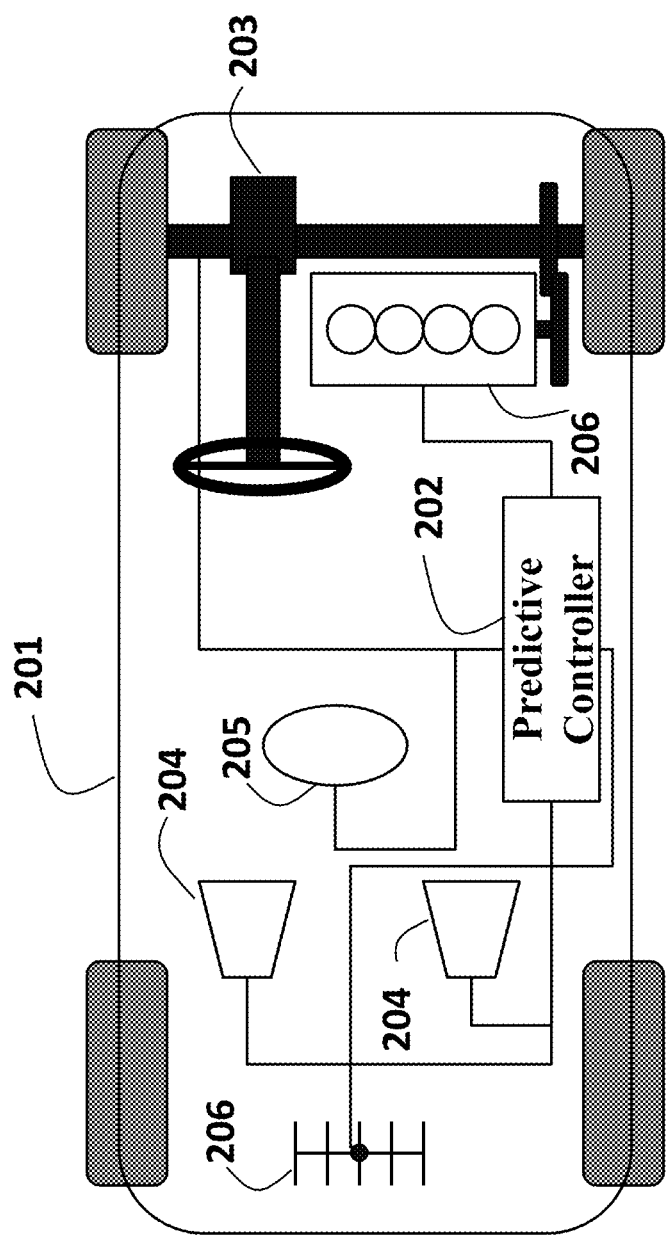
FIG. 2A illustrates a schematic of a vehicle including a predictive controller employing principles of some embodiments.

FIG. 2A illustrates a schematic of a vehicle 201 including a predictive controller 202 employing principles of some embodiments of the invention. As used herein, the vehicle 201 can be any type of wheeled vehicle, such as a passenger car, bus, or rover. Also, the vehicle 201 can be an autonomous or semi-autonomous vehicle. For example, some embodiments control the motion of the vehicle 201. Examples of the motion include lateral motion of the vehicle controlled by a steering system 203 of the vehicle 201. In one embodiment, the steering system 203 is controlled by the controller 202. Additionally or alternatively, the steering system 203 can be controlled by a driver of the vehicle 201.

The vehicle can also include an engine 206, which can be controlled by the controller 202 or by other components of the vehicle 201. The vehicle can also include one or more sensors 204 to sense the surrounding environment in a traffic scenario, e.g., including other vehicles, traffic signs, traffic light signals, lane boundaries and/or road curvature. Examples of the sensors 204 include distance range finders, radars, lidars, and cameras. The vehicle 201 can also include one or more sensors 205 to sense its current motion quantities and internal status. Examples of the sensors 205 include global positioning system (GPS), accelerometers, inertial measurement units, gyroscopes, shaft rotational sensors, torque sensors, deflection sensors, pressure sensor, and flow sensors. The sensors provide information to the controller 202. The vehicle can be equipped with a transceiver 206 enabling communication capabilities of the controller 202 through wired or wireless communication channels.

Figure 2B:
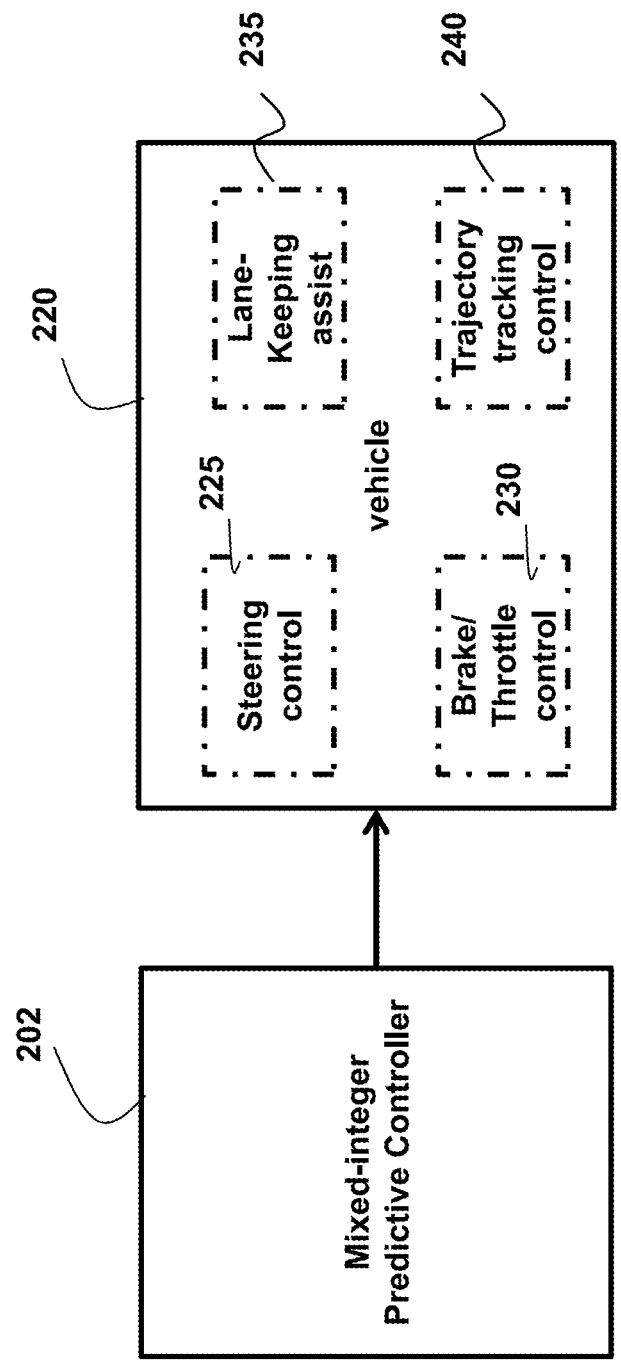
FIG. 2B illustrates a schematic of interaction between the predictive controller and other controllers of the vehicle, according to some embodiments.

FIG. 2B illustrates a schematic of interaction between the controller 202 (i.e., a mixed-integer predictive controller) and other controllers 220 of the vehicle 201, according to some embodiments. In some embodiments of the invention, the other controllers 220 include a vehicle control module 163 and/or an actuator control module 164 as illustrated in FIG. 1D. For example, in some embodiments of the invention, the controllers 220 of the vehicle 201 are steering 225 and brake/throttle controllers 230 that control rotation and acceleration of the vehicle 201, respectively. In such a case, the mixed-integer predictive controller 202 outputs control inputs to the controllers 225 and 230 to control the state of the vehicle 201.

In some embodiments of the invention, the controllers 220 include high-level controllers, e.g., a lane-keeping assist controller 235 and/or a reference trajectory tracking controller 240, that further process the control inputs of the mixed-integer predictive controller 202. In some embodiments of the invention, the controllers 220 use the outputs of the mixed-integer predictive controller 202 to control at least one actuator of the vehicle 201, such as the steering wheel and/or the brakes of the vehicle 201, in order to control the motion of the vehicle 201. Further, the mixed-integer predictive controller 202 determines an input to the vehicle 201 based on a mixed-integer control solution, where the input to the vehicle 201 includes one or a combination of an acceleration of the vehicle 201, an engine torque of the vehicle 201, brake torques, and a steering angle, and the discrete optimization variables to model one or a combination of discrete control decisions, switching in the system dynamics, gear shifting, lane change commands, and obstacle avoidance constraints.

In some embodiments of the invention, the reference trajectory tracking controller 240 is implemented using a linear, linear time-varying or nonlinear MPC controller that solves a convex quadratic programming (QP) or a nonconvex nonlinear programming (NLP) problem at each sampling time period to compute a sequence of vehicle actuation commands so that the vehicle achieves an actual trajectory as close as possible to a motion trajectory that is computed by the mixed-integer predictive controller 202. Some embodiments of the invention are based on the realization that the NLP can be solved using sequential convex programming (SCP) or sequential quadratic programming (SQP) techniques, and each convex QP subproblem can be solved using a convex optimization algorithm, e.g., active-set solvers, interior point algorithms, projected gradient methods, nonnegative least squares solvers, or the alternating direction method of multipliers (ADMM).

Figure 2C:
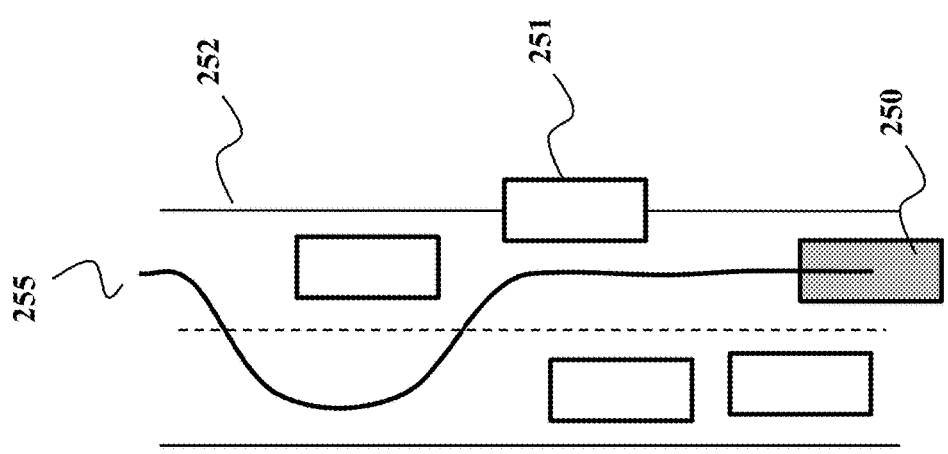
FIG. 2C illustrates a schematic of a path and/or motion planning method for a controlled vehicle employing principles of some embodiments.

FIG. 2C illustrates a schematic of a path and/or motion planning method for a controlled vehicle employing principles of some embodiments. Further, FIG. 2C illustrates a schematic of an autonomous or semi-autonomous controlled vehicle 250 for which a dynamically feasible, and often optimal trajectory 255 can be computed by using embodiments of the present disclosure. The generated trajectory aims to keep the vehicle within particular road bounds 252, and aims to avoid other controlled and/or uncontrolled vehicles, i.e., these vehicles are obstacles 251 for this particular controlled vehicle 250. In some embodiments, each of the obstacles 251 can be represented by one or multiple inequality constraints in a time or space formulation of the constrained mixed-integer programming problem, including one or multiple additional discrete variables for each of the obstacles. For example, based on embodiments configured to implement a mixed-integer model predictive controller, the autonomous or semi-autonomous controlled vehicle 250 can make discrete decisions in real time such as, e.g., decide whether to perform lane changing, lane keeping or stopping, pass another vehicle on the left or on the right side or instead to stay behind another vehicle within the current lane of the road 252, while additionally making continuous decisions in real time such as, e.g., the velocity, acceleration or steering inputs to control the motion of the vehicle 250.

Figure 2D:
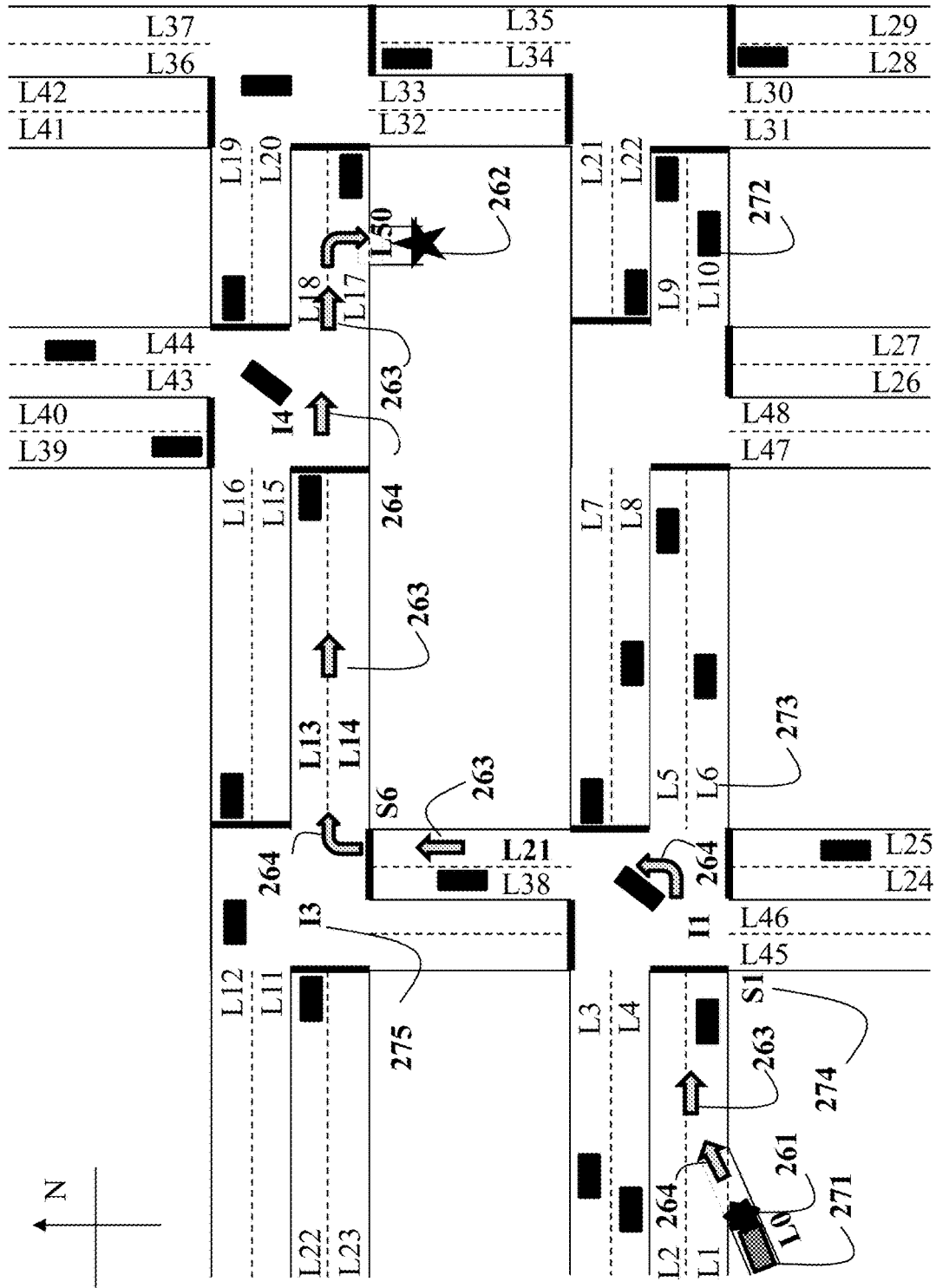
FIG. 2D illustrates an exemplary traffic scene for a single- or multi-vehicle decision making module based on some embodiments.

FIG. 2D illustrates an exemplary traffic scene for a single- or multi-vehicle decision making module based on some embodiments. The FIG. 2D depicts a scenario with one or multiple vehicles under control, referred to as an ego vehicle 271, with the traffic composed of other vehicles shown similar to 272, lanes marked for instance 273 as L6, stop lines marked for instance 274 as S1, intersections marked for instance 275 as I3. For the vehicle in position 261, with final destination 262, a routing module 161 provides the sequence of roads indicated by arrows 263, and the sequence of turns indicated by arrows 264. It should be noted however that the sequence of roads 263 and the sequence of turns 264 does not by itself specify a trajectory or a path for the vehicle. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions highly depend on the current traffic at the moment when the vehicle reaches the corresponding location, which is in general unknown to a routing module due to the uncertainty of traffic motion and uncertainty of the moment at which the vehicle will reach the location. In some embodiments of the present disclosure, a motion plan can be computed for one or multiple controlled ego vehicles 271, possibly with communication to allow for coordination between the vehicles (V2V) and/or between a smart infrastructure system and the vehicles (V2X), by solving one or multiple connected mixed-integer programming problems.

Some embodiments of the invention are based on the realization that, depending on the sensing infrastructure of the transportation network, obtaining a precise prediction for the behavior of one or multiple other vehicles, e.g., human-driven vehicles (HDVs) in the traffic environment in a neighborhood of the controlled vehicle 120 may prove challenging. Because of this realization, in some embodiments of the invention, the vehicle decision making and motion planning system (DM-MPS) is implemented as a mixed-integer predictive controller 110 in a receding horizon fashion, in which a constrained MIP is solved at each sampling time step based on the most recent information from sensors and communication devices 140. For example, in some embodiments of the invention, the sampling time period is 0.25-0.5 seconds long for the decision making and motion planning module 162 and the sampling time period is 0.025-0.05 seconds long for the vehicle control module 163. Any discrepancies in the predictions for the behavior of one or multiple other vehicles can be adjusted by the intrinsic feedback mechanism of the receding horizon strategy for the vehicle control architecture that includes at least a decision making and motion planning module 162 and a vehicle control module 163.

Figure 3A:
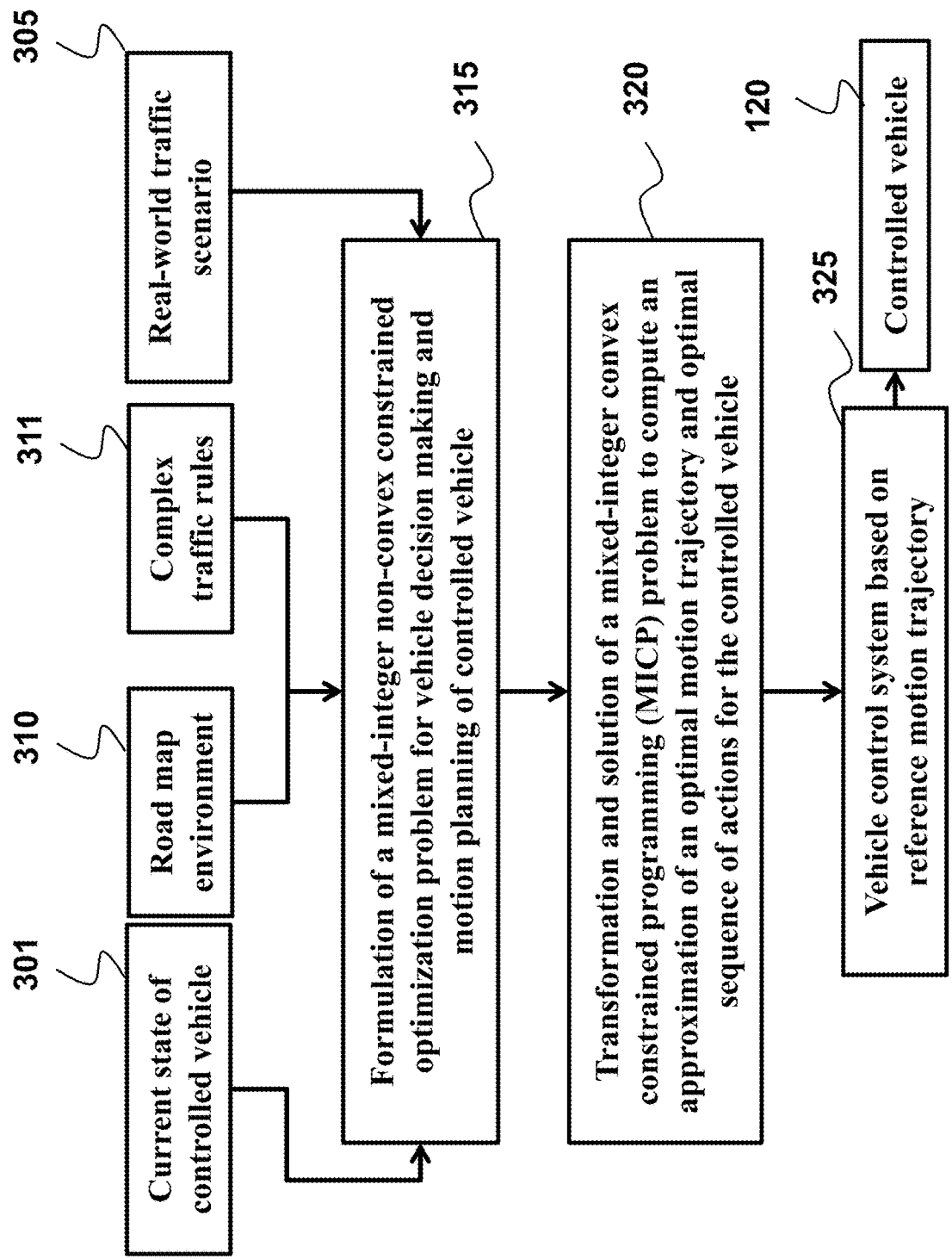
FIG. 3A shows a block diagram of a transformation from a real-world representation to an approximate representation of a constrained optimization problem in a vehicle decision making and motion planning system for the controlled vehicle, according to some embodiments of the invention.

FIG. 3A shows a block diagram of a transformation from a real-world representation to an approximate representation of a constrained optimization problem in a vehicle decision making and motion planning system for the controlled vehicle, according to some embodiments of the invention. Some embodiments are based on the recognition that complexity of a real-world traffic scenario 305 in a road map environment 310 and the need for a controlled vehicle 120 to satisfy complex traffic rules 311 causes a constrained optimization of the simultaneous decision making and motion planning of the vehicle traveling on a road to require formulation and solution of a mixed-integer non-convex constrained optimization problem 315, given a current state of the controlled vehicle 301. The mixed-integer non-convex constrained optimization problem 315 is difficult to solve in real-time but, unfortunately, a geometric design of a road map environment 310 defined by one or a combination of an alignment, a profile, and a cross-section of the road, traffic on the road formed by the vehicle as well as other vehicles and pedestrians in a real-world traffic scenario 305, and complex traffic rules 311 on the road limiting the actuation of the vehicle form a vehicle decision making and motion planning problem of great complexity.

In some embodiments of the invention, a transformation and solution of a mixed-integer convex programming (MICP) problem is used instead to compute an approximation of an optimal motion trajectory and optimal sequence of actions for the controlled vehicle 320, such that an approximation to the mixed-integer non-convex constrained optimization problem 315 can be computed in a computationally efficient manner. The MICP solution 320 includes a reference motion trajectory that is used by a vehicle control system 325 so that the controlled vehicle 120 achieves an actual trajectory as close as possible to the motion trajectory provided by the decision making and motion planning module as described in FIG. 1D, according to some embodiments of the invention.

In some embodiments of the invention, an example of a mixed-integer non-convex constrained optimization problem includes nonlinear vehicle dynamics and/or nonlinear road boundary constraints in combination with mixed-integer equality and/or inequality constraints to enforce traffic rules such as, e.g., collision avoidance constraints, lane change constraints and/or traffic intersection stopping constraints. Examples of a real-world traffic scenario for vehicle decision making and motion planning can include a (semi-) autonomous vehicle and one or multiple other vehicles driving in a complex environment of one or multiple connected road segments with one or multiple lanes, one or multiple speed zones, one or multiple traffic intersections, one or multiple stopping zones, one or multiple traffic lights and/or one or multiple merging points.

In some embodiments of the invention, the proposed vehicle decision making and motion planning system is implemented using a predetermined traffic scenario that results in a mixed-integer convex optimization problem, and the transformation and solution procedure 320 transforms one or multiple parameters of the current real-world traffic scenario into one or multiple parameters of the predetermined traffic scenario, and the resulting MICP forms an approximate representation of a constrained optimization problem in a vehicle decision making and motion planning system for a real-world traffic scenario of a controlled vehicle, according to some embodiments of the invention. For example, in some embodiments of the invention, the predetermined traffic scenario includes a controlled vehicle on a straight road segment with one or multiple lanes, using a road-aligned coordinate system, and including a predicted motion trajectory for one or multiple other vehicles and/or traffic participants, one or multiple obstacle avoidance constraints for the controlled vehicle to remain outside of a safety region around the predicted motion trajectory of the one or multiple other vehicles and/or traffic participants, one or multiple conflict zone constraints for each traffic intersection and/or merging point, and one or multiple space-dependent zone constraints along a future planned route of the controlled vehicle in the transportation network.

Figure 3B:
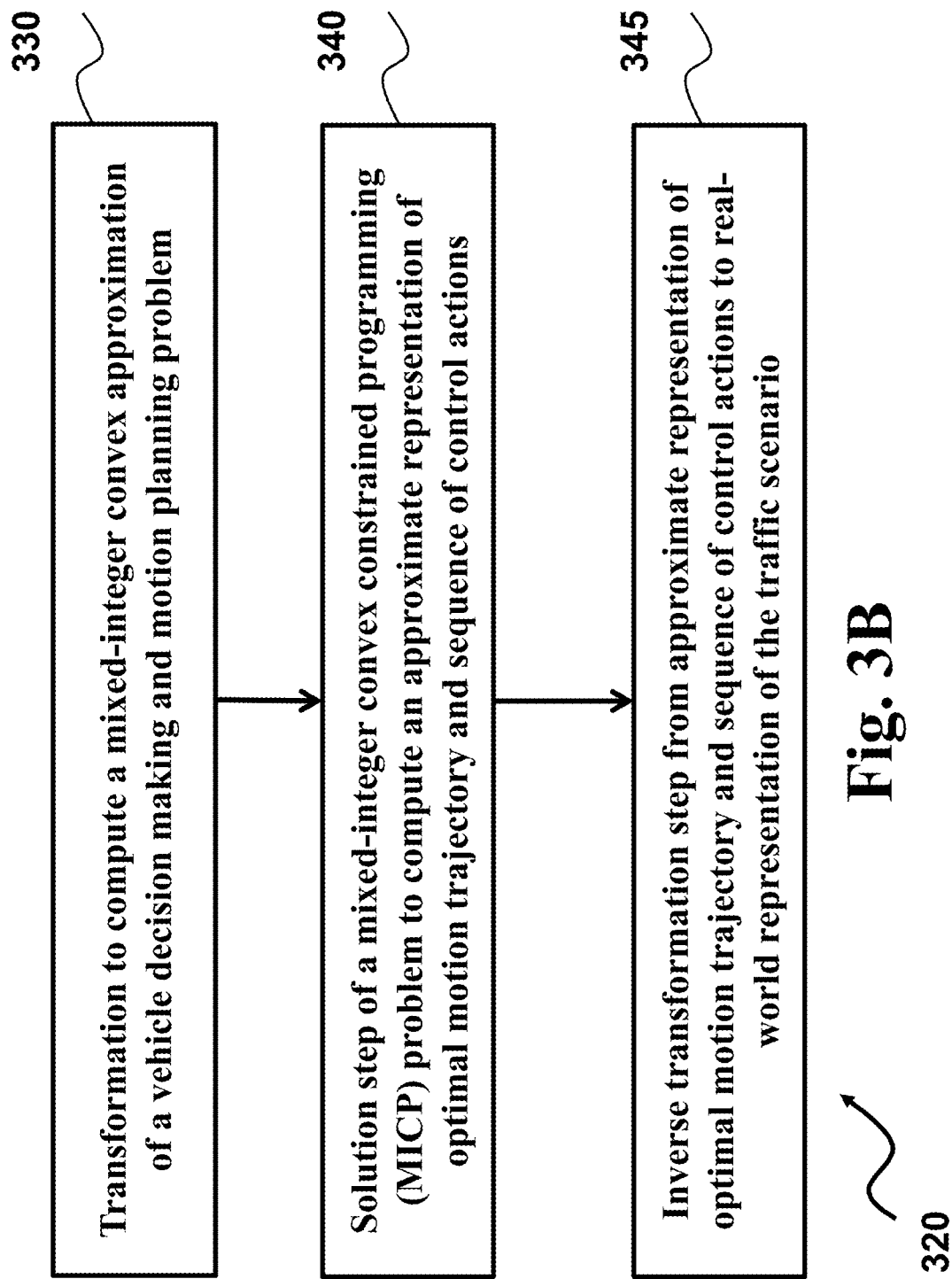
FIG. 3B shows a block diagram of a transformation and solution strategy, including a first transformation step, a solution step of an MICP problem, followed by a second inverse transformation step to compute an optimal motion trajectory and sequence of control actions in the real-world traffic scenario.

FIG. 3B shows a block diagram of a transformation and solution strategy to compute an approximation of an optimal motion trajectory and optimal sequence of actions for the controlled vehicle 320, including a first transformation step to compute a mixed-integer convex approximation of a vehicle decision making and motion planning problem 330, a solution step of an MICP problem to compute an approximate representation of an optimal motion trajectory and sequence of control actions 340, followed by a second inverse transformation step from an approximate representation of the optimal motion trajectory and sequence of control actions to a real-world representation of the traffic scenario 345.

For example, in some embodiments of the invention, a first transformation step 330 includes a transformation for the vehicle and its dynamically changing environment from a real-world coordinate system to a road-aligned coordinate system in order to reduce the computational cost of the DM-MPS system at each sampling time instant. Some embodiments of the invention are based on the realization that the first transformation step 330 needs to be applied to all components in a complex traffic scenario 305, e.g., including the road map environment 310, the current positions and future predicted positions of other traffic participants, and complex traffic rules 311 such as safety constraints for collision avoidance, lane change behavior, speed zones, the traffic intersections and traffic light behavior, stopping zone behavior and/or merging points. In some embodiments of the invention, the first transformation step 330 of the vehicle prediction model leads to updated bound constraints, for example, updated limits on the steering and/or lateral velocity of the controlled vehicle 120 to account for a curvature of a road segment along its route.

Some embodiments of the invention are based on the realization that real-world safety and traffic rules can be satisfied by the DM-MPS by using the first transformation step to compute a mixed-integer convex approximation of a vehicle decision making and motion planning problem 330 including each of the traffic participants and their prediction models and including a convex approximation of each of the traffic rules using a road-aligned coordinate system. In some embodiments of the invention, a convex approximation of each of the traffic rules is used in a first transformation step 330 to conservatively satisfy each of the safety and traffic rules in a real-world representation of the traffic scenario 345.

Some embodiments of the invention are based on the realization that a first transformation step 330 allows a simultaneous computation of discrete decisions and continuous actions in the DM-MPS system that can be formulated as a structured mixed-integer linear programming (MILP), a structured mixed-integer quadratic programming (MIQP), or a structured mixed-integer quadratically constrained quadratic programming (MIQCQP) problem that can be solved efficiently, e.g., using a branch-and-bound optimization method. In some embodiments of the invention, after computation of a solution to the MICP 340 at each sampling time instant of the DM-MPS system, a second inverse transformation step is used from an approximate representation of the optimal motion trajectory and sequence of control actions using a road-aligned coordinate system to a real-world representation of the optimal motion trajectory 345 such that the transformed motion trajectory can be executed by the vehicle control system 325. In some embodiments of the invention, the vehicle control system is implemented using a model predictive controller (MPC), which aims to follow the continuous reference trajectory that is computed by the DM-MPS module.

Figure 3C:
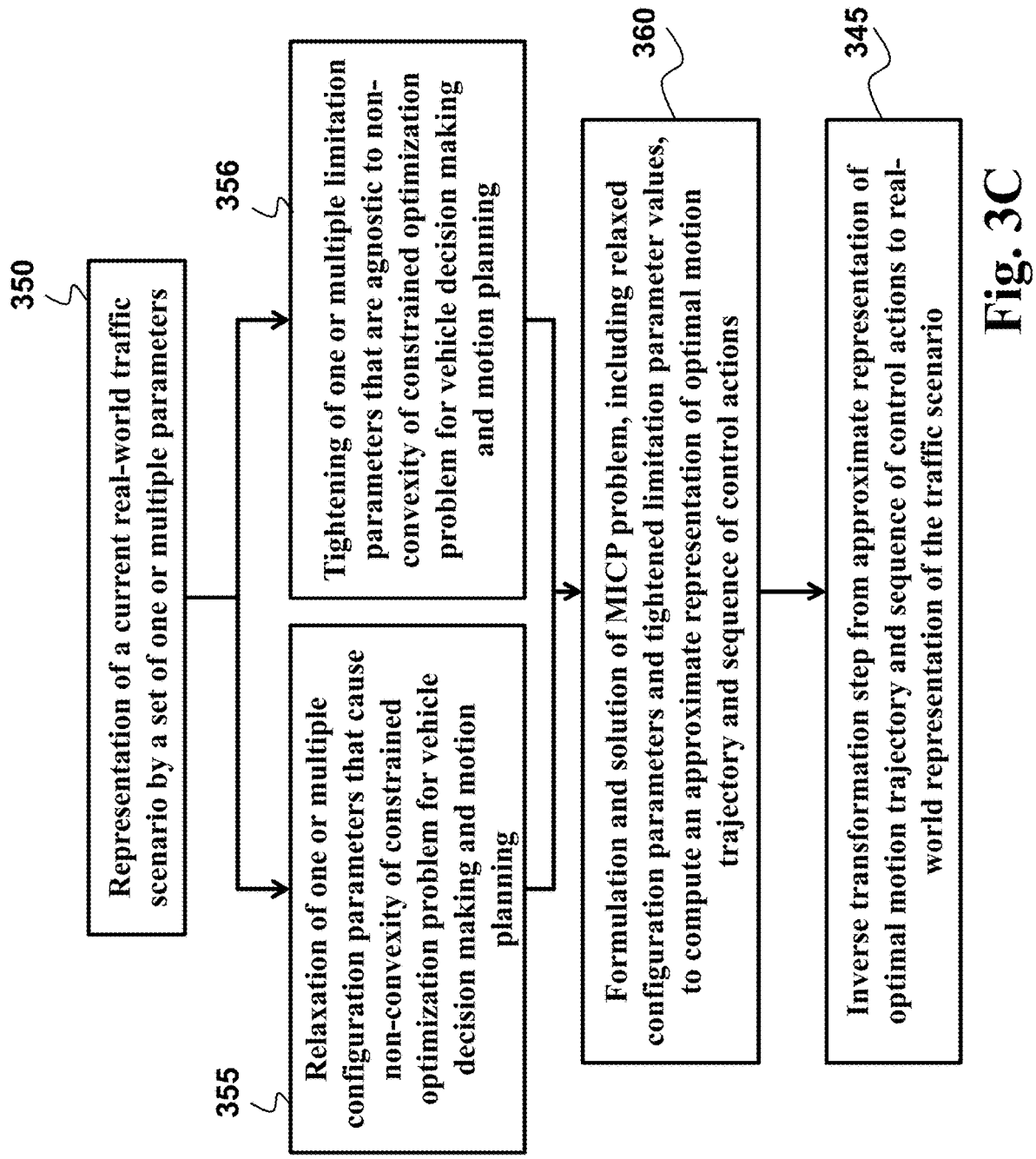
FIG. 3C shows a block diagram of a transformation and solution strategy, including a relaxation of one or multiple configuration parameters that cause a non-convexity and including a tightening of one or multiple limitation parameters that are agnostic to a non-convexity of the constrained optimization problem for vehicle decision making and motion planning, according to some embodiments.

FIG. 3C shows a block diagram of a transformation and solution strategy to compute an approximation of an optimal motion trajectory and optimal sequence of actions for the controlled vehicle 360, including a relaxation of one or multiple configuration parameters that cause a non-convexity of the constrained optimization problem 355 and including a tightening of one or multiple limitation parameters that are agnostic to a non-convexity of the constrained optimization problem for vehicle decision making and motion planning 356, according to some embodiments of the invention. In some embodiments of the invention, the vehicle decision making and motion planning system is based on a formulation and solution of an MICP problem, including relaxed configuration parameters 355 and tightened limitation parameter values 356, to compute an approximate representation of optimal motion trajectory and sequence of control actions 360, followed by a second inverse transformation step from an approximate representation of the optimal motion trajectory and sequence of control actions to a real-world representation of the traffic scenario 345.

Some embodiments are based on a realization that each real-world traffic scenario can be represented by a set of one or multiple parameters 350. Some of the parameters, such as curvature of the road, or shape of the vehicles, can cause a non-convexity of the constrained optimization problem for vehicle decision making and motion planning. While other parameters, such as limits on longitudinal velocity and/or acceleration and limits on lateral velocity and/or acceleration are agnostic to a non-convexity, i.e., they do not cause non-convexity of the optimization problem. For example, in some embodiments of the invention, a convex approximation of a nonlinear vehicle kinematic model is used that includes a limit on the lateral velocity which is dependent on the longitudinal velocity in order to avoid a non-convexity of the optimization problem. Some embodiments are based on the realization that one or multiple configuration parameters causing a non-convexity can be relaxed 355 in expense to a tightening of one or multiple limitation parameters agnostic to the non-convexity 356. For example, in some embodiments of the invention, the configuration parameters of the curvature of a road can be relaxed to make the road straight by tightening limits on the lateral velocity and/or lateral acceleration of the vehicle. Another example, in some embodiments of the invention, the parameters of a left or right turn at a traffic intersection can be relaxed to make the road straight by tightening limits on the lateral position of the vehicle and/or by tightening limits on the lateral velocity and/or lateral acceleration of the vehicle. Similarly, the parameters of a steering rate limit of a vehicle can be relaxed to make a vehicle model linear by tightening limits on the lateral velocity and/or lateral acceleration of the vehicle. And one more example, in some embodiments of the invention, the parameters of the physical shape of a vehicle can be relaxed by tightening limits on the position of the vehicle for collision avoidance constraints. In such a manner, the mixed-integer non-convex constrained optimization problem can be transformed into a mixed-integer convex constrained optimization problem by relaxing parameters of the current real-world traffic scenario causing a non-convexity of the mixed-integer non-convex constrained optimization problem and by tightening at least some parameters of the current real-world traffic scenario that are agnostic to the non-convexity of the mixed-integer non-convex constrained optimization problem.

In some embodiments of the invention, the proposed system and method for vehicle decision making and motion planning, at each control time step, uses a transformation from a set of one or multiple parameters in a real-world traffic scenario 350 to a relaxation of the configuration parameters 355 and a tightening of one or multiple limitation parameters 356 in a mixed-integer convex programming (MICP) approximate representation 360 of the real-world traffic scenario. In some embodiments of the invention, the transformation of a real-world traffic scenario of a vehicle motion planning problem with one or multiple other vehicles on a curved road segment leads to an approximate representation of the vehicle motion planning problem with one or multiple other vehicles on a straight road segment with tightened limitation parameter values, e.g., tightened bound values for one or multiple constraint functions in the MICP-based approximate representation of the traffic scenario with a (piecewise) linear dynamical model of the (semi-)autonomous vehicle and a simplified representation of the vehicle's environment in the traffic scenario. The MICP solution 360 includes an optimal motion trajectory and a sequence of control actions for the vehicle, which is additionally transformed back from the approximate representation to the real-world representation of the traffic scenario 345, according to some embodiments of the invention, in order to control the motion of the (semi-) autonomous vehicle in the real-world traffic scenario.

Some embodiments of the invention are based on the realization that the MICP problem is a convex constrained optimization problem that is computationally cheap to solve for a fixed set of values for each of the integer variables, and therefore computationally efficient branch-and-bound methods and/or machine learning-based techniques can be used to efficiently compute a fixed set of values for each of the optimization variables in the optimal MICP solution.

Figure 4A:
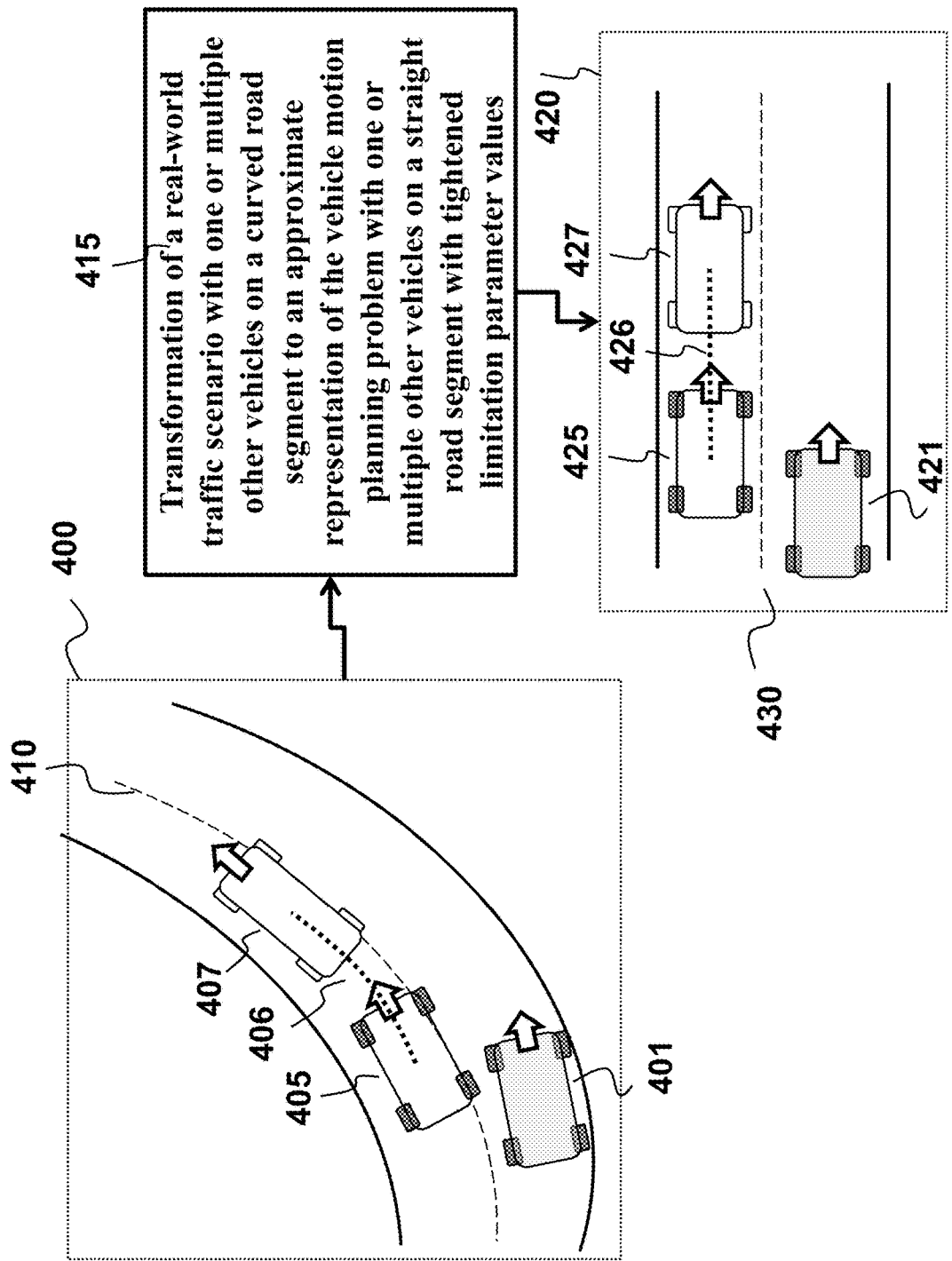
FIG. 4A illustrates a transformation of a vehicle decision making and motion planning problem in an exemplary traffic scenario with one or multiple other vehicles on a curved road segment from a real-world representation to an approximate representation with tightened limitation parameter values in a constrained mixed-integer convex optimization problem.

FIG. 4A illustrates a transformation 415 of a vehicle decision making and motion planning problem in an exemplary traffic scenario with one or multiple other vehicles on a curved road segment 410 from a real-world representation 400 to an approximate representation 420 of the vehicle motion planning problem with one or multiple other vehicles on a straight road segment 430 with tightened limitation parameter values in a constrained mixed-integer convex optimization problem, according to some embodiments of the invention. More specifically, the real-world traffic scenario 400 includes a curved road segment 410 with one or multiple lanes, a controlled vehicle 401 and one or multiple other vehicles 405. In some embodiments of the invention, a predicted motion trajectory 406 can be computed for each of the other vehicles from a current time step 405 to one or multiple future time steps 407 in a prediction time horizon.

In some embodiments of the invention, the predicted motion trajectory 406 is computed using a closed-loop kinematic vehicle model for lane keeping, based on a modeling assumption that each of the other vehicles will remain in the current lane during the prediction time horizon. Some embodiments of the invention are based on the realization that approximation errors in a prediction model for other vehicles can be corrected based on the receding horizon implementation of the vehicle decision making and motion planning system. In some embodiments of the invention, the predicted motion trajectory 406 is computed using a data-based vehicle model that aims to predict the behavior of a human driver, e.g., using deep learning, support vector machines, neural networks, neural processes, Gaussian processes, and other machine learning algorithms or any combination of such deterministic and/or stochastic prediction models. The data-based vehicle model can include both lane keeping, cruise control, stopping and/or lane change behavior modeling, according to some embodiments of the invention.

In some embodiments of the invention, a prediction model for one or multiple other vehicles takes into account the interaction between other vehicles, between vehicles and the traffic environment (e.g., traffic lights at intersections, speed limits) and/or the interaction between the controlled vehicle and the one or multiple other vehicles, for example, a vehicle slowing down may cause one or multiple other vehicles to slow down, or a lane change by one vehicle may cause a reaction, e.g., a slowdown by one or multiple other vehicles. In some embodiments of the invention, a reactive and/or interactive prediction model is implemented using a switched dynamical system of equations that enables switching between different modes of behavior modeling depending on the actions of other vehicles and/or depending on changes in the traffic environment.

In some embodiments of the invention, the transformation step 415 computes an approximate representation 420 of the vehicle motion planning problem including a straight road segment 430 with one or multiple lanes, a controlled vehicle 421, one or multiple other vehicles 425, and/or a predicted motion trajectory 426 can be computed in the approximate representation 420 for each of the other vehicles from a current time step 425 to one or multiple future time steps 427 in a prediction time horizon. For example, in some embodiments of the invention, the transformation step 415 can be a linear or nonlinear transformation that computes a road-aligned representation of the real-world traffic scenario, i.e., approximating a vehicle decision making and motion planning problem on a curved road segment 410 by solving a simplified vehicle decision making and motion planning problem on a straight road segment 430 with tightened limitation parameters. Embodiments of the invention are based on the realization that the vehicle decision making and motion planning problem in the approximate representation 420 leads to an MICP problem that can be solved in a computationally efficient manner to compute an optimal motion trajectory and a sequence of control actions for the vehicle.

Figure 4B:
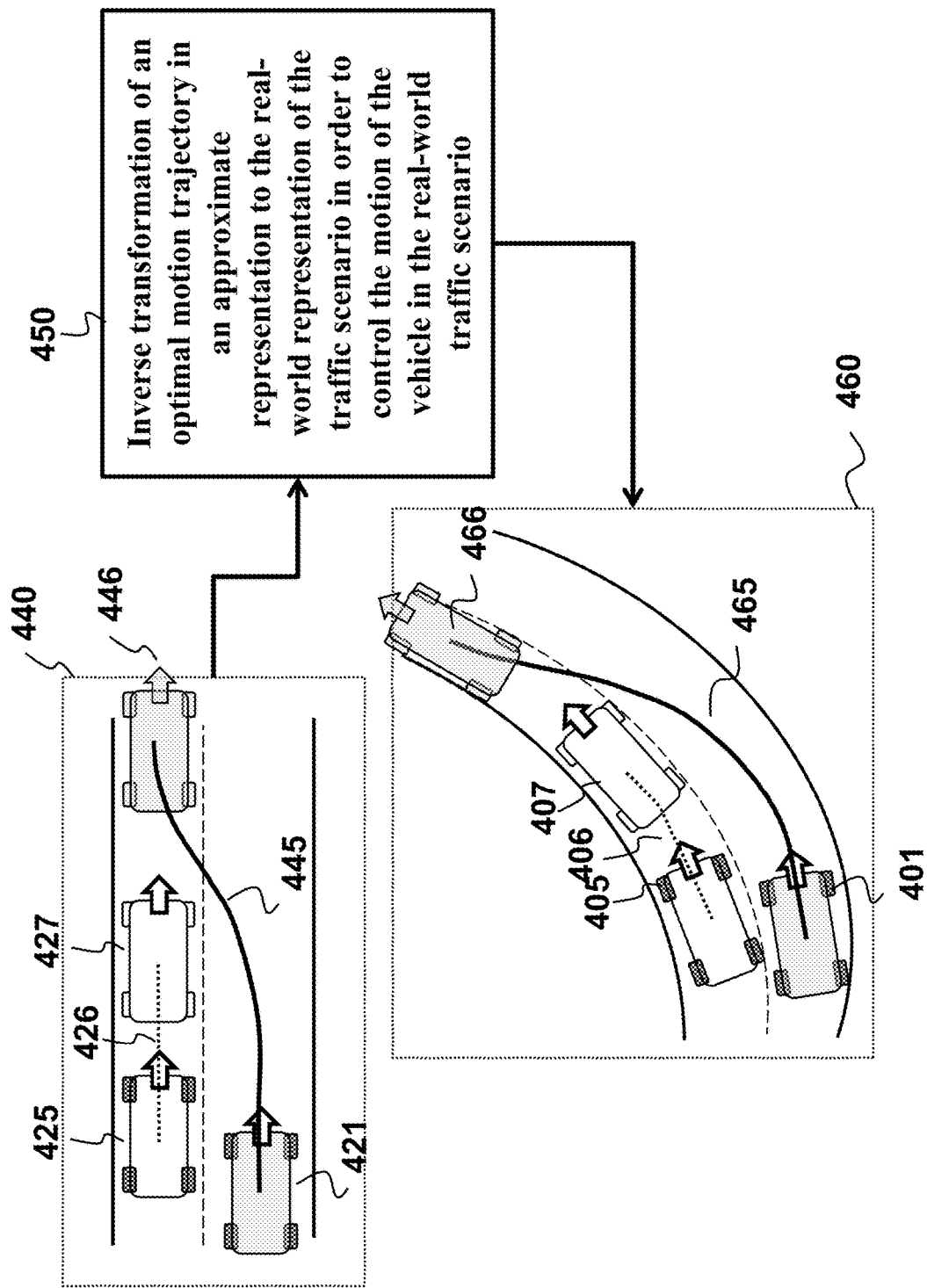
FIG. 4B illustrates an inverse transformation of an optimal solution to a mixed-integer convex optimization problem with tightened limitation parameter values into an approximate solution of the mixed-integer non-convex optimization problem for a real-world representation, according to some embodiments.

FIG. 4B illustrates an inverse transformation 450 of an optimal solution to a mixed-integer convex optimization problem with tightened limitation parameter values for an approximate representation 440 of the vehicle decision making and motion planning problem in an exemplary traffic scenario with one or multiple other vehicles, into an approximate solution of the mixed-integer non-convex optimization problem for a real-world representation 460 on a curved road segment 410, according to some embodiments of the invention. In some embodiments of the invention, the optimal solution to the MICP includes an optimal motion trajectory 445 and a corresponding sequence of control actions for the controlled vehicle 421, from a current time step 421 to one or multiple future time steps 446 in a prediction time horizon while avoiding any collisions with a predicted motion trajectory 426 for one or multiple other vehicles from a current time step 425 to one or multiple future time steps 427 in a prediction time horizon. For example, in some embodiments of the invention, the optimal motion trajectory 445 includes a sequence of vehicle positions at future time steps, a sequence of orientation values, a sequence of longitudinal velocity values, a sequence of acceleration and/or deceleration values, a sequence of engine torque and/or brake torque values, a sequence of steering values and/or a sequence of one or multiple lane changes to control the motion of the vehicle 421 in an approximate representation 440 of the real-world traffic scenario.

In some embodiments of the invention, an inverse transformation step 450 is used to compute an approximate motion trajectory 465 and a sequence of control actions for the vehicle 401, from a current time step 401 to one or multiple future time steps 466 in a prediction time horizon while avoiding any collisions with a predicted motion trajectory 406 for one or multiple other vehicles from a current time step 405 to one or multiple future time steps 407 in a prediction time horizon, in the real-world representation 460 of the traffic scenario. Some embodiments of the invention are based on the realization that the inverse transformation step 450 is used to compute an approximate motion trajectory 465 and a corresponding sequence of control actions in order to control the motion of the (semi-) autonomous vehicle 401 in the real-world traffic scenario. For example, in some embodiments of the invention, the approximate real-world motion trajectory 465 includes a sequence of vehicle positions at future time steps, a sequence of orientation values, a sequence of longitudinal velocity values, a sequence of acceleration and/or deceleration values, a sequence of engine and/or brake torques, a sequence of steering values and/or a sequence of one or multiple lane changes to control the motion of the vehicle 401 in the real-world traffic scenario 460.

In some embodiments of the invention, a vehicle decision making and motion planning system includes a motion prediction for one or multiple human driven vehicles (HDVs) using a switched dynamical system to represent reactions of HDVs to the, possibly changing, traffic rules. For example, the following state-dependent switched dynamics can be used HDV stops at a traffic light of a particular intersection, if the traffic light for the HDV's desired traffic direction is red and the HDV is within a predetermined distance from a stopping zone of the intersection.

Otherwise, HDV follows a leading vehicle and maintains a safe following distance, if the leading vehicle is within a particular predetermined distance in front of the HDV in the transportation network.

Otherwise, HDV travels at a desired target speed in the traffic scenario.

For example, a switched dynamical system of equations to compute a predicted motion trajectory for one or multiple other vehicles in the traffic scenario can be implemented using one or multiple optimization variables and one or multiple mixed-integer inequality and/or equality constraints in the MICP problem that is solved by the proposed vehicle decision making and motion planning system.

Figure 5:
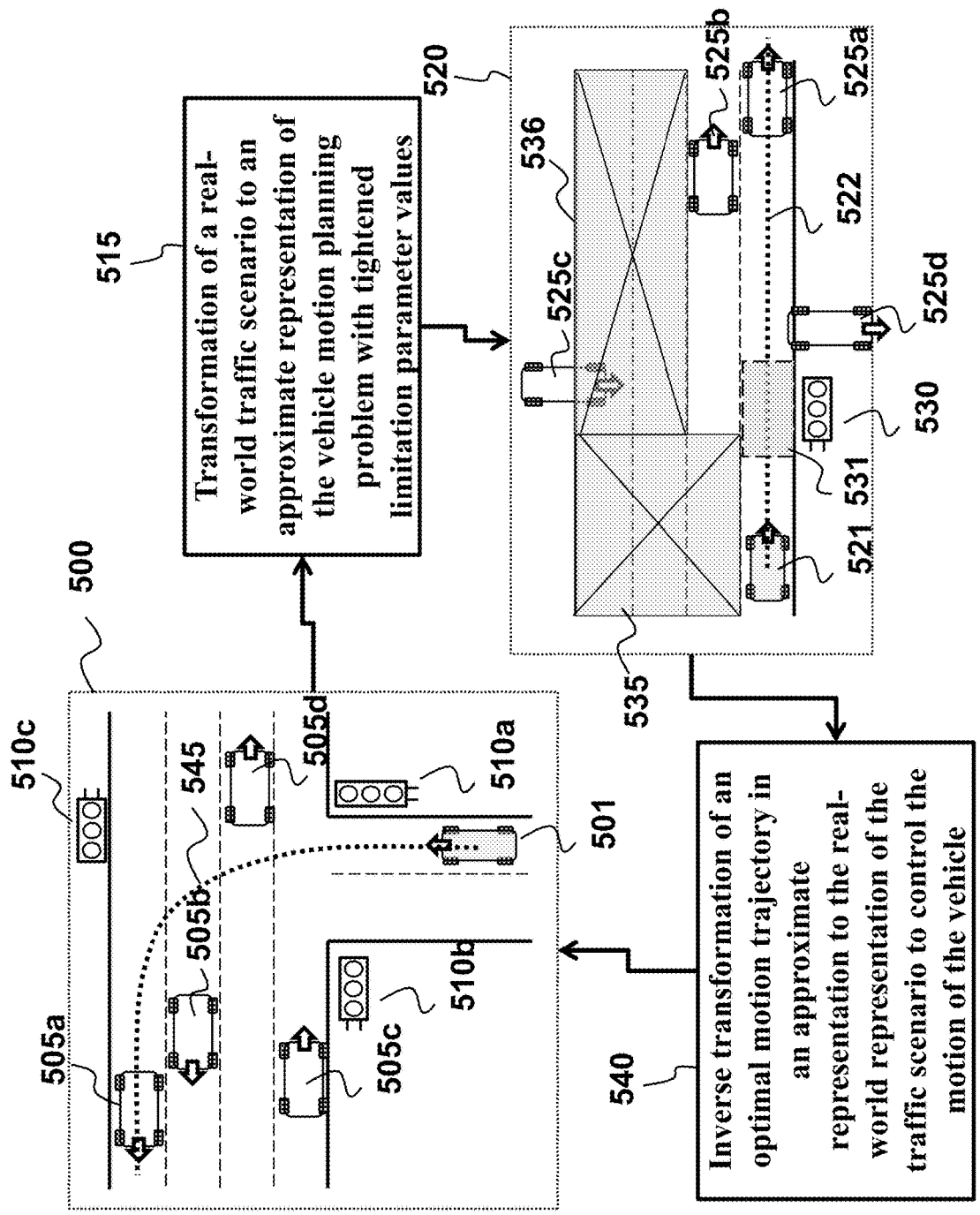
FIG. 5 illustrates a transformation step and inverse transformation step for a vehicle decision making and motion planning problem in an exemplary traffic scenario of a controlled vehicle with one or multiple other vehicles in a neighborhood of a traffic intersection, according to some embodiments of the invention.

FIG. 5 illustrates a transformation step 515 of a vehicle decision making and motion planning problem in an exemplary traffic scenario with one or multiple other vehicles in a neighborhood of a traffic intersection from a real-world representation 500 to an approximate representation 520 of the vehicle motion planning problem with one or multiple other vehicles on a straight road segment with tightened limitation parameter values, one or multiple exclusion zone constraints and one or multiple collision avoidance constraints in a mixed-integer convex optimization problem, according to some embodiments of the invention. In addition, FIG. 5 illustrates an inverse transformation 540 of an optimal solution to a mixed-integer convex optimization problem with tightened limitation parameter values for an approximate representation 520 of the vehicle decision making and motion planning problem in an exemplary traffic scenario with one or multiple other vehicles, into an approximate solution of the mixed-integer non-convex optimization problem for a real-world representation 500.

In some embodiments of the invention, the real-world traffic scenario 500 includes a traffic intersection that connects multiple road segments and one or multiple lanes in each road segment, a controlled vehicle 501, one or multiple other vehicles and/or traffic participants 505a-505d, and multiple traffic rules, e.g., determined by one or multiple traffic light signals 510a-510c that allow vehicles to navigate through the traffic intersection in one or multiple crossing directions to avoid collisions, to minimize congestion and increase traffic flow at each time step. Some embodiments of the invention are based on the realization that the proposed decision making and motion planning system (DM-MPS) uses a transformation step 515 to transform the complex real-world traffic scenario 500 into an approximate representation 520 for a local neighborhood of the transportation network along a particular route of the controlled vehicle 501. For example, in some embodiments of the invention, the route includes a sequence of road segments, a sequence of lanes, a sequence of turns and/or a sequence of crossing directions through one or multiple traffic intersections in the transportation network that the vehicle 501 plans to traverse from its current position to reach its desired destination. The route is provided by the user, or it can be computed by a car navigation system or a route planning module.

In some embodiments of the invention, the approximate representation of the vehicle motion planning problem with tightened limitation parameter values 520 includes one or multiple zones, for example, a first zone with only one lane that is defined based on an exclusion zone constraint 535, followed by a second zone with two lanes that is defined based on a different exclusion zone constraint 536, and potentially one or multiple additional zones that include one or multiple mixed-integer inequality and/or equality constraints to enforce traffic rules, e.g., speed limit constraints, lane change constraints, stopping zone constraints, etc. In addition, in some embodiments of the invention, the approximate representation 520 includes a controlled vehicle 521, one or multiple other vehicles 525a-525d, and/or a predicted motion trajectory can be computed in the approximate representation 520 for each of the other vehicles and/or traffic participants from a current time step to one or multiple future time steps in a prediction time horizon.

In some embodiments of the invention, the approximate representation 520 includes an additional conflict zone 531 with one or multiple mixed-integer convex inequality and/or equality constraints that enforce rules in a traffic intersection and/or merging point. For example, in some embodiments of the invention, traffic light signals 510a-510c in a real-world traffic scenario are implemented in an approximate representation 530 by enforcing collision avoidance constraints for a conflict zone 531 at one or multiple future time steps in a prediction time horizon of the vehicle decision making and motion planning system. For example, if a traffic light 530 is red at a particular time step for a particular crossing direction, then one or multiple conflict zone constraints 531 enforce the controlled vehicle 521 to stop before the traffic intersection in an approximate representation 520, which corresponds to a stopping maneuver in the real-world traffic scenario 500. In addition, if a traffic light 530 is predicted to become green at a future time step in a prediction time horizon, then the one or multiple conflict zone constraints 531 are removed from the constrained mixed-integer convex optimization problem at the future time step in the prediction time horizon in order to compute an optimal motion plan for the controlled vehicle 521 to cross the traffic intersection.

In some embodiments of the invention, the optimal solution to an MICP includes an optimal motion trajectory 522 and a corresponding sequence of control actions for the controlled vehicle 521, from a current time step 521 to one or multiple future time steps 522 in a prediction time horizon while avoiding any collisions with a predicted motion trajectory for one or multiple other vehicles 525a-525d, while avoiding any violations of conflict zone constraints 531 and while respecting one or multiple additional zone constraints 535 and/or 536 to enforce complex traffic rules in a local neighborhood along a particular route of the controlled vehicle 501 in the transportation network. In some embodiments of the invention, an inverse transformation step 540 is used to compute an approximate motion trajectory 545 and a sequence of actions to safely and optimally control the motion of the (semi-) autonomous vehicle 501 in the real-world traffic scenario 500, from a current time step to one or multiple future time steps in a prediction time horizon while avoiding any collisions with a predicted motion trajectory for one or multiple other vehicles 505a-505d and while avoiding any violations of the complex traffic rules from a current time step to one or multiple future time steps in a prediction time horizon in the real-world representation 500 of the traffic scenario.

For example, in some embodiments of the invention, the optimal motion trajectory 522 and/or the transformed motion trajectory 545 include a sequence of vehicle positions at future time steps, a sequence of orientation values, a sequence of longitudinal velocity values, a sequence of acceleration and/or deceleration values, a sequence of engine and/or brake torque values, a sequence of steering values and/or a sequence of one or multiple lane changes to control the motion of the vehicle 501 in the real-world traffic scenario 500.

Figure 6A:
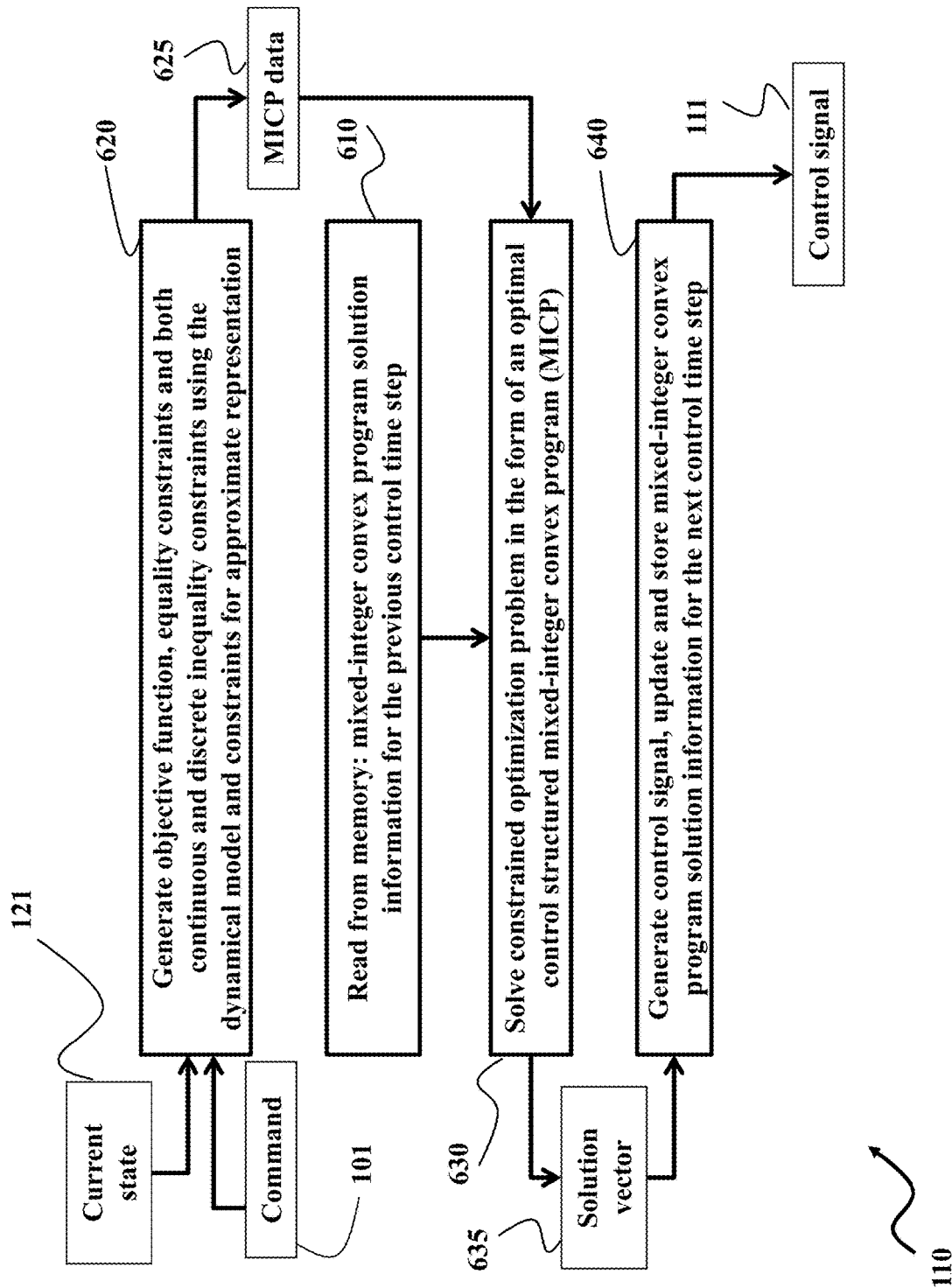
FIG. 6A illustrates a block diagram of a system and a method for a mixed-integer model predictive controller (MI-MPC) that computes the control signal, given the current state of the system and the control command, in the proposed vehicle decision making and motion planning system according to some embodiments.

FIG. 6A illustrates a block diagram of a system and a method for mixed-integer model predictive control (MI-MPC) to implement the predictive controller 110 that computes the control signal 111, given the current state of the system 121 and the control command 101, in the proposed vehicle decision making and motion planning system according to some embodiments. Specifically, MI-MPC computes a control solution, e.g., a solution vector 635 that contains a sequence of future optimal discrete and continuous control inputs over a prediction time horizon of the system 640, by solving a constrained mixed-integer convex programming (MICP) problem 630 at each control time step. The MICP data 625 of the objective function, equality, and discrete and continuous inequality constraints in this optimization problem 630 depends on the dynamical model for the controlled vehicle and traffic environment, the system limitations, and one or multiple traffic rules in the approximate representation of the traffic scenario 620, the current state of the system 121, objectives of control and the control command 101.

In some embodiments, the solution of this inequality constrained mixed-integer convex optimization problem 630 uses the state and control values over the prediction time horizon from the previous control time step 610, which can be read from the memory. This concept is called warm- or hot-starting of the optimization algorithm and it can reduce the required computational effort of the MI-MPC controller in some embodiments of the invention. In a similar fashion, the corresponding solution vector 635 can be used to update and store a sequence of optimal state and control values for the next control time step 640.

In some embodiments, the mixed-integer optimization algorithm is based on a search algorithm such that the MI-MPC controller updates and stores additional mixed-integer program solution information 640 in order to reduce the computational effort of the search algorithm at the next control time step. In one embodiment, the MI-MPC problem at each control time step is solved using a branch-and-bound optimization method and the warm starting information 640 includes data related to the nodes in the binary search tree that are part of the solution path from the root node to the leaf node where the optimal integer-feasible control solution is found, in order to improve the node selection and variable branching strategies from one control time step to the next.

Figure 6B:
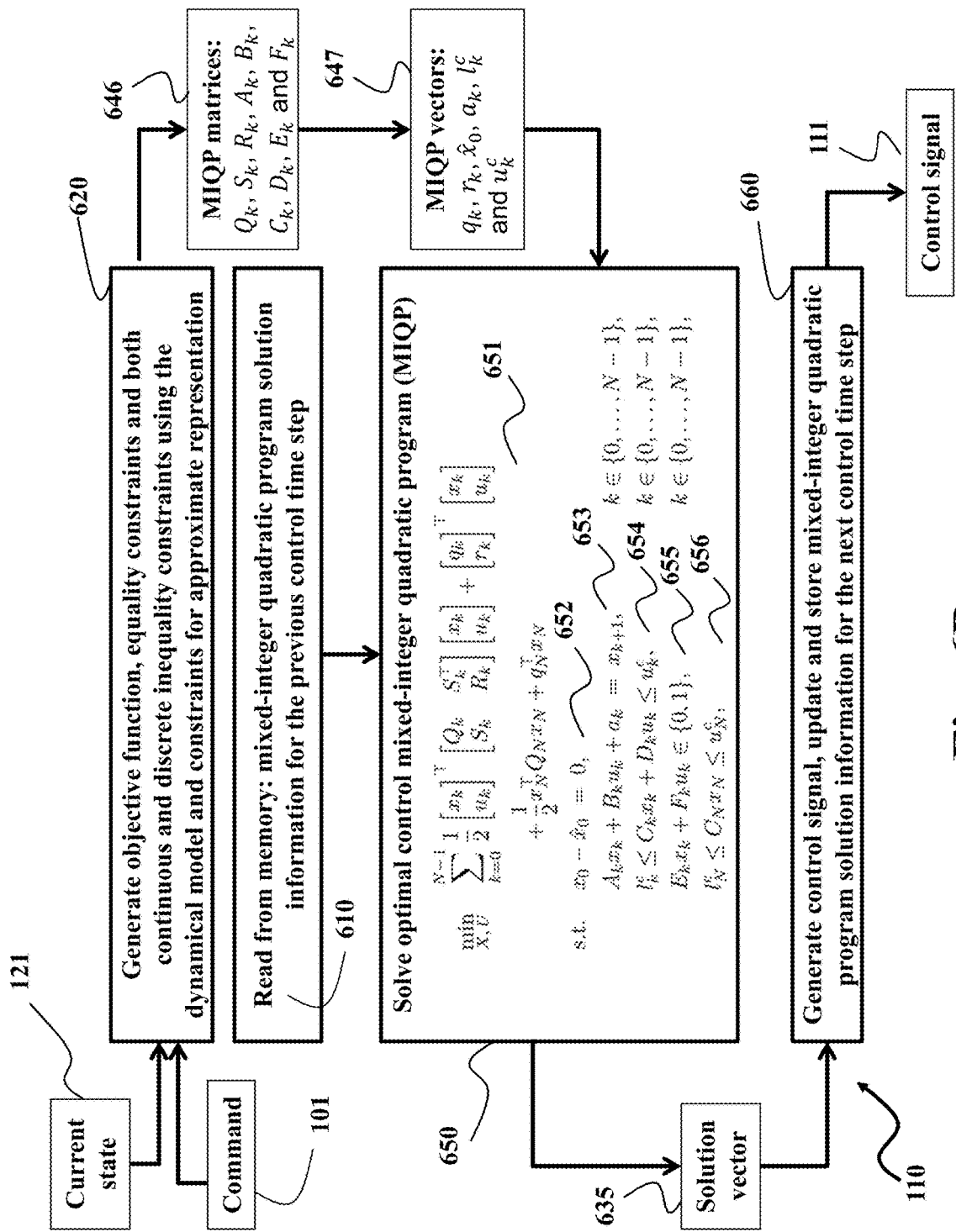
FIG. 6B illustrates a block diagram of an MI-MPC method that solves an optimal control structured mixed-integer linear-quadratic optimization problem to compute the control signal at each control time step, given the current state of the vehicle and the command, to compute a motion plan that includes a sequence of future discrete decisions and continuous actions for the controlled vehicle.

FIG. 6B illustrates a block diagram of an MI-MPC method that solves an optimal control structured mixed-integer linear-quadratic optimization problem 650 in order to compute the control signal 111 at each control time step, given the current state 121 of the vehicle 120 and the command 101, to compute a motion plan that includes a sequence of future discrete decisions and continuous actions for the controlled vehicle. Some embodiments of the invention are based on a linear dynamical model of the vehicle and/or a linear dynamical model of the traffic environment 653 with one or multiple linear mixed-integer equality constraints 652, one or multiple linear mixed-integer inequality constraints 654, one or multiple linear discrete equality and/or integer feasibility constraints 655, one or multiple linear terminal inequality constraints 656 and a linear-quadratic convex objective function 651, such that one or multiple constrained mixed-integer convex quadratic programming (MIQP) problems 650 need to be solved at each control time step of the proposed vehicle decision making and motion planning system. The MIQP data 625 then include the Hessian and constraint Jacobian matrices 646 and the corresponding gradient and constraint evaluation vectors 647. In general, the linear discrete equality and/or integer feasibility constraints 655 state that a linear function of state and control values, $E_k x_k + F_k u_k$, is constrained to be equal to one of a discrete set of values.

In some embodiments of the invention, the linear discrete equality constraints 655 are binary equality constraints, $E_k x_k + F_k u_k \in \{0,1\}$, for example, this formulation includes one or multiple constraints on a control input variable or an auxiliary optimization variable to be restricted to be equal to either 0 or 1 at each time step in a prediction time horizon in the optimal MIQP solution vector 635.

Figure 6C:
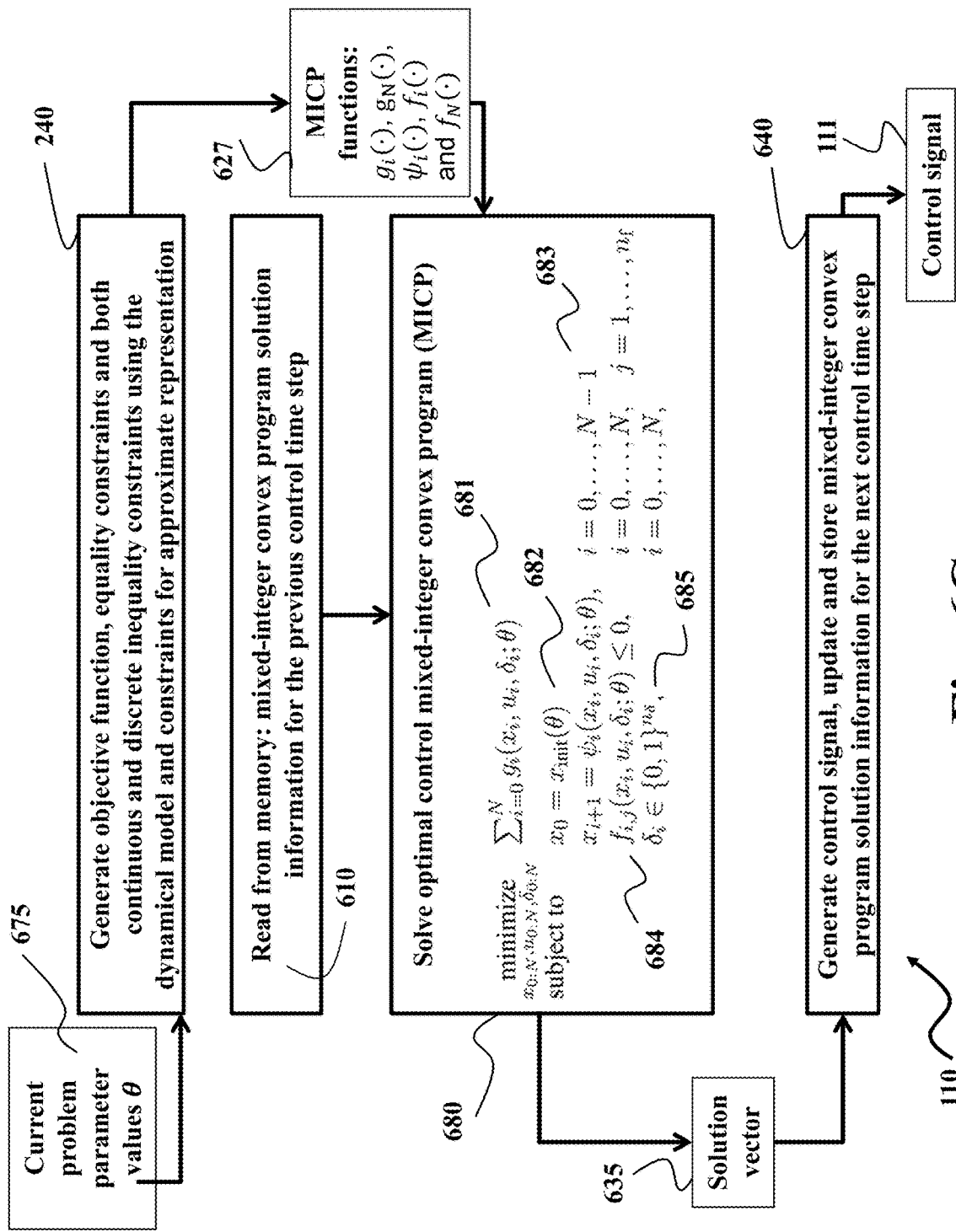
FIG. 6C illustrates a block diagram of an MIMPC method that finds a feasible but possibly suboptimal solution vector for the optimal control structured MICP to compute the control signal at each time step, given the current problem parameter values and the command, to compute a motion plan that includes a sequence of future discrete decisions and continuous actions for the controlled vehicle, according to some embodiments of the invention.

FIG. 6C illustrates a block diagram of an MIMPC method that aims to find a feasible but possibly suboptimal solution vector 635 for the optimal control structured MICP 680 in order to compute the control signal 111 at each control time step, given the current problem parameter values 675 and the command 101, to compute a motion plan that includes a sequence of future discrete decisions and continuous actions for the controlled vehicle. The optimal control structured MICP 680 includes the minimization or maximization of a sum of stage cost functions 681 $g_0(x_0, u_0, \delta_0; \theta)$, $g_1(x_1, u_1, \delta_1; \theta)$, ..., $g_{N-1}(x_{N-1}, u_{N-1}, \delta_{N-1}; \theta)$ and of a terminal cost function $g_N(x_N, u_N, \delta_N; \theta)$ over a prediction time horizon, which depend on the state variables $x_{0:N} = x_0, x_1, \ldots, x_N$, the continuous control input variables $u_{0:N} = u_0, u_1, \ldots, u_N$, the discrete control variables $\delta_{0:N} = \delta_0, \delta_1, \ldots, \delta_N$ and the problem parameter variables $\theta$. In some embodiments of the invention, the state variables $x_{0:N}$ are continuous optimization variables, the control input variables $u_{0:N}$ are continuous optimization variables, and the discrete variables $\delta_{0:N}$ include binary and/or integer optimization variables.

In some embodiments of the invention, the constraints of the optimal control structured MICP 680 includes an equality constraint on the initial state variable $x_0 = X_{init}(\theta)$ 682, where the current state value of the system can be computed by a state estimator 130 and can depend on one or multiple problem parameters in the traffic scenario. In some embodiments of the invention, one or multiple initial state variables are free and the corresponding equality constraints 682 can be omitted. In some embodiments of the invention, the constraints of the optimal control structured MICP 680 includes a sequence of equality constraints to define the state variables at a next time step based on the state and control variables at a previous time step in the prediction time horizon, for example, a sequence of equality constraints $x_1 = \psi_0(x_0, u_0, \delta_0; \theta), x_2 = \psi_1(x_1, u_1, \delta_1; \theta), \ldots, x_N = \psi_{N-1}(x_{N-1}, u_{N-1}, \delta_{N-1}; \theta)$ 683, based on a dynamical model 102 of the controlled vehicle and of its traffic environment. In some embodiments of the invention, the constraints of the optimal control structured MICP 680 includes a sequence of inequality constraints on one or multiple combinations of state and/or control variables at each time step in the prediction time horizon, for example, a sequence of inequality constraints $f_{0,1}(x_0, u_0, \delta_0; \theta) \leq 0, \ldots, f_{0,n_f}(x_0, u_0, \delta_0; \theta) \leq 0, f_{1,1}(x_1, u_1, \delta_1; \theta) \leq 0, \ldots, f_{N,n_f}(x_N, u_N, \delta_N; \theta) \leq 0$ over a prediction time horizon N, and where $n_f$ is the number of inequality constraints at each time step.

In some embodiments of the invention, one or multiple of the discrete variables are binary optimization variables, i.e., $\delta_{i,j} \in \{0,1\}$ 685 for $i=0, 1, \ldots, N$ and j in an index set of binary optimization variables. In other embodiments of the invention, one or multiple of the discrete variables are integer optimization variables, i.e., $\delta_{i,j} \in \mathbb{Z}$ for $i=0, 1, \ldots, N$ and j in an index set of integer optimization variables. Some embodiments of the invention are based on the realization that the optimal control structured MICP 680 can be solved relatively efficiently if the MICP functions 627 are convex functions, i.e., the stage cost functions $g_i(\cdot)$ 681 are convex, the dynamical model functions $\psi_i(\cdot)$ 683 are linear or piecewise linear, and the inequality constraint functions $f_{i,j}(\cdot)$ 684 are convex.

Some embodiments of the invention are based on the realization that the optimal control structured MICP 680 can be formulated as a mixed-integer convex linear program (MILP) if the stage cost functions $g_i(\cdot)$ 681 are linear, the dynamical model functions $\psi_i(\cdot)$ 683 are linear or piecewise linear, and the inequality constraint functions $f_{i,j}(\cdot)$ 684 are linear or piecewise linear. Some embodiments of the invention are based on the realization that the optimal control structured MICP 680 can be formulated as a mixed-integer convex quadratic program (MIQP) if the stage cost functions $g_i(\cdot)$ 681 are linear-quadratic, the dynamical model functions $\psi_i(\cdot)$ 683 are linear or piecewise linear, and the inequality constraint functions $f_{i,j}(\cdot)$ 684 are linear or piecewise linear.

In some embodiments of the invention, one or multiple of the inequality constraint functions $f_{i,j}(\cdot)$ 684 are convex quadratic inequality constraints, such that the optimal control structured MICP 680 can be formulated as a mixed-integer quadratically constrained quadratic program (MIQCQP). In some embodiments of the invention, one or multiple of the inequality constraint functions $f_{i,j}(\cdot)$ 684 are convex second-order cone constraints, such that the optimal control structured MICP 680 can be formulated as a mixed-integer second-order cone program (MISOCP). Some embodiments of the invention are based on the realization that MICP problems, including MILPs, MIQPs, MIQCQPs or MISOCPs, can be solved relatively efficiently, for example, using branch-and-bound methods, branch-and-cut methods, branch-and-price methods or any other variant of a tree search-based optimization algorithm. However, some embodiments of the invention are based on the realization that the combinatorial complexity of MICPs generally leads to an exponential increase of computation time for optimization algorithms to solve MICPs with an increasing number of discrete decision variables, such that a feasible but suboptimal solution vector 635 is computed instead at a reduced computational cost in some embodiments of the invention. In some embodiments of the invention, the proposed vehicle decision making and motion planning system solves an optimal control structured MIQP 50 to each sampling time step of the following form:

$$\min_{X,U,Z} \frac{1}{2} \sum_{i=0}^{N-1} \left( x_i^T Q_i x_i + u_i^T R_i u_i + \begin{bmatrix} q_i \\ r_i \\ s_i \end{bmatrix}^T \begin{bmatrix} x_i \\ u_i \\ z_i \end{bmatrix} \right) + x_N^T Q_N x_N + q_N^T x_N \tag{1a}$$

$$\text{s.t. } x_0 - \hat{x}_0 = 0, \tag{1b}$$

$$A_i x_i + B_i u_i + a_i = x_{i+1}, \; i \in \{0, \ldots, N-1\}, \tag{1c}$$

State bounds:

$$\underline{v}_X(i) \leq v_X(i) \leq \overline{v}_X(i), \; i \in \{0, \ldots, N\}, \tag{1d}$$

$$0 \leq Y_{ref}(i) \leq (n-1)d, \; i \in \{0, \ldots, N\}, \tag{1e}$$

$$0 \leq n_{LC}(i) \leq \overline{n}_{LC}, \; i \in \{0, \ldots, N\}, \tag{1f}$$

$$0 \leq t_c(i) \leq t_D, \; i \in \{0, \ldots, N\}, \tag{1g}$$

Control bounds:

$$\underline{a}_X(i) \leq a_X(i) \leq \overline{a}_X(i), \; i \in \{0, \ldots, N-1\}, \tag{1h}$$

$$\underline{v}_Y(i) \leq v_Y(i) \leq \overline{v}_Y(i), \; i \in \{0, \ldots, N-1\}, \tag{1i}$$

$$1 \leq \tilde{t}_c(i) \leq t_D, \; i \in \{0, \ldots, N\}, \tag{1j}$$

Restrict vehicle motion:

$$\alpha |v_Y(i)| - v_X(i) \leq 0, \; i \in \{0, \ldots, N-1\}, \tag{1k}$$

Lane changes:

$$-\frac{d}{2} \leq p_Y(i) - Y_{ref}(i) \leq \frac{d}{2}, i \in \{0, \ldots, N\}, \tag{1l}$$

$$-d(l_u(i) + l_d(i)) \leq \delta_c(i) \leq d(l_u(i) + l_d(i)), \; i \in \{0, \ldots, N\}, \tag{1m}$$

$$-d + 2dl_u(i) \leq \delta_c(i) \leq d - 2dl_d(i), \; i \in \{0, \ldots, N\}, \tag{1n}$$

$$l_d(i) \in \{0, 1\}, l_u(i) \in \{0, 1\}, \; i \in \{0, \ldots, N\}, \tag{1o}$$

Time delay counter:

$$t_c(i) \leq \tilde{t}_c(i), t_D l_u(i) + t_D l_d(i) \leq \tilde{t}_c(i), \; i \in \{0, \ldots, N\}, \tag{1p}$$

$$t_D l_u(i) + t_D l_d(i) \leq (t_D - t_c(i)), \; i \in \{0, \ldots, N\}, \tag{1q}$$

$$\text{Obstacle constraints: } \ldots \text{ (see FIG. } 7A - 7C) \tag{1r}$$

$$\text{Zone constraints: } \ldots \text{ (see FIG. } 7D) \tag{1s}$$

where the parameter d denotes a lane width value and the parameter $t_D$ denotes a time delay value that defines a minimum amount of elapsed time between two consecutive lane changes. The above described mixed-integer optimal control problem formulation uses multiple continuous and/or discrete optimization variables, including a sequence of state variables $X=[x_0, x_1, \ldots, x_N]$, a sequence of auxiliary variables $Z=[z_0, z_1, \ldots, z_N]$ and a sequence of control input variables $U=[u_0, u_1, \ldots, u_{N-1}]$ over a prediction time horizon of length N.

In some embodiments of the invention, the state variables of the optimal control structured MICP are defined as $x_i=[p_X(i), p_Y(i), v_X(i), Y_{ref}(i), n_{LC}(i), t_c(i)]$, where $p_X(i)$, $p_Y(i)$ denote the position of the controlled vehicle in a road-aligned global coordinate system, $v_X(i)$ denotes the longitudinal velocity, $Y_{ref}(i)$ denotes the preferred lane for the controlled vehicle, $n_{LC}(i)$ denotes the total number of performed lane changes and $t_c(i)$ denotes a timer variable for the time since the previous lane change at time step $t_i$ within a prediction time horizon. For example, the controlled vehicle is in lane j if $Y_{ref}=(j-1)d$, given a lane width value d, for j=1, 2, . . . , n where n is the number of lanes in a real-world traffic scenario, and $n_{LC}(i)$ denotes the total number of lane changes that the controlled vehicle plans to perform starting from an initial time step $t_0$ until a future time step $t_i$ for i=0, 1, . . . , N within the prediction time horizon.

In some embodiments of the invention, the input variables of the optimal control structured MICP are defined as $u_i=[a_X(i), v_Y(i), \tilde{t}_c(i), \delta_c(i), l_u(i), l_d(i)]$, where $a_X(i)$ denotes a longitudinal acceleration/deceleration of the controlled vehicle, $v_Y(i)$ denotes a lateral velocity of the controlled vehicle, $\tilde{t}_c(i)$ denotes a continuous input variable for the lane change timer constraints, $\delta_c(i)$ denotes a continuous variable that defines the magnitude of a lane change in terms of a change in lateral position, and the binary variables $l_u(i), l_d(i)$ denote whether to perform a lane change up or down at a future time step $t_i$ for i=0, 1, . . . , N−1 within the prediction time horizon, respectively. Specifically, the control input variables $l_u(i), l_d(i) \in \{0,1\}$ are binary optimization variables in the MIQP 650, while the input variables $a_X(i), v_Y(i), \tilde{t}_c(i), \delta_c(i) \in \mathbb{R}$ are continuous optimization variables in the MIQP 650 that is solved to compute a motion plan and sequence of control actions for the vehicle in a traffic scenario.

In some embodiments of the invention, the linear dynamical model of the controlled vehicle in an approximate representation of the real-world traffic scenario, including both simplified vehicle dynamics as well as additional linear dynamics to enforce traffic rules, e.g., related to lane changes, read as follows $$\begin{bmatrix} p_X(i+1) \\ p_Y(i+1) \\ v_X(i+1) \\ Y_{ref}(i+1) \\ n_{LC}(i+1) \\ t_c(i+1) \end{bmatrix} = \begin{bmatrix} 1 & 0 & T_s & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 0 \end{bmatrix} \begin{bmatrix} p_X(i) \\ p_Y(i) \\ u_X(i) \\ Y_{ref}(i) \\ n_{LC}(i) \\ t_c(i) \end{bmatrix} + \begin{bmatrix} 0 & 0 & 0 & 0 & 0 & 0 \\ 0 & T_s & 0 & 0 & 0 & 0 \\ T_s & 0 & 0 & 0 & 0 & 0 \\ 0 & 0 & 0 & 1 & 0 & 0 \\ 0 & 0 & 0 & 0 & 1 & 1 \\ 0 & 0 & 1 & 0 & 0 & 0 \end{bmatrix} \begin{bmatrix} a_X(i) \\ v_Y(i) \\ \tilde{t}_c(i) \\ \delta_c(i) \\ l_u(i) \\ l_d(i) \end{bmatrix} + \begin{bmatrix} 0 \\ 0 \\ 0 \\ 0 \\ 0 \\ -1 \end{bmatrix}.$$

Some embodiments of the invention are based on the realization that the linear-quadratic objective in the MIQP 650 aims to perform a maximization of the traveled distance, a minimization of the number of lane changes, a minimization of the accumulated amount of acceleration/deceleration values, and a minimization of a lane error $|Y_{ref}-\overline{Y}_{ref}|$, where $\overline{Y}_{ref}$ is a user-defined value for the preferred lane of a road segment in the transportation network such that the controlled vehicle aims to drive in the preferred lane whenever possible. For example, in some embodiments of the invention, the objective in the MICP 630 includes a minimization of an auxiliary control variable $\Delta Y_{ref}$, for example, satisfying the following additional inequality constraints $$\Delta Y_{ref} \geq Y_{ref} - \overline{Y}_{ref}, \quad \Delta Y_{ref} \geq \overline{Y}_{ref} - Y_{ref},$$

such that the condition $\Delta Y_{ref} \geq |Y_{ref}-\overline{Y}_{ref}|$ holds.

In some embodiments of the invention, the constrained MICP 630 includes a state variable $t_c(i)$ that denotes a waiting time since a previous lane change until a new lane change can be initiated at a future time step in a prediction time window. For example, in some embodiments of the invention, a counter starts from a fixed total waiting time of $t_D$ at the moment of a lane change and it counts down until a new lane change can be initiated at a future time step $t_i$ when $t_c(i)=0$. In some embodiments of the invention, an additional control variable $\tilde{t}_c(i)$ is introduced in order to implement the following three options At a time step $t_i$ of a lane change, i.e., $l_u(i)=1$ or $l_d(i)=1$, then $\tilde{t}_c(i)=t_D$ and $t_c(i+1)=t_D-1$ because an equality constraint $t_c(i+1)=\tilde{t}_c(i)-1$ is enforced in the MICP 630 optimization problem.

As long as the condition $t_c(i) \geq 1$ holds, then the controlled vehicle is not allowed to make a new lane change and $t_c(i)=\tilde{t}_c(i)$ such that $t_c(i+1)=\tilde{t}_c(i)-1=t_c(i)-1$, i.e., the counter variable $t_c(i)$ counts down from one time step to the next in the prediction time horizon.

If a condition $t_c(i)=0$ holds at a time step $t_i$, then the controlled vehicle is allowed to make a new lane change such that either option 1 above repeats itself or $\tilde{t}_c(i)=1$ such that $t_c(i+1)=\tilde{t}_c(i)-1=0$.

In some embodiments of the invention, auxiliary binary optimization variables $z_i \in \{0,1\}^{n_z}$ are used to implement one or multiple obstacle avoidance and/or space-dependent zone constraints as illustrated in FIGS. 7A-7D.

Some embodiments of the invention are based on the realization that the MICP 630 includes one or multiple obstacle avoidance constraints that are time varying in general and that can be used to implement collision avoidance for the controlled vehicle with respect to other static or dynamic vehicles, bicycles or pedestrians, but also to implement traffic rules at stop signs or traffic lights at traffic intersections along a particular route of the controlled vehicle in the transportation network. The latter allows the same MICP formulation to be used to model an approximate representation for many different real-world traffic scenarios.

Figure 7A:
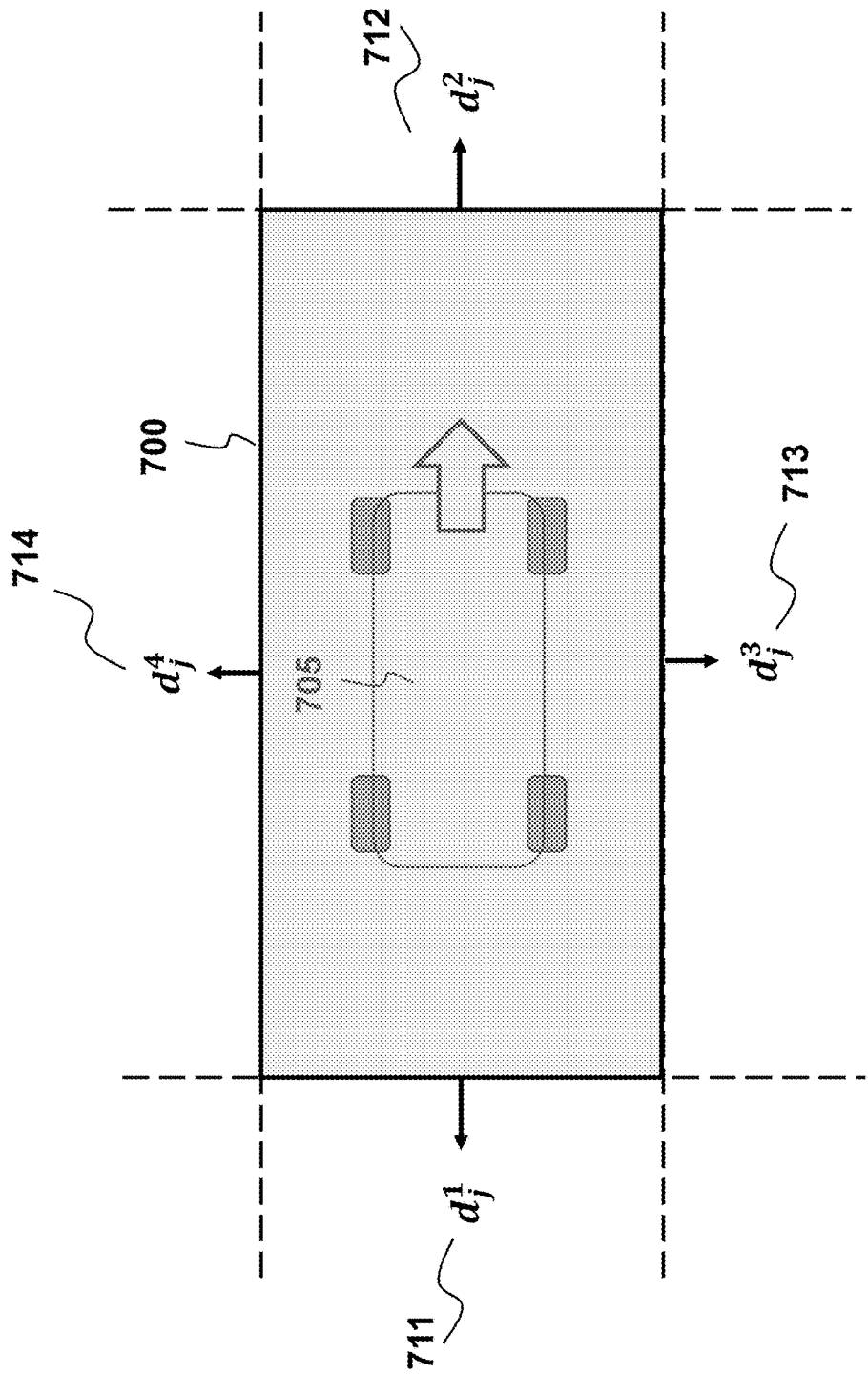
FIG. 7A illustrates one or multiple obstacle avoidance constraints using mixed-integer inequality constraints that enforce a controlled vehicle to be inside one of multiple disjoint regions outside of the safety region around an obstacle in the transportation network, according to some embodiments of the invention.

FIG. 7A illustrates one or multiple obstacle avoidance constraints using mixed-integer inequality constraints that enforce a controlled vehicle to be inside one of multiple disjoint regions outside of the safety region 700 around an obstacle 705, where the obstacle can be another vehicle, bicycle, pedestrian, stopping zone or traffic intersection in the transportation network. For example, in some embodiments of the invention, one binary variable $d_j^1(i) \in \{0,1\}$ 711, $d_j^2(i) \in \{0,1\}$ 712, $d_j^3(i) \in \{0,1\}$ 713, and $d_j^4(i) \in \{0,1\}$ 714 is introduced for each disjoint region outside of the safety region 700 around an obstacle 705 in FIG. 7A. The resulting set of mixed-integer inequality constraints can be defined for each obstacle j=1, 2, . . . , $n_{obs}$, for example, as follows $$\underline{x}_j(i) \leq p_X(i) + Md_j^1(i) \leq \underline{x}_j(i) + M,$$

$$\overline{x}_j(i) - M \leq p_X(i) + Md_j^2(i) \leq \overline{x}_j(i),$$

-continued $$p_Y(i) + M d_j^3(i) \le \underline{y}_j(i) + M,$$

$$p_Y(i) - M d_j^4(i) \ge \overline{y}_j(i) - M,$$

$$p_X(i) + M\left(d_j^3(i) + d_j^4(i)\right) \le \overline{x}_j(i) + M,$$

$$p_X(i) - M\left(d_j^3(i) + d_j^4(i)\right) \ge \underline{x}_j(i) - M,$$

$$\sum_{k=1}^{4} d_j^k(i) = 1.$$

where M>>0 is a large positive value. In some embodiments of the invention, the objective in the MICP 630 includes a minimization of a sum of the binary variables $\Sigma_{k=1}^{4}\Sigma_{j=1}^{n_{obs}}\Sigma_{i=0}^{N}d_j^k(i)$ that leads to a tight MICP formulation.

For example, a mixed-integer inequality constraint $p_X(i)+Md_j^1(i) \le \underline{x}_j(i)+M$ implements an implication as follows $$d_j^1(i) = 1 \Rightarrow p_X(i) \le \underline{x}_j(i),$$

because M>>0 is a large positive value. Alternatively, $p_X(i)+Md_j^1(i) \ge \underline{x}_j(i)$ implements another implication as follows $$d_j^1(i) = 0 \Rightarrow p_X(i) \ge \underline{x}_j(i).$$

Figure 7B:
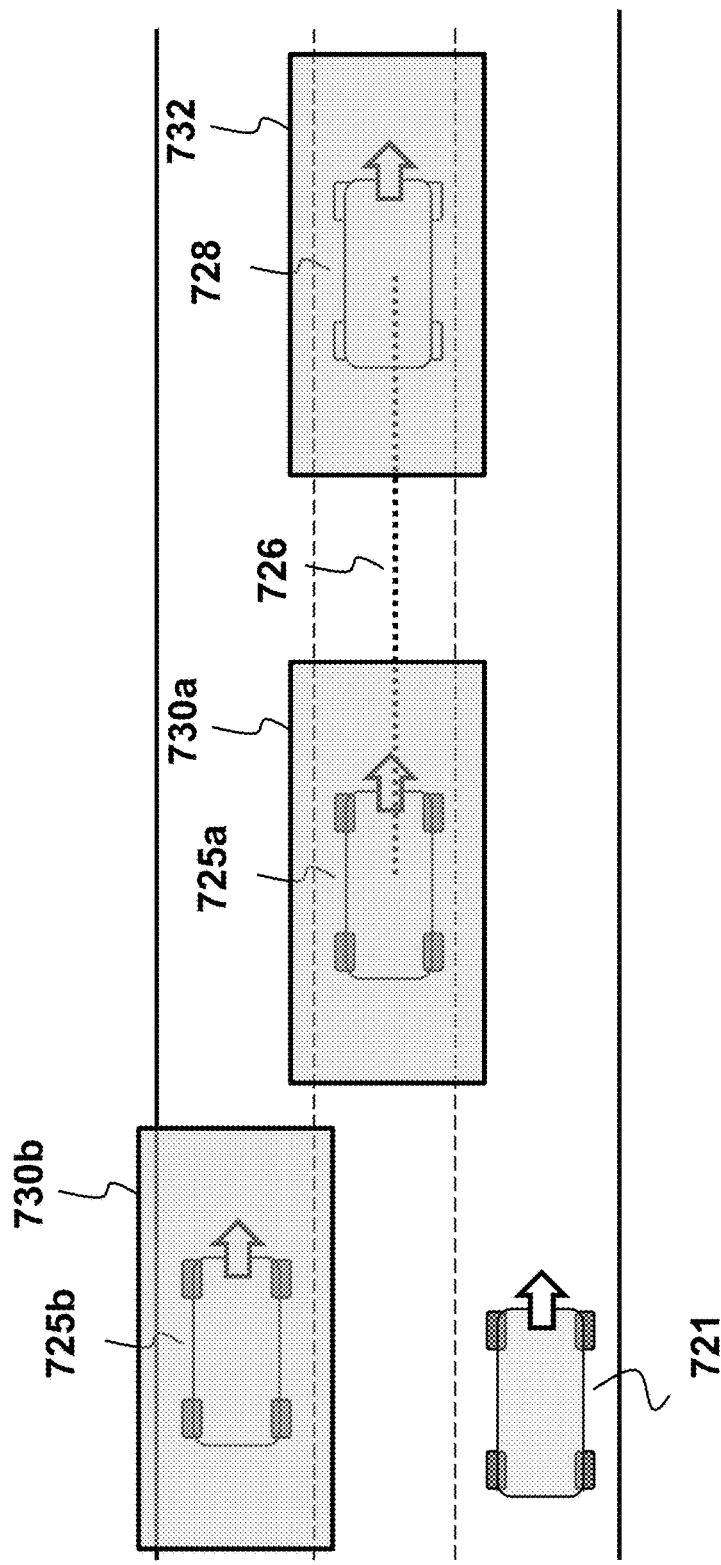
FIG. 7B illustrates one or multiple obstacle avoidance constraints that are used in the proposed vehicle decision making and motion planning system for the controlled vehicle in an approximate representation of an exemplary real-world traffic scenario with one or multiple other vehicles.

FIG. 7B illustrates one or multiple obstacle avoidance constraints that are used in the proposed vehicle decision making and motion planning system for the controlled vehicle 721 in an approximate representation of an exemplary real-world traffic scenario with one or multiple other vehicles 725a-725b. For example, in some embodiments of the invention, the one or multiple obstacle avoidance constraints enforce the controlled vehicle 721 to be outside of a safety region 730a around a vehicle 725a and outside of a safety region 730b around a vehicle 725b. In some embodiments of the invention, based on a predicted motion trajectory 726 for a vehicle from a current time step 725a to one or multiple future time steps 728, the controlled vehicle 721 can be enforced to be outside of a safety region 730a at a current time step and the vehicle 721 can be enforced to be outside of one or multiple other safety regions 732 around a predicted position and orientation of the vehicle 728 at one or multiple future time steps in the prediction time horizon of the vehicle decision making and motion planning system. Some embodiments of the invention are based on the realization that the obstacle avoidance constraints to be outside of a safety region around a predicted motion trajectory for each of the obstacles leads to a set of time varying mixed-integer inequality constraints in the MICP 630 that is solved at each control time step.

Figure 7C:
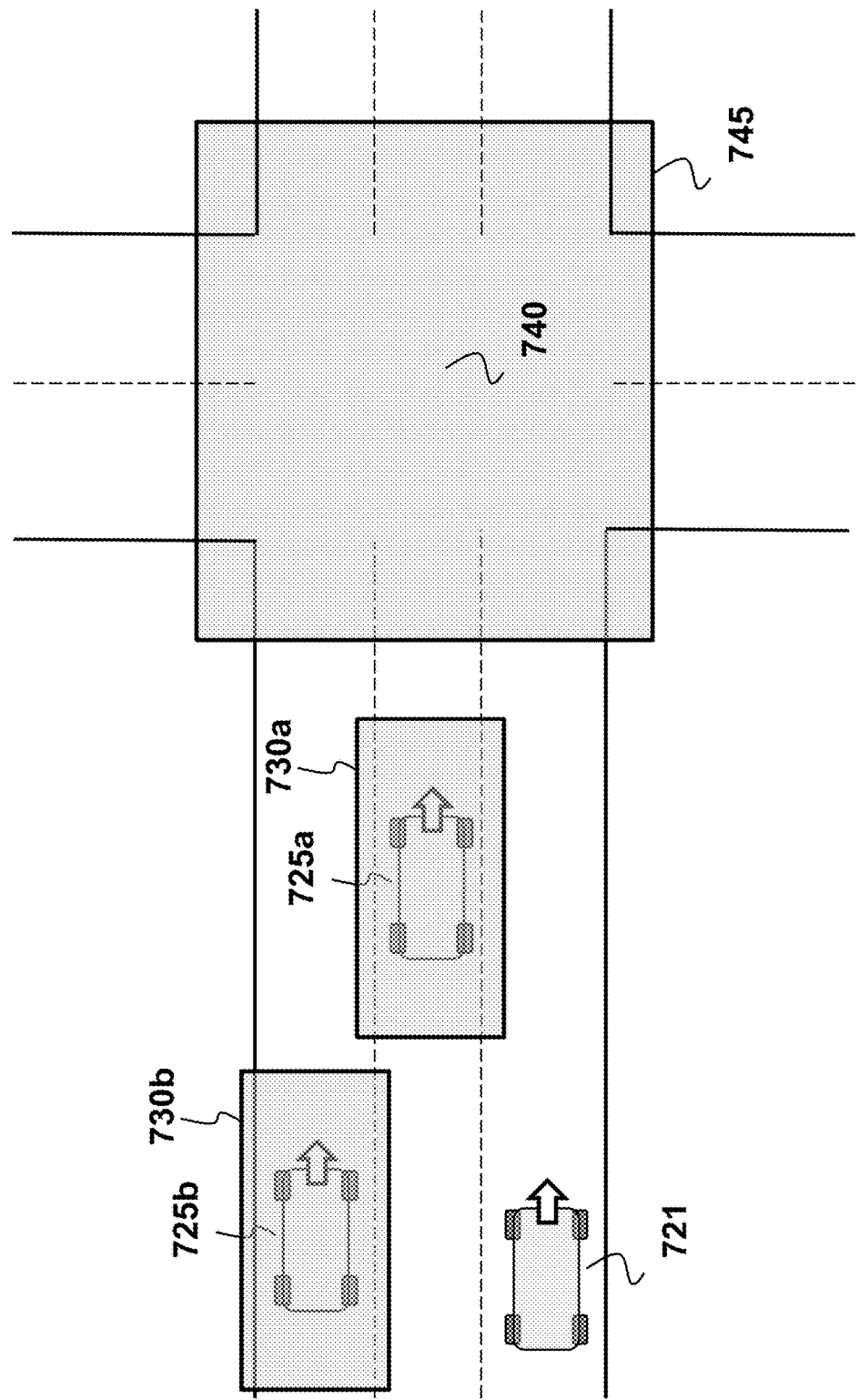
FIG. 7C illustrates one or multiple obstacle avoidance constraints that are used in the proposed vehicle decision making and motion planning system in an approximate representation of an exemplary real-world traffic scenario with one or multiple other vehicles, as well as one or multiple traffic intersections along a particular route of the controlled vehicle in the transportation network.

FIG. 7C illustrates one or multiple obstacle avoidance constraints that are used in the proposed vehicle decision making and motion planning system for the controlled vehicle 721 in an approximate representation of an exemplary real-world traffic scenario with one or multiple other vehicles 725a-725b, with corresponding safety regions 730a-730b, as well as one or multiple traffic intersections 740 along a particular route of the controlled vehicle 721 in the transportation network. Some embodiments of the invention are based on the realization that a set of mixed-integer inequality constraints can be used to enforce that the controlled vehicle 721 remains outside of a safety region 745 around each traffic intersection 740 at particular time steps in a prediction time horizon of the vehicle decision making and motion planning system.

For example, if a traffic light is red at a current time step for a desired crossing direction, then one or multiple collision avoidance constraints enforce the controlled vehicle 721 to stop before entering a safety region 745 around the traffic intersection 740 in an approximate representation of the traffic scenario, which corresponds to a stopping maneuver in the real-world traffic scenario. In some embodiments of the invention, collision avoidance constraints for a safety region 745 around a traffic intersection 740 are referred to as conflict zone constraints. For example, if a traffic light is predicted to become green for a desired crossing direction at a future time step in a prediction time horizon, then the one or multiple conflict zone constraints are relaxed and/or removed from the constrained mixed-integer convex optimization problem at one or multiple future time steps in the prediction time horizon to compute an optimal motion plan for the controlled vehicle 721 to cross the traffic intersection 740 in the desired crossing direction.

In some embodiments of the invention, a complex traffic rule on the priority order in which vehicles can enter a traffic intersection without traffic lights can be implemented in a similar fashion, for example, by enforcing one or multiple conflict zone constraints at particular time steps in the prediction time horizon and relaxing and/or removing the conflict zone constraints at other time steps in the prediction time horizon. For example, in some embodiments of the invention, the controlled vehicle 721 is allowed to enter a safety region 745 around a traffic intersection 740 only after coming to a full stop inside of a stopping zone in front of the traffic intersection and only when no other vehicles are crossing the traffic intersection in a crossing direction that could lead to potential collisions.

Figure 7D:
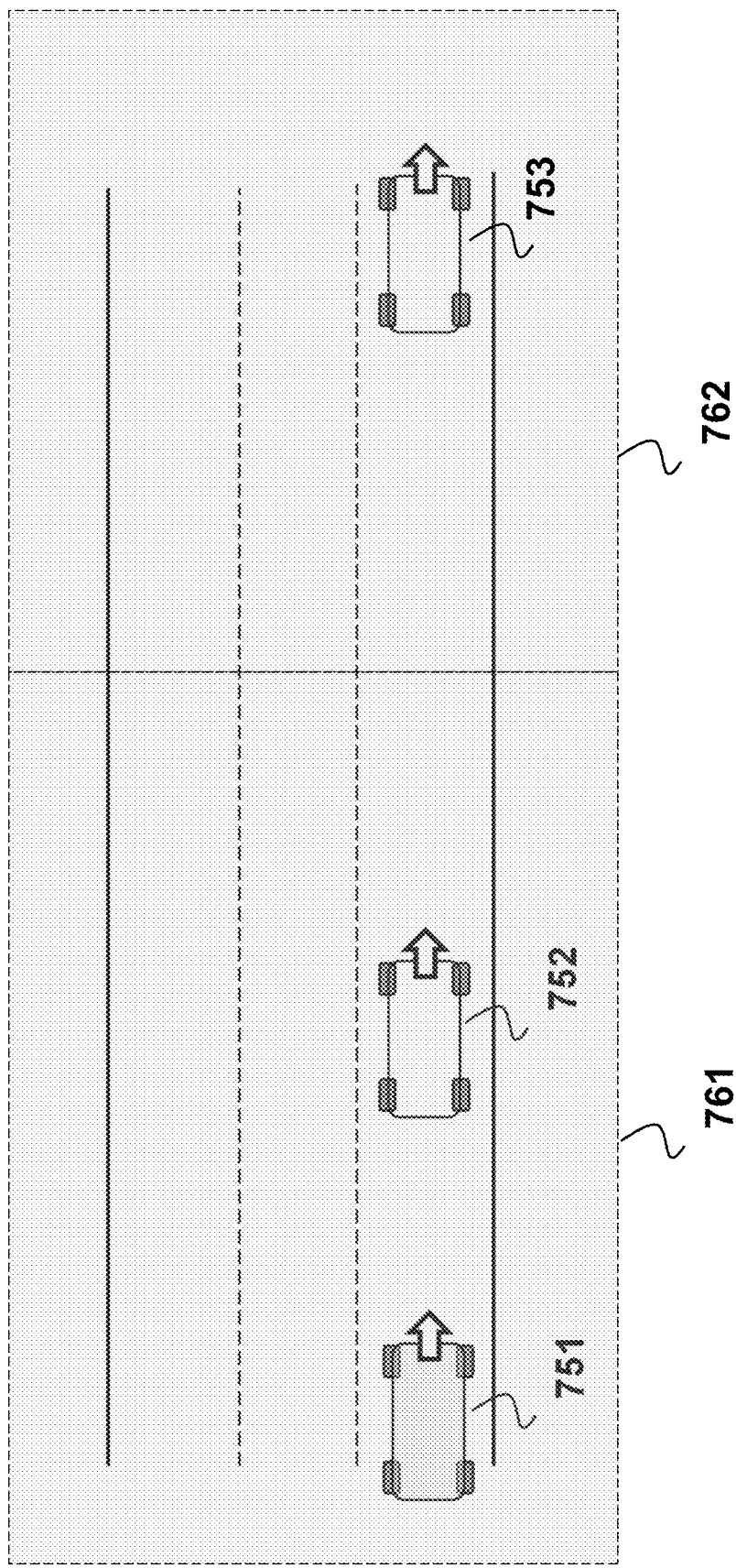
FIG. 7D illustrates one or multiple space-dependent zone constraints that are used in the proposed vehicle decision making and motion planning system for the controlled vehicle in an approximate representation of an exemplary real-world traffic scenario with one or multiple other vehicles, according to some embodiments of the invention.

FIG. 7D illustrates one or multiple space-dependent zone constraints 761-762 that are used in the proposed vehicle decision making and motion planning system for the controlled vehicle 751 in an approximate representation of an exemplary real-world traffic scenario with one or multiple other vehicles 752-753. Some embodiments of the invention are based on the realization that traffic rules change when the controlled vehicle 751 transitions from one space-dependent zone 761 to another space-dependent zone 762. For example, in some embodiments of the invention, space-dependent zone constraints include A limit on the maximum number of lane changes that are allowed for the controlled vehicle 751 in a particular space-dependent zone, e.g., no lane changes are allowed while crossing through a traffic intersection.

Constraints on the lanes in which a controlled vehicle 751 is allowed to drive in a particular space-dependent zone of a road segment, e.g., the vehicle needs to merge into a lane before a particular point along a route of the controlled vehicle 751 in the transportation network.

Speed limit constraints that depend on the space-dependent zone, for example, a speed limit value generally decreases when the controlled vehicle 751 enters a busy city neighborhood.

In some embodiments of the invention, the MICP 630 includes auxiliary binary variables $s=[s_1, s_2, \ldots, s_{n_s}]$ at each time step in the prediction time horizon, where $n_s$ denotes the number of space-dependent zones. For example, each zone is defined by a range of longitudinal positions $[\underline{p}_j, \overline{p}_j]$ of two values for each zone $j=1, 2, \ldots, n_s$ in the $p_X$-direction. In some embodiments of the invention, the MICP 630 includes mixed-integer inequality constraints to define whether the controlled vehicle 751 is in one zone 761 or in another zone 762, for example, $$\underline{p}_j(i) - M(1 - s_j(i)) \le p_X(i) \le \overline{p}_j(i) + M(1 - s_j(i)),$$

to implement an implication such as $$s_j(i) = 1 \Rightarrow \underline{p}_j(i) \le p_X(i) \le \overline{p}_j(i).$$

Since the space-dependent zones are disjoint regions, the controlled vehicle 751 is enforced to be inside exactly one zone at each time step $t_i$, i.e., $\Sigma_{j=1}^{n_s} s_j(i) = 1$.

Some embodiments of the invention are based on the realization that one or multiple auxiliary binary variables $s=[s_1, s_2, \ldots, s_{n_s}]$ can be used to adapt complex traffic rules along a route of the controlled vehicle 751 in the transportation network. For example, in some embodiments, speed limit constraints can be adapted to one or multiple space-dependent zones as follows $$v_X(i) \le \overline{v}_X(i) + \sum_{j=1}^{n_s} s_j(i)\left(\overline{v}_X^j(i) - \overline{v}_X(i)\right),$$

where $\overline{v}_X^j(i)$ denotes a speed limit value in each zone $j=1, 2, \ldots, n_s$. Similarly, in some embodiments of the invention, bounds on feasible lanes can be adapted to one or multiple space-dependent zones as follows $$\sum_{j=1}^{n_s} s_j(i) \underline{Y}_{ref}^j(i) \le Y_{ref}(i) \le (n-1)d + \sum_{j=1}^{n_s} s_j(i)\left(\overline{Y}_{ref}^j(i) - (n-1)d\right),$$

where $\underline{Y}_{ref}^j(i)$ and $\overline{Y}_{ref}^j(i)$ denote the lower and upper bound values for the preferred lane of the controlled vehicle 751 in each zone $j=1, 2, \ldots, n_s$, the parameter n denotes the number of lanes in a real-world traffic scenario and d denotes the lane width value. And similarly, in some embodiments of the invention, an upper bound on the total number of lane changes for the controlled vehicle 751 can be adapted to one or multiple space-dependent zones as follows $$n_{LC}(i) \le \overline{n}_{LC} + \sum_{j=1}^{n_s} s_j(i)\left(\overline{n}_{LC}^j - \overline{n}_{LC}\right),$$

where $\overline{n}_{LC}^j$ denotes a limit on the total number of lane changes for the controlled vehicle 751 in each zone $j=1, 2, \ldots, n_s$.

Figure 8A:
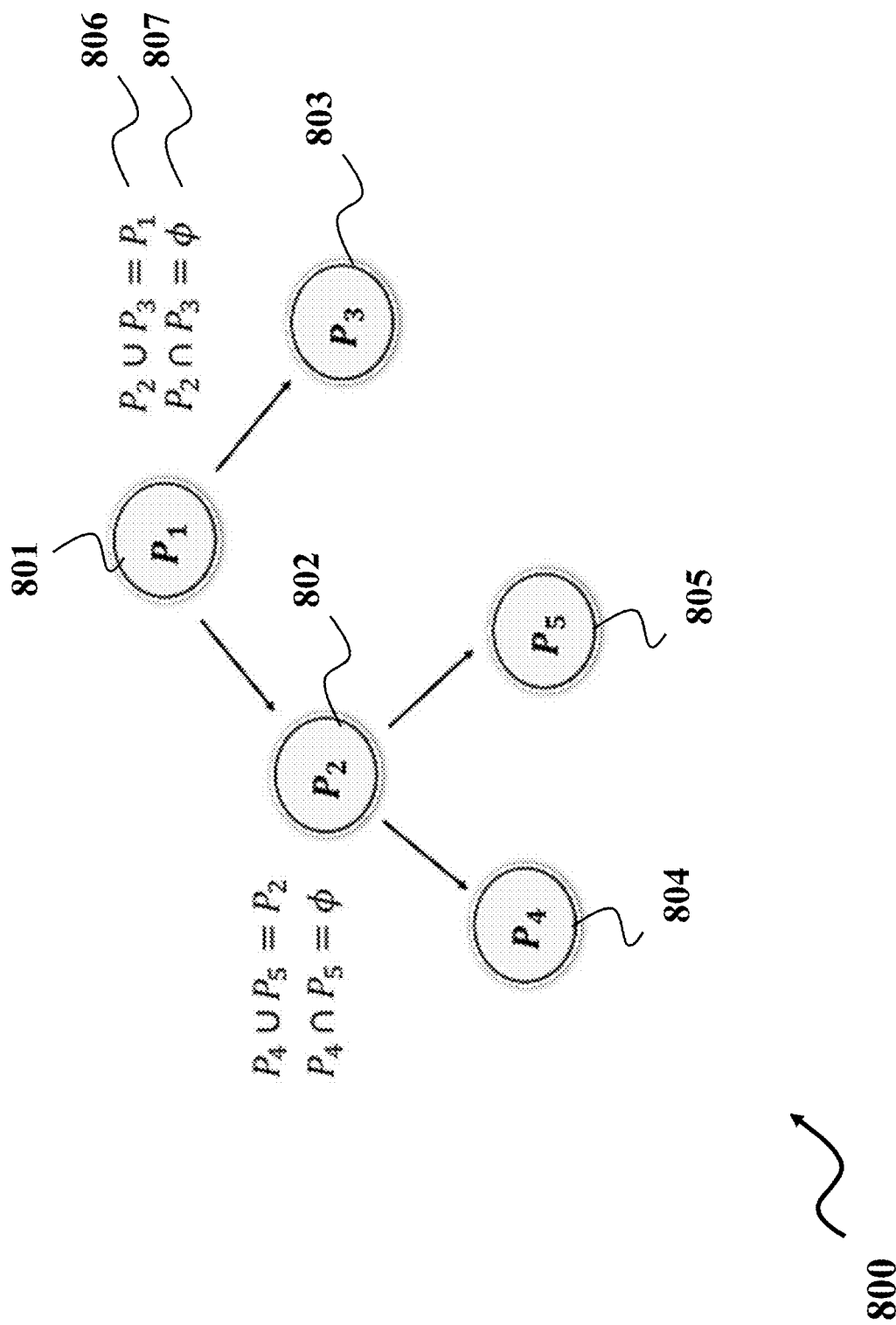
FIG. 8A illustrates a schematic of an example of a binary control variable search tree that represents a nested tree of search regions for the integer-feasible control solution, according to some embodiments of the invention.

FIG. 8A illustrates a schematic of an example of a binary control variable search tree that represents a nested tree of search regions for the integer-feasible control solution, according to some embodiments. FIG. 8A shows a schematic representation of a branch-and-bound method, which is used to implement the MI-MPC controller in some embodiments, by showing the binary search tree 800 at a particular iteration of the mixed-integer optimization algorithm. The main idea of a branch-and-bound (B&B) method is to sequentially create partitions of the original problem and then attempt to solve those partitions, where each partition corresponds to a particular region of the discrete control variable search space. In some embodiments, a branch-and-bound method selects a partition or node and selects a discrete control variable to branch this partition into smaller partitions or search regions, resulting in a nested tree of partitions or search regions.

For example, the partition $P_1$ 801 represents a discrete search region that can be split or branched into two smaller partitions or regions $P_2$ 802 and $P_3$ 803, i.e., a first and a second region that are nested in a common region. The first and the second region are disjoint, i.e., the intersection of these regions is empty $P_2 \cap P_3 = \phi$ 807, but they form the original partition or region $P_1$ together, i.e., the union $P_2 \cup P_3 = P_1$ 806 holds after branching. The branch-and-bound method then solves an integer-relaxed MPC problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MI-MPC problem. The upper bound value can be updated if the first region, the second region or both regions result in a discrete feasible solution to the MI-MPC problem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program or by using duality. If the MI-MPC solver happens to obtain an integer-feasible solution while solving a local relaxation, the MI-MPC solver can then use it to obtain a global upper bound for the mixed-integer control solution of the original MI-MPC problem. This may help to avoid solving or branching certain partitions that were already created, i.e., these partitions or nodes can be pruned. This general algorithmic idea of partitioning can be represented as a binary search tree 800, including a root node, e.g., $P_1$ 801 at the top of the tree, and leaf nodes, e.g., $P_4$ 804 and $P_5$ 805 at the bottom of the tree. In addition, the nodes $P_2$ 802 and $P_3$ 803 are typically referred to as the direct children of node $P_1$ 801, while node $P_1$ 801 is referred to as the parent of nodes $P_2$ 802 and $P_3$ 803. Similarly, nodes $P_4$ 804 and $P_5$ 805 are children of their parent node $P_2$ 802.

Figure 8B:
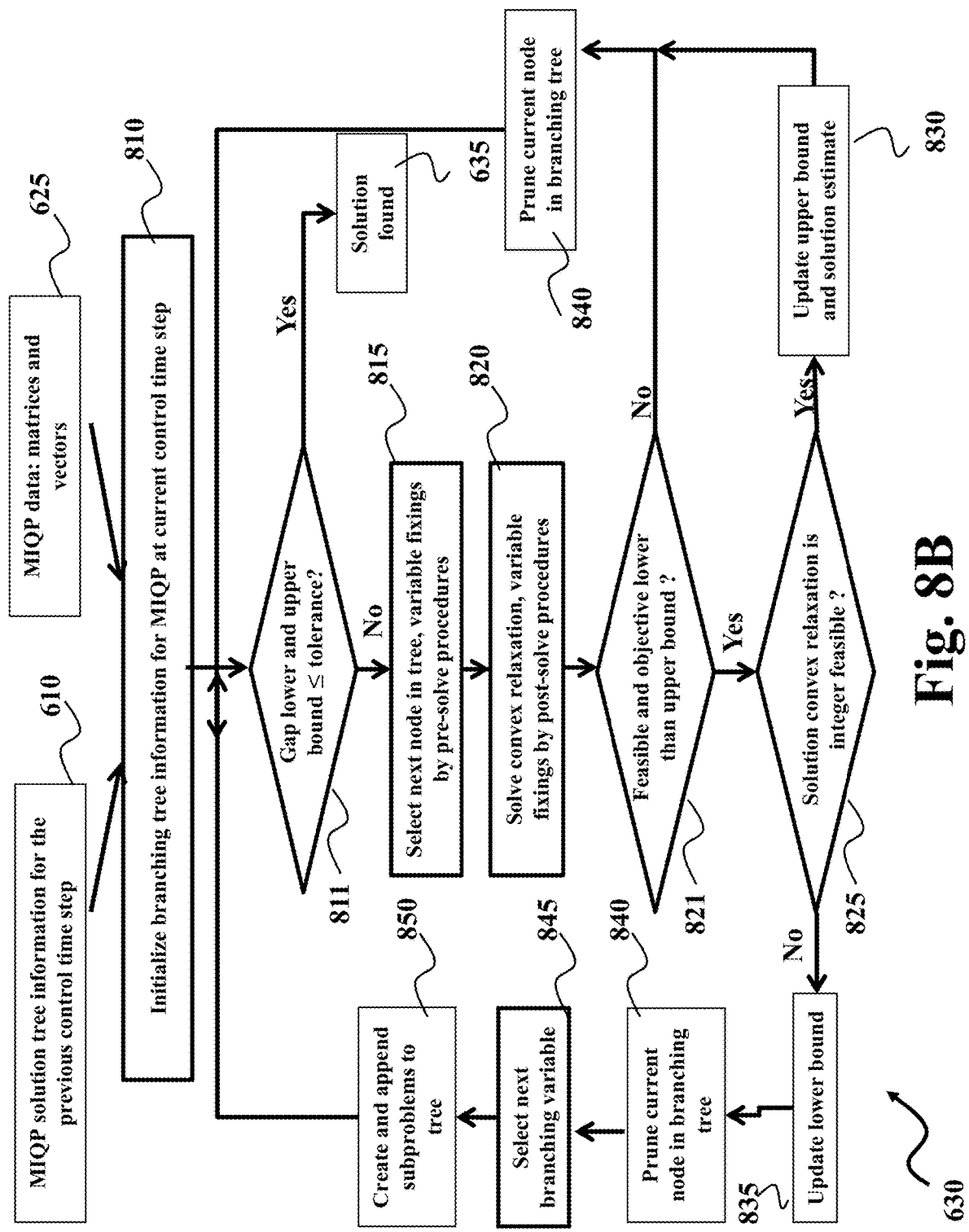
FIG. 8B illustrates a block diagram of a branch-and-bound mixed-integer optimization algorithm to search for the integer-feasible optimal control solution based on a nested tree of search regions and corresponding lower/upper bound values, according to some embodiments of the invention.

FIG. 8B illustrates a block diagram of a branch-and-bound mixed-integer optimization algorithm to search for the integer-feasible optimal control solution based on a nested tree of search regions and corresponding lower/upper bound values, according to some embodiments. The block diagram of a branch-and-bound mixed-integer optimization algorithm illustrated in FIG. 8B can be used to solve the MICP problem in some embodiments of the invention. The branch-and-bound method initializes the branching search tree information for the mixed-integer quadratic program (MIQP) at the current control time step 810, based on the MIQP data 625 that consists of MIQP matrices 646 and MIQP vectors 647. The initialization can additionally use the branching search tree information and MIQP solution information from the previous control time step 610 in order to generate a warm started initialization for the current control time step 810. The main goal of the optimization algorithm is to construct lower and upper bounds on the objective value of the mixed-integer control solution. At step 811, if the gap between the lower and upper bound value is smaller than a particular tolerance value, then the mixed-integer optimal control solution 635 is found.

Some embodiments of the invention are based on the realization that, as long as the gap between the lower and upper bound value is larger than a particular tolerance value at step 811, and a maximum execution time is not yet reached by the optimization algorithm, then the branch-and-bound method continues to search iteratively for the mixed-integer optimal control solution 635. Each iteration of the branch-and-bound method starts by selecting the next node in the tree, corresponding to the next region or partition of the integer variable search space, with possible variable fixings based on pre-solve branching techniques 815. After the node selection, the corresponding integer-relaxed MPC problem is solved, with possible variable fixings based on post-solve branching techniques 820.

Some embodiments of the invention are based on the realization that, if the integer-relaxed MPC problem has a feasible solution, then the resulting relaxed control solution provides a lower bound on the objective value for that particular region or partition of the integer variable search space. At step 821, if the objective is determined to be larger than the currently known upper bound for the objective value of the optimal mixed-integer control solution, then the selected node is pruned or removed from the branching tree 840. However, at step 821, if the objective is determined to be lower than the currently known upper bound, and the relaxed control solution is integer feasible 825, then the currently known upper bound and corresponding mixed-integer control solution estimate is updated at step 830 of the branch-and-bound optimization algorithm.

Some embodiments of the invention are based on the realization that, if the integer-relaxed MPC problem has a feasible solution and the objective is lower than the currently known upper bound 821, but the relaxed control solution is not yet integer feasible, then the global lower bound for the objective can be updated 835 to be the minimum of the objective values for the remaining leaf nodes in the branching tree and the selected node is pruned from the tree 840. In addition, starting from the current node, a discrete variable with a fractional value is selected for branching according to a particular branching strategy 845, in order to create and append the resulting subproblems, corresponding to regions or partitions of the discrete search space, as children of that node in the branching tree 850.

An important step in the branch-and-bound method is how to create the partitions, i.e., which node to select 815 and which discrete variable to select for branching 845. Some embodiments are based on branching one of the binary control variables with fractional values in the integer-relaxed MPC solution. For example, if a particular binary control variable $u_{i,k} \in \{0,1\}$ has a fractional value as part of the integer-relaxed MPC solution, then some embodiments create two partitions of the mixed-integer program by adding, respectively, the equality constraint $u_{i,k}=0$ to one subproblem and the equality constraint $u_{i,k}=1$ to the other subproblem. Some embodiments are based on a reliability branching strategy for variable selection 845, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:

The maximum execution time for the processor is reached.

All the nodes in the branching search tree have been pruned, such that no new node can be selected for solving convex relaxations or branching.

The optimality gap between the global lower and upper bound value for the objective of the mixed-integer control solution is smaller than a tolerance.

Figure 9A:
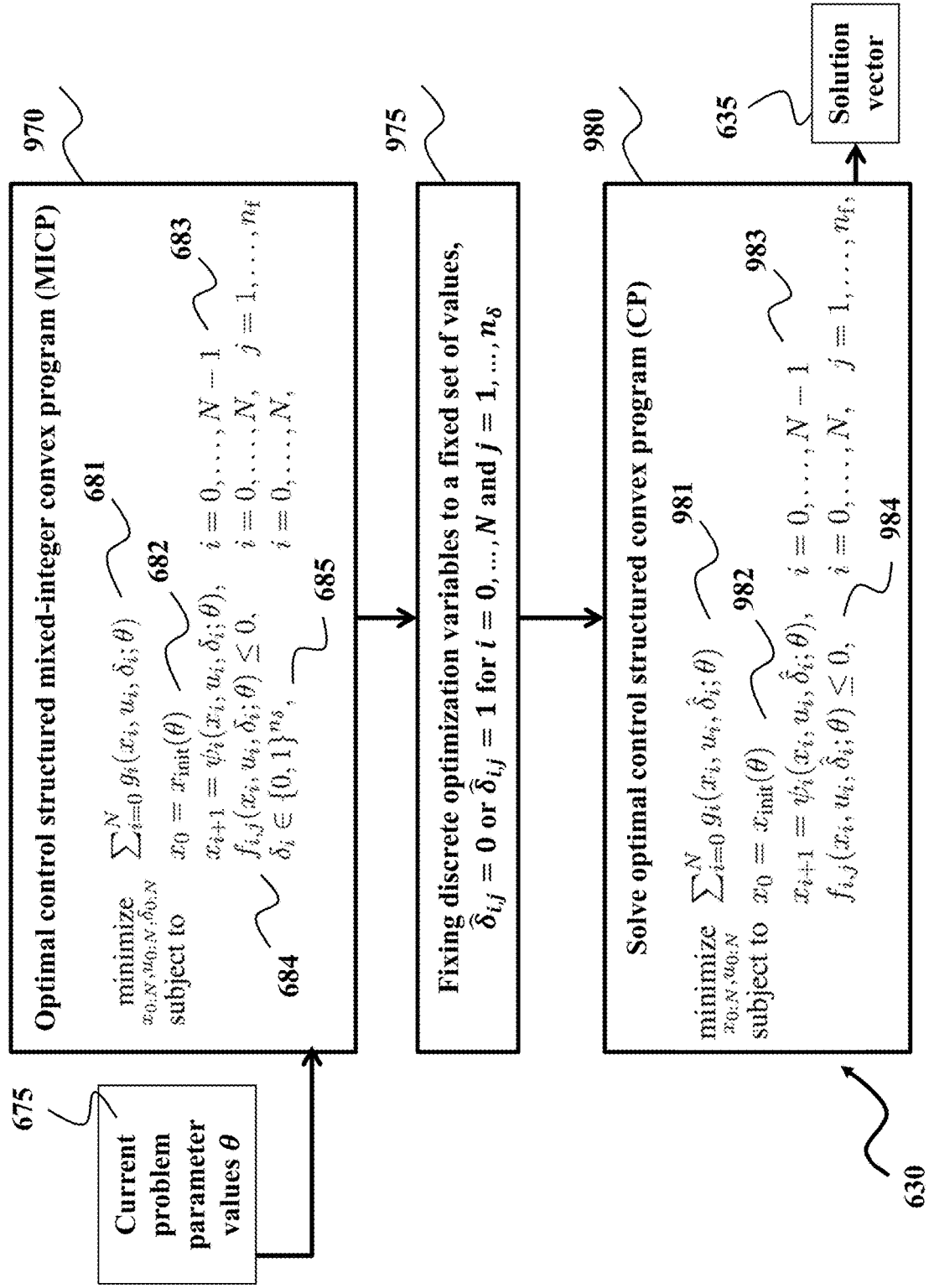
FIG. 9A illustrates that an optimal control structured MICP problem can be transformed and solved very efficiently as an optimal control structured convex programming (CP) problem after fixing all discrete variables to a fixed set of values, according to some embodiments of the invention.

FIG. 9A illustrates that an optimal control structured MICP problem 970 can be transformed and solved 630 as an optimal control structured convex program (CP) 980 after fixing all discrete variables to a fixed set of values 975, i.e., after fixing all binary variables to either 0 or 1 and/or fixing all integer variables to an integer feasible value. Some embodiments of the invention are based on the realization that the optimal state and control solution $x_{0:N}^*$, $u_{0:N}^*$ of the optimal control structured CP 980 is equal to the optimal state and control solution $x_{0:N}^*$, $u_{0:N}^*$ of the optimal control structured MICP 970 to compute the solution vector 635, after fixing the discrete variables to the optimal discrete solution $\delta_{0:N}^*$ that can be obtained by solving the original MICP 970. Therefore, the MICP problem 970 can be solved 630 by solving a CP 980 instead, which is computationally much cheaper to solve, by accurately predicting the optimal discrete solution $\delta_{0:N}^*$ when fixing the discrete optimization variables 975. In some embodiments of the invention, the fixed set of values for the discrete variables 975 are computed by a machine learning-based prediction and iterative presolve-based correction method to compute a feasible but possibly suboptimal solution vector 635.

The optimal control structured CP 980 is based on a minimization or maximization of a sum of stage cost functions 981, and the constraints can include an equality constraint on the initial state variable 982, state dynamic equality constraints 983 and one or multiple inequality constraints 984, based on the MICP functions 627 $g_0, g_1, \ldots, g_N, \psi_0, \psi_1, \ldots, \psi_{N-1}$, and $f_{0,1}, f_{0,2}, \ldots, f_{0,n_f}, f_{1,1}, \ldots, f_{N,n_f}$ where each of the discrete optimization variables $\delta_{i,j}$ is fixed to a predicted value $\delta_{i,j} = \hat{\delta}_{i,j}$ 975 for $i=0, \ldots, N$ and $j=1, \ldots, n_\delta$. Note that the discrete optimization variables $\delta_{0:N}$ and the discrete feasibility constraints 685 are removed from the optimal control structured CP 980, after fixing the discrete variables 975. In some embodiments of the invention, the optimal control structured CP can be solved efficiently using a convex optimization algorithm including, for example, active-set methods, interior point methods, gradient-based methods, operator splitting methods or the alternating direction method of multipliers (ADMM).

Some embodiments of the invention are based on the realization that the CP 980 is a convex linear program (LP) if the MICP 970 can be formulated as an MILP. Some embodiments of the invention are based on the realization that the CP 980 is a convex quadratic program (QP) if the MICP 970 can be formulated as an MIQP. Some embodiments of the invention are based on the realization that the CP 980 is a convex quadratically constrained quadratic program (QCQP) if the MICP 970 can be formulated as an MIQCQP. Some embodiments of the invention are based on the realization that the CP 980 is a convex second-order cone program (SOCP) if the MICP 970 can be formulated as an MISOCP.

Figure 9B:
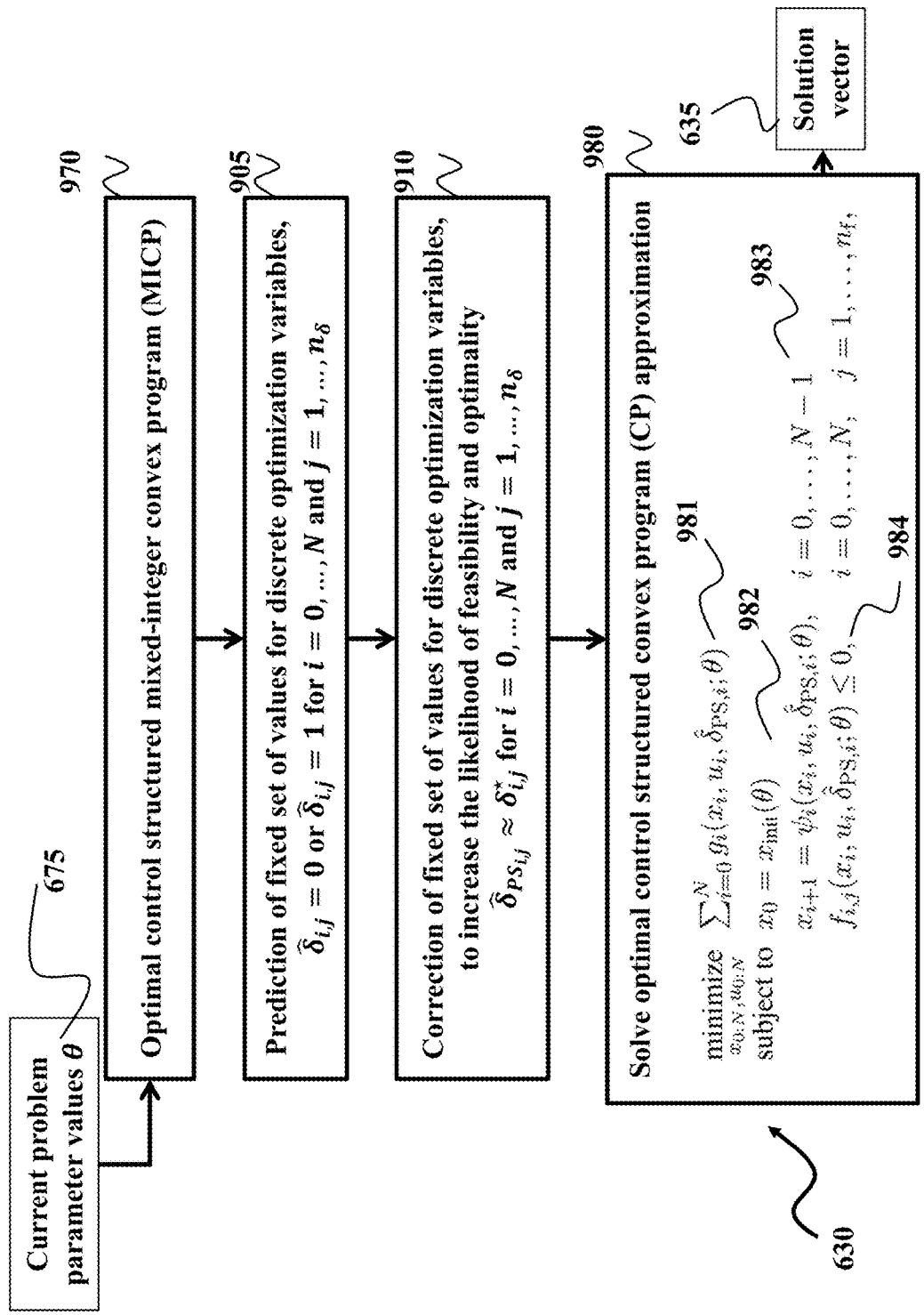
FIG. 9B illustrates a block diagram of an MICP solution method, based on a prediction, followed by a correction of the fixed set of discrete values and the solution of an optimal control structured CP, according to some embodiments.

FIG. 9B illustrates a block diagram of an MICP solution method 630, given the current problem parameter values θ 675, based on a prediction of a fixed set of values for the discrete optimization variables 905 and the solution of an optimal control structured CP approximation 980 to compute a feasible but possibly suboptimal solution vector 635 that defines the control signal 111. In some embodiments of the invention, the prediction of the fixed set of values for the discrete optimization variables 905, given the current problem parameter values θ 675, is based on a parametric function approximation of the mapping between the problem parameters θ 675 and the discrete values of the optimal MICP solution 630. Some embodiments of the invention are based on the realization that the discrete values of the optimal MICP solution 630 are equal to either 0 or 1 if all the discrete optimization variables are binary optimization variables. In some embodiments of the invention, the prediction method 905 is based on a parametric function approximation of the mapping between the problem parameters θ 675 and a value of $\hat{\delta}_{i,j}=0$ or $\hat{\delta}_{i,j}=1$ for each of the binary optimization variables i=0, 1, ..., N and j=1, 2, ..., $n_\delta$ in the optimal MICP solution 630.

In some embodiments of the invention, the prediction model 905 may be deterministic, for example, including multi-layer perceptrons, convolutional neural networks (CNNs), recurrent neural networks (RNNs), transformers, kernel regression, support vector machines, and other machine learning algorithms or any combination of such deterministic prediction models. Alternatively, in some embodiments of the invention, the prediction model may be stochastic, for example, including Bayesian neural networks, neural processes, Gaussian processes, Kriging interpolation, and other machine learning algorithms or any combination of such deterministic and/or stochastic prediction models.

Some embodiments of the invention are based on the realization that one or multiple permutation invariant and/or permutation equivariant layers can be used in the prediction model 905 to improve the accuracy of the prediction and increase the likelihood of feasibility and/or optimality for the CP approximation 980. For example, in some embodiments of the invention, a deep set architecture can be used to ensure that the prediction 905 of a fixed set of values for the discrete variables is invariant to the order of the parameters corresponding to the one or multiple obstacles in the traffic environment. Alternatively, in some embodiments of the invention, one or multiple equivariant deep set layers can be used to ensure that a permutation in the order of the parameters corresponding to the one or multiple obstacles in the traffic environment results in the same permutation in the order of the prediction 905 of a fixed set of values for the discrete variables. Finally, in some embodiments of the invention, one or multiple symmetric layers can be used to enforce symmetry properties of the prediction model 905 with respect to symmetric transformations in the traffic environment for the vehicle decision making and motion planning system.

In some embodiments of the invention, a prediction of a fixed set of values for the discrete optimization variables 905 is followed by a correction of the fixed set of values for the discrete optimization variables to increase the likelihood of feasibility and optimality 910, and followed by the solution of an optimal control structured CP approximation 980 to compute a feasible but possibly suboptimal solution vector 635 that defines the control signal 111. The prediction method 905 can be implemented as a parametric function approximation of the mapping between the problem parameters θ 675 and a value of $\hat{\delta}_{i,j}=0$ or $\hat{\delta}_{i,j}=1$ for each of the binary optimization variables i=0, 1, ..., N and j=1, 2, ..., $n_\delta$ in the optimal MICP solution 630. However, some embodiments of the invention are based on the realization that the predicted values of $\hat{\delta}_{i,j}=0$ or $\hat{\delta}_{i,j}=1$ 905 can result in a relatively low likelihood of feasibility and/or optimality in practice for the solution vector 635 that is computed from the solution of the CP approximation 980.

In some embodiments of the invention, the correction method 910 does not adjust the predicted values of $\hat{\delta}_{i,j}=0$ or $\hat{\delta}_{i,j}=1$ 905 if the fixed set of values for the discrete optimization variables leads to a CP solution 980 that is feasible and/or optimal for the original MICP optimization problem 970. A set of values for the discrete variables $\delta_i = \hat{\delta}_i$ is considered to be feasible, when the resulting convex optimization problem (CP) has a feasible optimal solution. Alternatively, if the CP problem 980 is infeasible after fixing the discrete optimization variables to the predicted set of values 905, then the correction method can adjust one or multiple of the predicted values to better approximate the optimal discrete solution $\hat{\delta}_{PS_{i,j}} \approx \delta_{i,j}^*$ for each of the binary optimization variables i=0, 1, ..., N and j=1, 2, ..., $n_\delta$ in the optimal MICP solution 630, and therefore to increase the likelihood of feasibility and optimality 910 according to embodiments of the invention.

Finally, the updated set of discrete values $\hat{\delta}_{PS_{i,j}} \approx \delta_{i,j}^*$ are used to fix each of the discrete optimization variables 910, and the resulting CP 980 can be solved efficiently in order to compute a feasible optimal control solution vector 635, including a trajectory of values for the state and control input variables at each time step of the prediction time horizon, which may be (close to) the optimal control solution for the original MIOCP 970 that is used to compute a motion plan and sequence of control actions for the vehicle in a traffic scenario.

In some embodiments of the invention, the correction method 910 is an iterative presolve-based correction method that is based on an iterative procedure in which each iteration performs a single presolve step followed by fixing one or multiple discrete optimization variables to a predicted set of fixed values 905. In some embodiments of the invention, the single presolve step itself consists of an iterative procedure of one or multiple presolve operations to reduce the number of discrete and/or continuous optimization variables, tighten the bounds on optimization variables and/or tighten the bounds on one or multiple inequality constraints. The iterative procedure of the single presolve step then performs one or multiple iterations, until either the problem is detected to be infeasible, until insufficient progress has been made between two consecutive iterations or until a predetermined time limit has been reached in order to ensure computational efficiency. Examples of presolve operations include domain propagation, bound strengthening, dual fixing, implied variable substitution, coefficient strengthening, probing, detection and removal of redundant variables and/or constraints. In addition, each of the presolve operations can be executed on individual variables, individual constraints, multiple variables and/or multiple constraints.

Figure 9C:
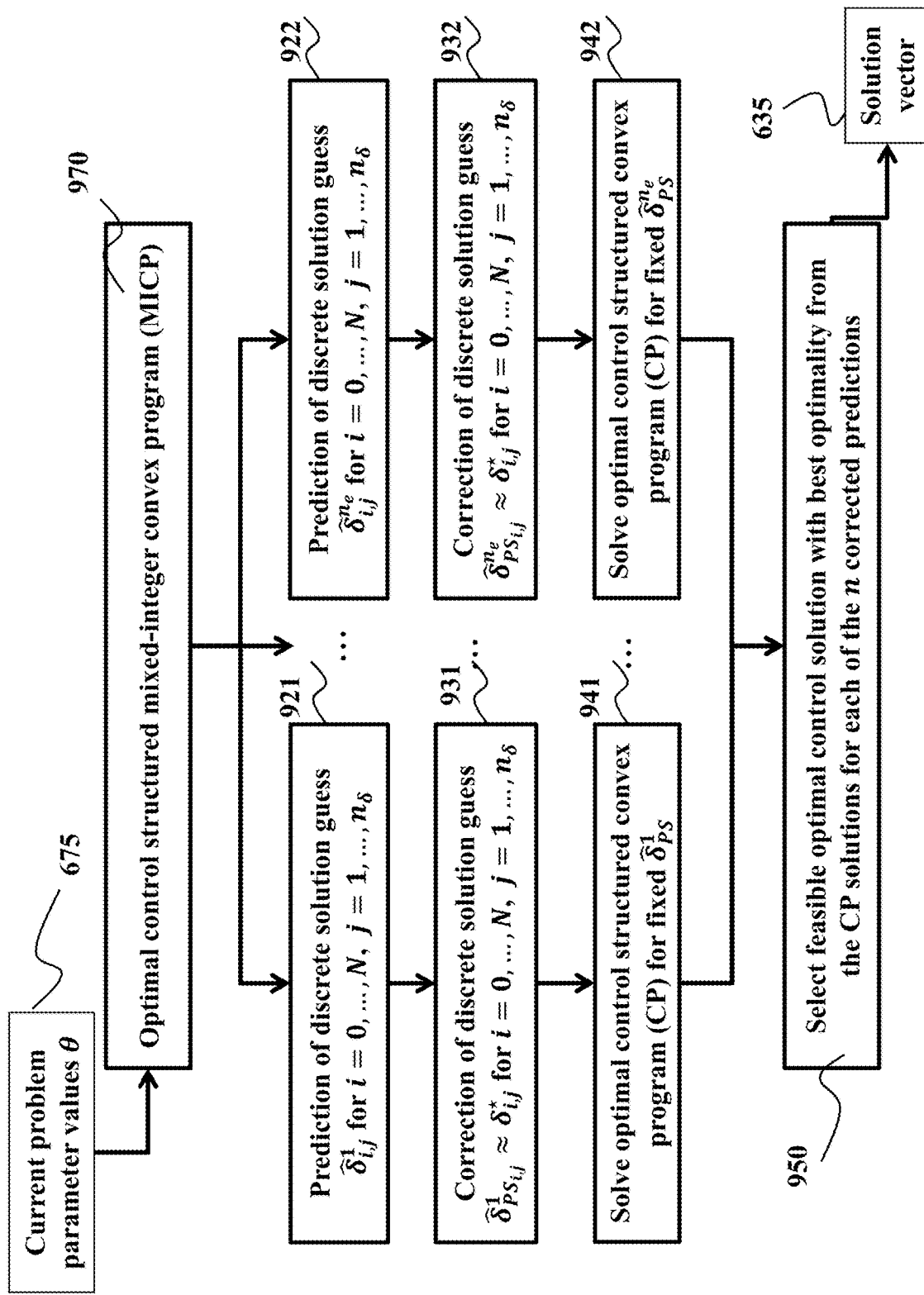
FIG. 9C illustrates a block diagram of an MICP solution method, based on multiple predictions, each followed by a correction of the fixed set of discrete values and the solution of an optimal control structured CP, according to some embodiments.

FIG. 9C illustrates a block diagram of an MICP solution method 630, given the current problem parameter values $\theta$ 675, based on multiple different predictions 921-922 of a fixed set of values for the discrete optimization variables, each followed by a correction step 931-932 of the fixed set of values for the discrete optimization variables to increase the likelihood of feasibility and optimality, and each followed by the solution of an optimal control structured CP approximation 941-942 to compute a feasible but possibly suboptimal solution vector 635 by selecting the feasible control solution with best optimality from the CP solutions for each of the n corrected discrete solution predictions 950. In some embodiments, the computations for each of the discrete solution predictions can be performed in parallel. For example, the first prediction of a discrete solution guess $\hat{\delta}^1$ 921 can be computed in parallel with one or multiple other predictions of a discrete solution guess $\hat{\delta}^k$ for $k=2, \ldots, n_e$ 922. Similarly, the correction step for the first prediction of a discrete solution guess $\hat{\delta}_{PS}^1 \approx \delta^*$ 931 can be computed in parallel with one or multiple correction steps for other predictions $\hat{\delta}_{PS}^k \approx \delta^*$ for $k=2, \ldots, n_e$ 932. Finally, the optimal control structured CP solution for fixed $\hat{\delta}_{PS}^1$ 941 can be computed in parallel with one or multiple CP solutions for fixed sets of values $\hat{\delta}_{PS}^k$ for $k=2, \ldots, n_e$ 942, in order to select the best optimal control solution 950 to compute the MICP solution vector 635.

Figure 9D:
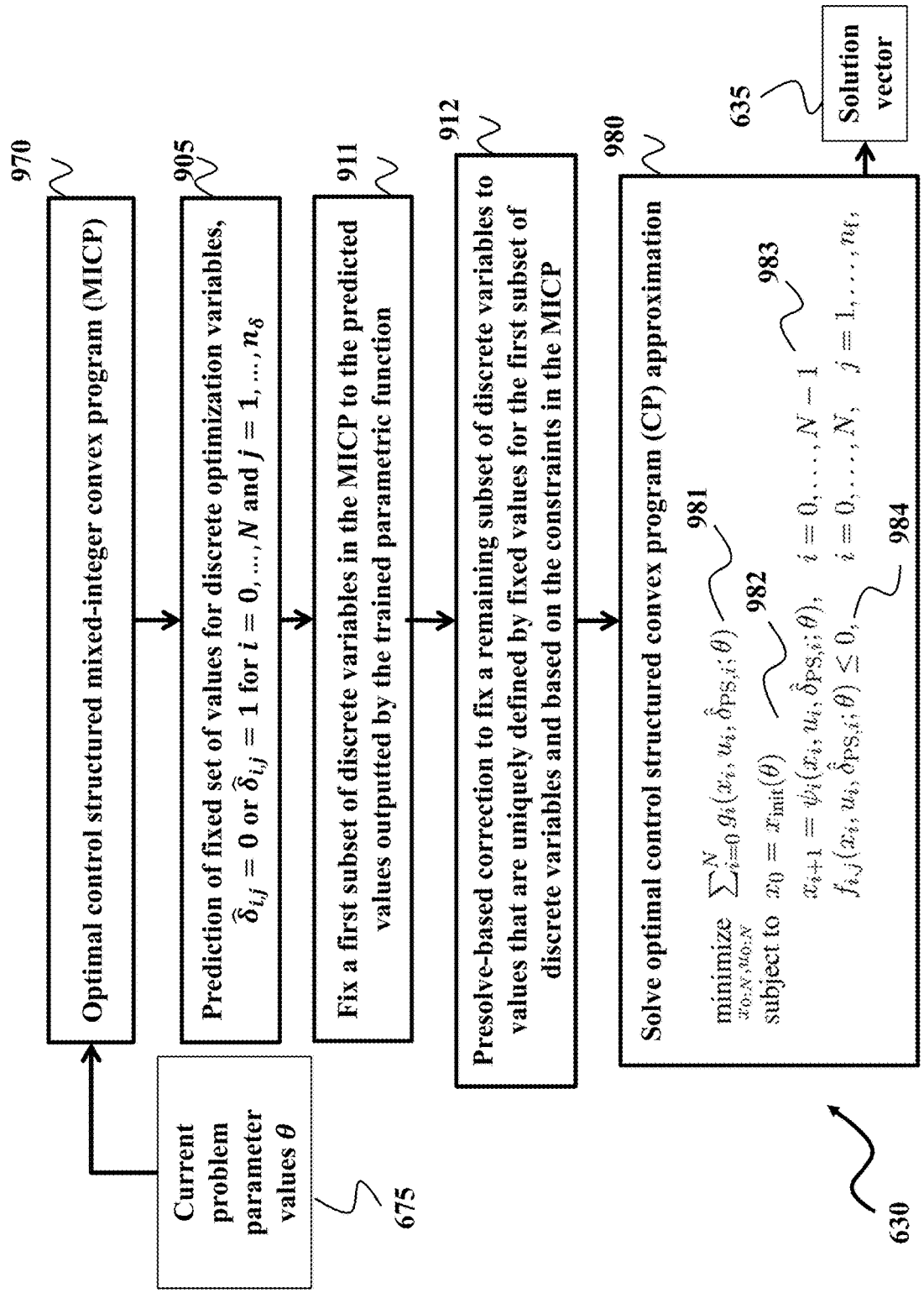
FIG. 9D illustrates a block diagram of an MICP solution method, based on a prediction that is used to fix a first subset of discrete variables, followed by a presolve-based correction to fix a remaining subset of discrete variables, and the solution of an optimal control structured CP, according to some embodiments.

FIG. 9D illustrates a block diagram of an MICP solution method 630, given the current problem parameter values $\theta$ 675, based on a prediction of a fixed set of values for the discrete optimization variables 905, which is used to fix a first subset of discrete variables in the MICP to the predicted values outputted by the trained parametric function 911, followed by a presolve-based correction to fix a remaining subset of discrete variables to values that are uniquely defined by fixed values for the first subset of discrete variables and based on the constraints in the MICP 912, to increase the likelihood of feasibility and optimality for the updated set of fixed values of the discrete variables 910, and followed by the solution of an optimal control structured CP approximation 980 to compute a feasible but possibly suboptimal solution vector 635 that defines the control signal 111.

Figure 10A:
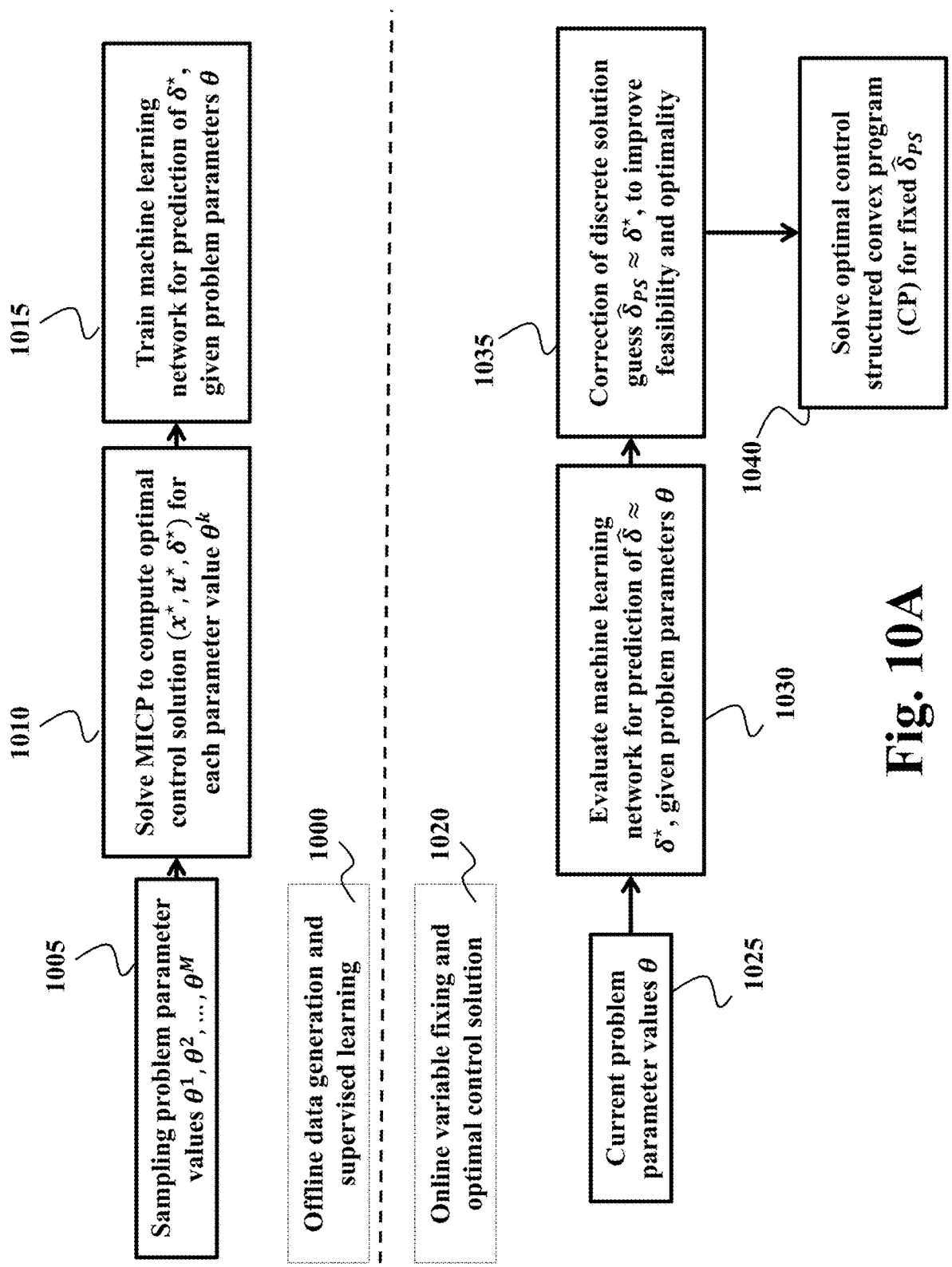
FIG. 10A illustrates a block diagram of an offline data generation and supervised learning procedure to train a machine learning-based predictor, which is used in an online variable fixing and optimal control solution procedure to solve the MICP in the vehicle decision making and motion planning system.

FIG. 10A illustrates a block diagram of an offline data generation and supervised learning procedure 1000 to train a machine learning-based predictor 1015, and the machine learning-based predictor is then used in an online variable fixing and optimal control solution procedure 1020 to compute a solution vector 635 for the optimal control structured MICP, according to some embodiments of the invention. The offline data generation and supervised learning procedure 1000 consists of a first step of sampling problem parameter values $\theta^1, \theta^2, \ldots, \theta^M$ 1005, which are representative of the MICP problems that need to be solved online in the proposed real-time vehicle decision making and motion planning system. For example, if the problem parameters include the current state of the controlled vehicle and/or the traffic environment, then the data sampling step 1005 ensures that a sufficiently large number of sampled parameter values are located in one or multiple regions of the feasible state space of the vehicle and its traffic environment. In addition, if the problem parameters include a representation of one or multiple obstacles, then the data sampling step 1005 ensures that a sufficiently large number of sampled parameter values result in a varying position, orientation and/or dimensions for one or multiple of the obstacles in the traffic environment.

The offline data generation and supervised learning procedure 1000 consists of a second step that solves an MICP to compute the optimal control solution $(x^*, u^*, \delta^*)$ 1010 for each sampled problem parameter value $\theta^1, \theta^2, \ldots, \theta^M$ 1005. In some embodiments of the invention, each of the MICPs can be solved exactly 1010, for example, using branch-and-bound (B&B), branch-and-cut, branch-and-price methods or any other variant of a tree search-based optimization algorithm. Alternatively, in some embodiments of the invention, each of the MICPs can be solved approximately 1010, for example, based on rounding and pumping schemes, using approximate optimization algorithms, approximate dynamic programming, or using sequential convex programming (SCP) techniques.

The offline data generation and supervised learning procedure 1000 consists of a third step of training the machine learning network using supervised learning, based on a training data set of sampled parameter values 1005 and corresponding MICP solutions 1010, for machine learning-based prediction of the discrete optimal solution $\delta^*$, given a new set of problem parameter values 1015. In some embodiments of the invention, training of the machine learning network involves the computation of network weights $\phi$ that minimize a training loss function, for example, using stochastic gradient descent, Adam, AdaGrad, RMSProp or any other variant of gradient-based or gradient-free optimization algorithm.

The online variable fixing and optimal control solution procedure 1020 consists of a first step to evaluate the machine learning-based predictor to compute $\hat{\delta} \approx \delta^*$ 1030, given the current problem parameter values $\theta$ 1025. Given the predicted discrete solution guess $\hat{\delta} \approx \delta^*$ 1030, the online variable fixing and optimal control solution procedure 1020 consists of a second step that performs a correction of the discrete solution guess, resulting in an updated solution guess $\hat{\delta}_{PS} \approx \delta^*$ 1035 to improve feasibility and/or optimality. Finally, a third step is based on the solution of an optimal control structured CP for fixed discrete values $\delta = \hat{\delta}_{PS}$ 1040. In some embodiments of the invention, the correction method 1035 is an iterative presolve-based correction method that is based on an iterative procedure in which each iteration performs a single presolve step followed by fixing one or multiple discrete optimization variables to a predicted set of fixed values 1030.

Some embodiments of the invention are based on the realization that the offline data generation and supervised learning procedure 1000 can be performed offline on a high-performance computer and therefore it does not have strict requirements on computational complexity and worst-case computation time. On the other hand, embodiments of the invention are based on the realization that the online variable fixing and optimal control solution procedure 1020 needs to be performed online with strict requirements on the computational complexity and worst-case computation time, and the online procedure is typically executed on an embedded microprocessor with limited memory and limited computational capabilities, e.g., using the embedded control unit (ECU) of a vehicle.

Figure 10B:
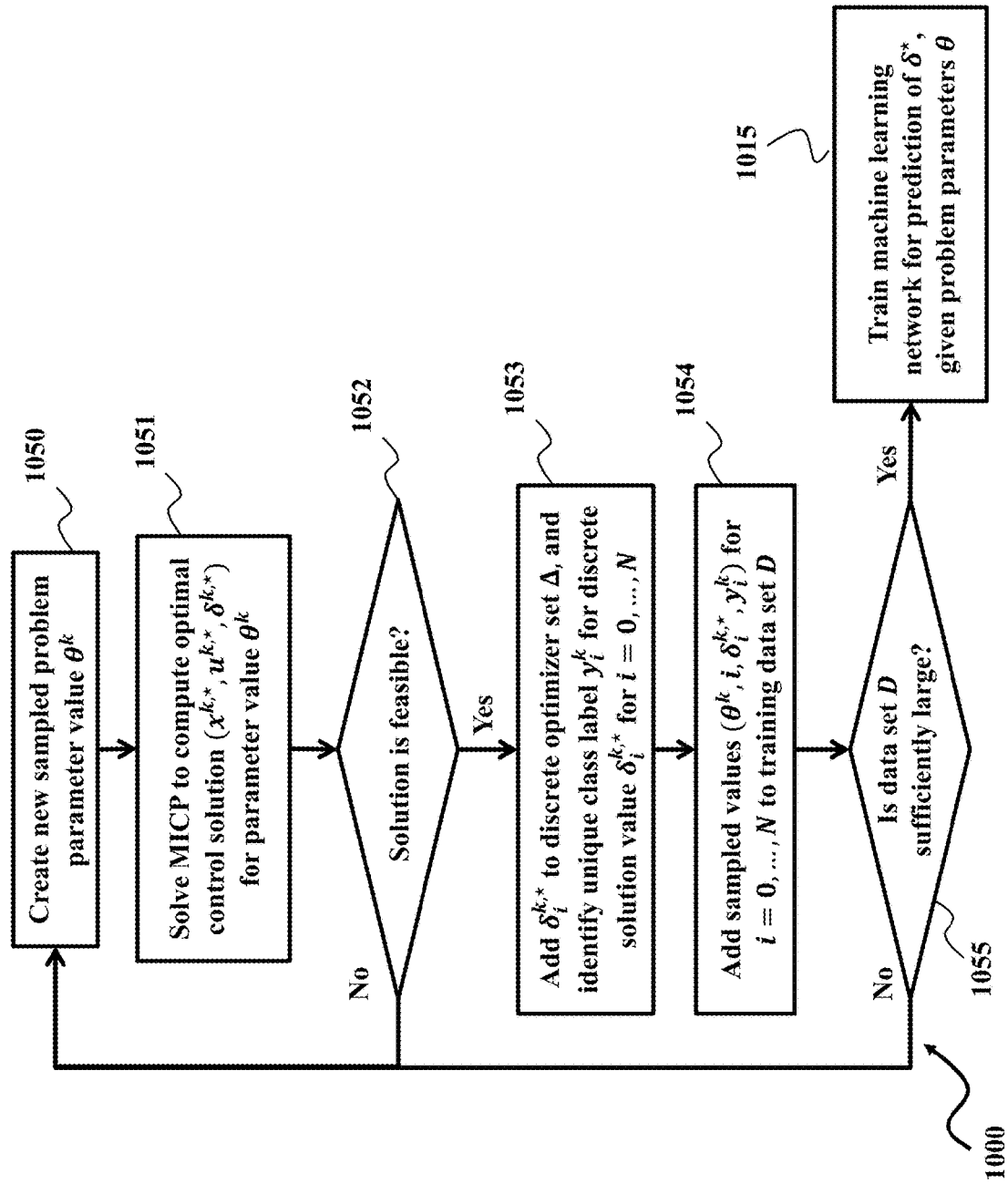
FIG. 10B illustrates a flow diagram of an offline data generation procedure, based on MICP solutions for a set of sampled problem parameter values, and a supervised learning procedure to train a machine learning-based predictor, according to some embodiments of the invention.

FIG. 10B illustrates a flow diagram of an offline data generation procedure 1000, based on MICP solutions 1010 for a set of sampled problem parameter values 1005, and a supervised learning procedure to train a machine learning-based predictor 1015, based on a discrete optimizer set $\Delta$ 1053 and a training data set D 1054. In some embodiments of the invention, the offline data generation 1000 is an iterative procedure that checks whether the training data set D is sufficiently large 1055. If the training data set D is sufficiently large 1055, then the procedure initiates training of the machine learning-based predictor 1015, i.e., the computation of network weights $\phi$ that minimize a training loss function, using stochastic gradient descent, Adam, AdaGrad, RMSProp or any other variant of gradient-based or gradient-free optimization algorithm. In some embodiments of the invention, the offline data generation procedure 1000 returns the trained machine learning network $h_\phi$ and a discrete optimizer set $\Delta$ 1056.

If the training data set D is not sufficiently large 1055, then the data generation 1000 proceeds by computing a new sampled problem parameter value $\theta^k$ 1050 and an MICP problem is solved to compute the optimal control solution $(x^{k,*}, u^{k,*}, \delta^{k,*})$ 1051 for the new sampled problem parameter value $\theta^k$. If the MICP solution 1051 is not feasible 1052, then a new sampled problem parameter value $\theta^k$ 1050 needs to be computed. In some embodiments of the invention, a new sampled problem parameter value $\theta^k$ 1050 can be selected from a precomputed batch of problem parameter values $\{\theta^k\}_{k=1,\ldots,M}$ 1045. At the start of the offline data generation procedure 1000, a binary optimizer set $\Delta$ and a training data set D are each initialized to be equal to an empty set 1001.

If the MICP solution 1051 is feasible 1052, then the data generation 1000 proceeds by adding the optimal discrete solution values $\delta_i^{k,*}$ to a discrete optimizer set $\Delta$ and a unique class label $y_i^k$ is identified for the optimal discrete solution values $\delta_i^{k,*}$ for each time step i=0, ..., N in the prediction time horizon 1053. In some embodiments of the invention, if the MICP solution 1051 is feasible 1052, then the offline data generation 1000 proceeds by adding the sampled solution values $(\theta^k, i, \delta_i^{k,*}, y_i^k)$ for each time step i=0, ..., N to the training data set D 1054.

Some embodiments of the invention are based on the realization that two or more sampled problem parameter values $\theta^k$ and $\theta^l$ can result in optimal discrete solution values that are equal, i.e., $\delta_i^{k,*} = \delta_i^{l,*}$ for one or multiple time steps i∈{0,1, ..., N} in the prediction time horizon, in which case the corresponding class labels are equal $y_i^k = y_i^l$ to each other, because the class label value is a unique identifier of the discrete optimal solution value in the discrete optimizer set $\Delta$.

Some embodiments of the invention are based on the realization that the number of target class labels in supervised learning can be reduced considerably by exploiting the temporal structure of the discrete MIOCP solution, which may result in improved sampling efficiency and/or improved performance of the machine learning-based predictor. For example, the maximum number of target class label values is $2^{(N+1)n_\delta}$, given $n_\delta$ discrete variables at each time step i=0, 1, ..., N, which can be reduced to a maximum of $2^{n_\delta}$ target class label values per time step by exploiting the temporal structure of the MIOCP. In addition, some embodiments of the invention are based on the realization that the number of unique discrete values $\delta_i^k \in \Delta$ can be considerably smaller than the theoretical maximum number of target class label values, due to a sampling of problem parameter values that are representative of the optimal control problems which are of interest in practice and due to the constraints on feasibility of the MIOCP problem.

In some embodiments of the invention, the supervised learning-based predictor is trained based on a regression problem, i.e., the predictor is trained to directly predict the optimal values of the discrete variables $\delta_i^*$ at each of the time steps i=0, 1, ..., N in the control horizon of the MIOCP. In some embodiments of the invention, the predictor is an RNN, e.g., consisting of one or multiple LSTMs and/or one or multiple feedforward neural networks, with an input dimension that is equal to the number $n_\theta$ of problem parameters and the output dimension that is equal to the number $n_\delta$ of discrete variables at each time step. For example, the training loss for the regression problem can be a binary cross-entropy loss with logit activations applied to the output layer of the network. In some embodiments of the invention, the regressor is used to fix only one or multiple of the discrete variables for which the learning-based predictor has relatively high confidence, such that a reduced MIOCP needs to be solved to compute the remaining free discrete variables, in order to compute a feasible but possibly suboptimal mixed-integer solution to the high-dimensional MIOCP problem.

In some embodiments of the invention, the supervised learning-based predictor is trained based on a multi-class classification problem, i.e., the predictor is trained to select the best discrete values in the discrete optimizer set, i.e., $\hat{\delta}_i \in \Delta$. In some embodiments of the invention, the predictor is an RNN, e.g., consisting of one or multiple LSTMs and/or one or multiple feedforward neural networks, with an input dimension that is equal to the number $n_\theta$ of problem parameters and the output dimension that is equal to the number $|\Delta|$ of unique discrete values in the data set. For example, the training loss for the classification problem can be a cross-entropy loss. In some embodiments of the invention, the classifier is used to select one or multiple discrete solution candidates corresponding to the highest confidence for feasibility and optimality, and the iterative presolve-based correction method can be used to potentially correct one or multiple of these discrete solution candidates, in order to compute a feasible but possibly suboptimal mixed-integer solution to the high-dimensional MIOCP problem.

Figure 10C:
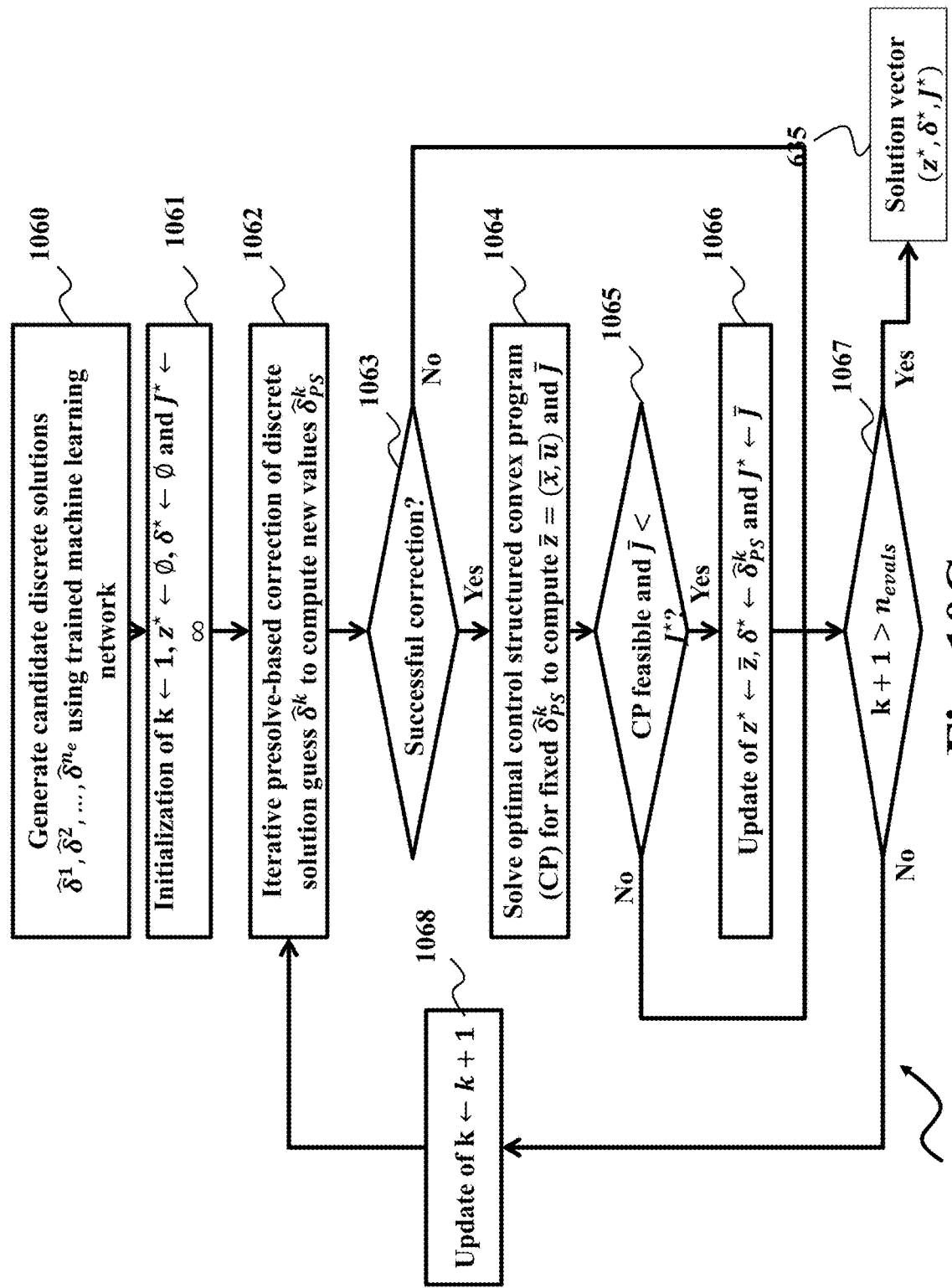
FIG. 10C illustrates a flow diagram of an online variable fixing procedure, based on a prediction and an iterative presolve-based correction step, and an optimal control structured CP solution procedure to compute an MICP solution in the vehicle decision making and motion planning system, according to some embodiments.

FIG. 10C illustrates a flow diagram of an online variable fixing procedure 1020, based on a prediction 1030 and an iterative presolve-based correction step 1035, and an optimal control structured CP solution procedure 1040 to compute a feasible MICP solution vector 635, according to some embodiments of the invention. In some embodiments of the invention, the trained machine learning network 1015 can be used to predict one or multiple candidate discrete solutions $\hat{\delta}^1, \hat{\delta}^1, \ldots, \hat{\delta}^{n_e}$ 1060, given the problem parameter values $\theta$, the discrete optimizer set $\Delta$, the trained machine learning network $h_\phi$ and a maximum number of evaluations $n_{evals}$. At the start of the online variable fixing and optimal control solution procedure 1020, an initialization step 1061 sets k←1, the optimal control solution $z^* = (x^*, u^*)$ and $\delta^*$ are each set equal to an empty set and the optimal objective value is set to infinity $J^* \leftarrow \infty$.

In some embodiments of the invention, the online variable fixing 1020 is an iterative procedure and each iteration consists of an iterative presolve-based correction step based on a discrete solution guess $\hat{\delta}^k$ to compute new discrete solution values $\hat{\delta}_{PS}^k$ 1062. If the correction is not successful 1063, for example, because no feasible solution could be found using the predicted discrete solution guess $\hat{\delta}^k$, then the procedure continues with the next iteration and the iteration number can be updated k←k+1 1068. If the correction successfully computes new values $\hat{\delta}_{PS}^k$ 1062, with an increased likelihood of feasibility and/or optimality, then the online variable fixing procedure 1020 proceeds by solving the optimal control structured CP for fixed discrete values $\delta = \hat{\delta}_{PS}^k$ to compute a feasible and optimal control solution $\bar{z} = (\bar{x}, \bar{u})$ and corresponding objective value $\bar{J}$ 1064.

In case no feasible solution of the optimal control structured CP for fixed discrete values $\delta = \hat{\delta}_{PS}^k$ exists or if the corresponding objective value is larger than the current optimal objective value $\bar{J} > J^*$ 1065, then the procedure continues with the next iteration and the iteration number can be updated $k \leftarrow k+1$ 1068. If a feasible solution of the optimal control structured CP for fixed discrete values $\delta = \hat{\delta}_{PS}^k$ exists and if the corresponding objective value is smaller than the current optimal objective value $\bar{J} < J^*$ 1065, then the procedure updates the optimal control solution $z^* \leftarrow \bar{z}$, it updates the optimal discrete solution $\delta^* \leftarrow \hat{\delta}_{PS}^k$ and it updates the optimal objective value $J^* \leftarrow \bar{J}$ 1066. In some embodiments of the invention, a maximum number of evaluations, $n_{evals}$, is defined in order to terminate the online variable fixing procedure 1020 if the maximum number of evaluations has been reached $k+1 > n_{evals}$ 1067, in order to limit the total computation time of the online variable fixing and optimal control solution.

If a maximum number of evaluations has not been reached 1067, then the procedure continues with the next iteration and the iteration number can be updated $k \leftarrow k+1$ 1068. If the maximum number of evaluations has been reached 1067, then the optimal control solution vector $(z^*, \delta^*, J^*)$ 635 can be used to implement the predictive controller according to embodiments of the invention.

In some embodiments of the invention, the iterative presolve-based correction method 1062 can return either one of the following results

- the iterative correction method detects that the predicted set of discrete values $\hat{\delta}^k$ are feasible, such that the values $\hat{\delta}_{PS}^k = \hat{\delta}^k \approx \delta^*$ are returned;
- the iterative correction method computes an updated set of discrete values $\hat{\delta}_{PS}^k \neq \hat{\delta}^k$ that are feasible, such that the values $\hat{\delta}_{PS}^k \approx \delta^*$ are returned;
- the iterative correction method may fail to compute an updated set of discrete values that are feasible, within a predetermined time limit.

Embodiments of the invention are based on the realization that the iterative presolve-based correction method may increase the likelihood of feasibility and/or optimality, e.g., when the iterative correction method removes or prunes a discrete variable for which the machine learning-based predictor provided an incorrect predicted value that would have resulted in an infeasible control solution.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A controller for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, the controller comprising: at least one processor; and a memory having instructions stored thereon that, when executed by the at least one processor, cause the controller to:

collect parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem;

transform the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters;

solve the transformed mixed-integer convex optimization problem for the approximate representation of the real-world traffic scenario to produce a current control command for controlling one or multiple actuators of the vehicle; and control the one or multiple actuators of the vehicle according to the control command.

2. The controller of claim 1, wherein the memory stores a predetermined traffic scenario resulting in the mixed-integer convex optimization problem, wherein the controller transforms the parameters of the current traffic scenario into parameters of the predetermined traffic scenario.

3. The controller of claim 1, wherein the tightening of limitation parameters results in one or multiple updated bound constraints in the mixed-integer convex optimization problem.

4. The controller of claim 2, wherein the predetermined traffic scenario includes one or a combination of the controlled vehicle on a straight road segment with one or multiple lanes, including a predicted motion trajectory for one or multiple other vehicles and/or traffic participants, one or multiple obstacle avoidance constraints for the controlled vehicle to remain outside of a safety region around the predicted motion trajectory of the one or multiple other vehicles and/or traffic participants, lane change timing constraints, one or multiple conflict zone constraints for one or more traffic intersections and/or merging points, and one or multiple space-dependent zone constraints along a future planned route of the controlled vehicle in the transportation network.

5. The controller of claim 4, wherein traffic rules of the current real-world traffic scenario are enforced by the mixed-integer convex optimization problem for the predetermined traffic scenario using one or multiple mixed-integer convex equality and/or inequality constraints and one or multiple auxiliary discrete and/or continuous optimization variables.

6. The controller of claim 4, wherein the predicted motion trajectory of the one or multiple other vehicles and/or traffic participants is computed using a closed-loop kinematic vehicle model for lane keeping and/or adaptive cruise control, considering that each of the one or multiple other vehicles and/or traffic participants remain in the current lane during a prediction time horizon.

7. The controller of claim 4, wherein the predicted motion trajectory of the one or multiple other vehicles and/or traffic participants is computed using a data-based vehicle model that aims to predict behavior of a human driver during a prediction time horizon, wherein the data-based vehicle model uses one or a combination of deep learning, support vector machines, neural networks, neural processes, Gaussian processes, machine learning techniques, and stochastic prediction models.

8. The controller of claim 1, wherein the control command is determined based on an inverse transformation of a solution of the mixed-integer convex optimization problem into an approximate solution of the mixed-integer non-convex optimization problem.

9. The controller of claim 8, wherein the approximate solution of the mixed-integer non-convex optimization problem includes a reference motion trajectory that is used by a vehicle tracking control system so that the controlled vehicle achieves an actual motion trajectory as close as possible to the reference motion trajectory; wherein the vehicle tracking control system is implemented using a linear, linear time varying or nonlinear model predictive controller (MPC).

10. The controller of claim 1, wherein the mixed-integer convex optimization problem is a mixed-integer linear programming (MILP) problem, a mixed-integer quadratic programming (MIQP) problem, a mixed-integer quadratically constrained quadratic programming (MIQCQP) problem, or a mixed-integer second order cone programming (MISOCP) problem.

11. The controller of claim 1, wherein a globally optimal or a feasible but suboptimal solution to a mixed-integer convex programming (MICP) problem is computed at each sampling time step.

12. The controller of claim 1, wherein a feasible but suboptimal solution to a MICP problem is computed at each sampling time step, using a deep learning network architecture trained with machine learning to predict optimal values corresponding to discrete and/or continuous optimization variables of the MICP problem given current problem parameter values.

13. The controller of claim 12, wherein the deep learning network architecture includes permutation invariant or transformation invariant layers which enforce that an output of the deep learning network architecture is invariant to permutations or transformations of one or multiple parameters of the current real-world traffic scenario.

14. The controller of claim 12, wherein the deep learning network architecture includes permutation equivariant or transformation equivariant layers which enforce that an output of the deep learning network architecture is equivariant to permutations or transformations of one or multiple parameters of the real-world traffic scenario.

15. The controller of claim 12, wherein the deep learning network architecture is evaluated once or multiple times to produce multiple predicted values for each optimization variable of the MICP problem, resulting in multiple candidate control solutions; wherein the controller performs a presolve-based correction for each candidate control solution to transform the MICP into multiple convex programming (CP) problems and determine multiple reference motion trajectories and/or multiple sequences of control actions, and wherein the controller is further configured to select a feasible motion trajectory for controlling the vehicle from the multiple motion trajectories.

16. The controller of claim 12, wherein the deep learning network architecture includes one or a combination of a deterministic model and a stochastic prediction model; wherein the deterministic model includes one or a combination of multi-layer perceptrons, a convolutional neural network (CNN), a recurrent neural networks (RNN), a transformer, a kernel regression, and a support vector machine, and wherein the stochastic model includes one or a combination of a Bayesian neural network, a neural process, a Gaussian process, and a Kriging interpolation.

17. A method for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, wherein the method uses a processor coupled to a memory having instructions stored thereon that, when executed by the processor, carry out steps of the method, comprising:

collecting parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem;

transforming the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters;

solving the transformed mixed-integer convex optimization problem for the approximate representation of the real-world traffic scenario to produce a current control command for controlling one or multiple actuators of the vehicle; and controlling the one or multiple actuators of the vehicle according to the control command.

18. The method of claim 17, wherein the memory stores a predetermined traffic scenario resulting in the mixed-integer convex optimization problem, wherein the method transforms the parameters of the current traffic scenario into parameters of the predetermined traffic scenario.

19. The method of claim 17, wherein the tightening of limitation parameters results in one or multiple updated bound constraints in the mixed-integer convex optimization problem.

20. A non-transitory computer readable storage medium embodied thereon a program executable by a processor for performing a method for controlling a vehicle traveling on a road having a geometric design defined by one or a combination of an alignment, a profile, and a cross-section of the road, wherein different values of parameters of the geometric design of the road, traffic on the road, traffic rules for the flow of the traffic on the road define different traffic scenarios, the method comprising:

collecting parameters of a current real-world traffic scenario for controlling the vehicle including configuration parameters causing a non-convexity of a mixed-integer non-convex constrained optimization problem for simultaneous decision-making and motion planning of the vehicle and limitation parameters agnostic to the non-convexity of the mixed-integer non-convex constrained optimization problem;

transforming the mixed-integer non-convex constrained optimization problem for the current real-world traffic scenario into a mixed-integer convex optimization problem for an approximate representation of the real-world traffic scenario by relaxing the configuration parameters and tightening corresponding limitation parameters;

solving the transformed mixed-integer convex optimization problem for the approximate representation of the real-world traffic scenario to produce a current control command for controlling one or multiple actuators of the vehicle; and controlling the one or multiple actuators of the vehicle according to the control command.

* * * * *